US011886252B2

(12) United States Patent
Kim et al.

(10) Patent No.: US 11,886,252 B2
(45) Date of Patent: Jan. 30, 2024

(54) FOLDABLE DEVICE AND METHOD OF CONTROLLING THE SAME

(71) Applicant: SAMSUNG ELECTRONICS CO., LTD., Suwon-si (KR)

(72) Inventors: So-young Kim, Suwon-si (KR); Se-hyun Han, Namyangju-si (KR); Dae-myung Kim, Hwaseong-si (KR); Youn-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/571,584

(22) Filed: Jan. 10, 2022

(65) Prior Publication Data

US 2022/0129041 A1    Apr. 28, 2022

Related U.S. Application Data

(63) Continuation of application No. 14/721,210, filed on May 26, 2015, now abandoned.

(30) Foreign Application Priority Data

May 23, 2014   (KR) ........................ 10-2014-0062544
Sep. 24, 2014  (KR) ........................ 10-2014-0127683
Feb. 24, 2015  (KR) ........................ 10-2015-0026080

(51) Int. Cl.
  *G06F 1/16*      (2006.01)
  *G06F 3/0488*    (2022.01)
  (Continued)

(52) U.S. Cl.
  CPC .......... *G06F 1/1677* (2013.01); *G06F 1/1616* (2013.01); *G06F 1/1643* (2013.01);
  (Continued)

(58) Field of Classification Search
  CPC .... G06F 1/1677; G06F 1/1616; G06F 1/1643; G06F 1/1652; G06F 3/0488; G06F 3/04886; G06F 2203/04803; G09G 5/003
  See application file for complete search history.

(56) References Cited

U.S. PATENT DOCUMENTS 5,847,698 A    12/1998  Reavey et al.
8,271,047 B2    9/2012  Kim et al.
(Continued)

FOREIGN PATENT DOCUMENTS

CN    101674361 A    3/2010
CN    101997976 A    3/2011
(Continued)

OTHER PUBLICATIONS

Khalilbeigi et at ("FoldMe: Interacting with Double-sided foldable displays". In Proceedings of the Sixth International Conference on Tangible, Embedded and Embodied Interaction, Feb. 19, 2012, pp. 33-40) (herein "Khalilbeigi"). (Year: 2012).*
(Continued)

*Primary Examiner* — Jonathan A Boyd
(74) *Attorney, Agent, or Firm* — Sughrue Mion, PLLC

(57) ABSTRACT

A foldable device includes: a flexible display configured to display an execution screen of an application; and a controller configured to control the flexible display to display an execution screen of at least one first application on a first surface of the flexible display that is used as a display of the foldable device when the flexible display is folded, and control, in response to the flexible display being unfolded, the flexible display to display the execution screen of the at least one first application and an execution screen of at least one second application related to the at least one first application to be displayed on a second surface of the
(Continued)

(S2902)

(S2904)

flexible display that is used as a display of the foldable device when the flexible display is unfolded.

7 Claims, 70 Drawing Sheets

(51) Int. Cl.
*G06F 3/04886* (2022.01)
*G09G 5/00* (2006.01)

(52) U.S. Cl.
CPC .......... *G06F 1/1652* (2013.01); *G06F 3/0488* (2013.01); *G06F 3/04886* (2013.01); *G09G 5/003* (2013.01); *G06F 2203/04803* (2013.01)

(56) References Cited

U.S. PATENT DOCUMENTS

| | | | |
|---|---|---|---|
| 8,448,071 B2 | 5/2013 | Ahn et al. | |
| 8,655,414 B2 | 2/2014 | Kim et al. | |
| 8,988,381 B1* | 3/2015 | Kim | G06F 3/04166 345/157 |
| 9,009,984 B2 | 4/2015 | Caskey et al. | |
| 9,013,884 B2 | 4/2015 | Fukuma et al. | |
| 9,052,769 B2 | 6/2015 | Choi et al. | |
| 9,152,225 B2 | 10/2015 | Park et al. | |
| 9,442,743 B2 | 9/2016 | Kim et al. | |
| 2006/0018102 A1 | 1/2006 | Soderlund | |
| 2006/0146011 A1* | 7/2006 | Pihlaja | H04M 1/0216 345/156 |
| 2007/0026909 A1* | 2/2007 | Jung | H04M 1/0214 455/575.3 |
| 2007/0085845 A1 | 4/2007 | Kikuchi et al. | |
| 2010/0056223 A1 | 3/2010 | Choi | |
| 2010/0060548 A1* | 3/2010 | Choi | G06F 1/1652 345/1.3 |
| 2010/0064536 A1 | 3/2010 | Caskey et al. | |
| 2010/0120470 A1 | 5/2010 | Kim et al. | |
| 2010/0302179 A1 | 12/2010 | Ahn et al. | |
| 2011/0039603 A1 | 2/2011 | Kim | |
| 2011/0241973 A1 | 10/2011 | Manning | |
| 2012/0262367 A1 | 10/2012 | Chiu et al. | |
| 2012/0280924 A1 | 11/2012 | Kummer et al. | |
| 2012/0314399 A1 | 12/2012 | Bohn et al. | |
| 2013/0027364 A1 | 1/2013 | Kim et al. | |
| 2013/0070431 A1 | 3/2013 | Fukuma et al. | |
| 2013/0154970 A1 | 6/2013 | Seo et al. | |
| 2013/0321264 A1 | 12/2013 | Park et al. | |
| 2014/0006932 A1* | 1/2014 | Yamanaka | G06F 40/143 715/234 |
| 2014/0028596 A1* | 1/2014 | Seo | G06F 3/0487 345/173 |
| 2014/0137041 A1 | 5/2014 | Jeon et al. | |
| 2014/0375219 A1 | 12/2014 | Lee | |
| 2014/0375596 A1 | 12/2014 | Kim | |
| 2015/0277496 A1 | 10/2015 | Reeves et al. | |

FOREIGN PATENT DOCUMENTS

| | | |
|---|---|---|
| CN | 102905014 A | 1/2013 |
| EP | 0 898 223 A2 | 2/1999 |
| EP | 2166443 A2 | 3/2010 |
| EP | 2 551 746 A1 | 1/2013 |
| EP | 2551746 A1 | 1/2013 |
| EP | 2669771 A1 | 12/2013 |
| EP | 2674834 A2 | 12/2013 |
| EP | 2693319 A2 | 2/2014 |
| EP | 2701035 A1 | 2/2014 |
| JP | 2005215320 A | 8/2005 |
| JP | 2007-108441 A | 4/2007 |
| JP | 2013-68719 A | 4/2013 |
| KR | 10-20110-030114 A | 3/2010 |
| KR | 1020100052226 A | 5/2010 |
| KR | 10-2010-0128781 A | 12/2010 |
| KR | 10-2013-0013371 A | 2/2013 |
| KR | 1020130069066 A | 6/2013 |
| KR | 10-2013-0132679 A | 12/2013 |
| KR | 1020130135648 A | 12/2013 |
| KR | 1020140016082 A | 2/2014 |
| TW | 201027046 A | 7/2010 |
| TW | 201301003 A | 1/2013 |
| TW | M475986 U | 4/2014 |
| TW | 201421208 A | 6/2014 |
| WO | 01/53919 A2 | 7/2001 |
| WO | 2014077530 A1 | 5/2014 |

OTHER PUBLICATIONS

Communication dated Jan. 27, 2022 issued by the Korean Intellectual Property Office in application No. 10-2021-0145544.
Communication dated Jul. 30, 2021 issued by the European Patent Office in application No. 21169166.2.
Communication dated Jan. 15, 2021 issued by the Korean Intellectual Property Office in counterpart Korean Application No. 10-2020-0012238.
Communication dated Feb. 22, 2021 issued by the European Intellectual Property Office in counterpart European Application No. 15 735 832.6.
Communication dated Nov. 20, 2020, issued by the Korean Intellectual Property Office in corresponding Korean Application No. 10-2020-0012238.
Communication dated Sep. 30, 2018, issued by the European Patent Office in counterpart European Application No. 15735832.6.
Communication dated May 1, 2020, issued by the Korean Intellectual Property Office in corresponding Korean Application No. 10-2020-0012238.
Communication dated Jan. 20, 2020 by the Taiwan Patent Office in counterpart Taiwan Patent Application No. 106116843.
Communication dated Feb. 18, 2020 by the Indian Patent Office in counterpart Indian Patent Application No. 1971/MUMNP/2015.
Communication dated Mar. 9, 2020 by the State Intellectual Property Office of P.R. China in counterpart Chinese Patent Application No. 201580000588.3.
Office Action dated Jul. 19, 2019 by the State Intellectual Property Office of P.R. China in counterpart Chinese Patent Application No. 201610927728.8.
Office Action dated Jul. 23, 2019 by the Taiwanese Patent Office in counterpart Taiwanese Patent Application No. 106116843.
Communication dated Jun. 17, 2019, issued by the Chinese Patent Office in counterpart Chinese Application No. 201580000588.3.
Communication dated Apr. 20, 2019, issued by the Korean Patent Office in counterpart Korean Application No. 10-2018-0024576.
Communication dated Dec. 20, 2018, issued by the State Intellectual Property Office of P.R. China in counterpart Chinese Application No. 201580000588.3.
Communication dated Sep. 29, 2018, issued by the Korean Intellectual Property Office in counterpart Korean Application No. 10-2018-0024576.
Communication dated Nov. 14, 2018, issued by the State Intellectual Property Office of P.R. China in counterpart Chinese Application No. 201610927728.8.
Communication dated Dec. 18, 2018, issued by the European Patent Office in counterpart European Application No. 15 735 832.6.
Communication dated Apr. 4, 2018 by the State Intellectual Property Office of P.R. China in counterpart Chinese Patent Application No. 201580000588.3.
Communication dated Aug. 3, 2017, issued by the Korean Intellectual Property Office in counterpart Korean application No. 10-2016-0029849.
IndVideos, "2014 Samsung Flexible OLED Display Phone and Tab Concept—YouTube", https://www.youtube.com/watch?v=MKG7XRsG9K!, Sep. 10, 2013, total 4 pages.
Communication dated Dec. 27, 2016, issued by the Korean Intellectual Property Office in counterpart Korean application No. 10-2016-0029849.

(56) References Cited

OTHER PUBLICATIONS

Communication dated May 31, 2016, issued by the Korean Intellectual Property Office in counterpart Korean Application No. 10-2015-0026080.
Communication dated Jul. 6, 2016, issued by the Taiwanese Patent Office in counterpart Taiwanese Application No. 104116494.
Communication dated Aug. 2, 2016, issued by the European Patent Office in counterpart European Application No. 15735832.6.
Communication dated Aug. 8, 2016, issued by the Korean Intellectual Property Office in counterpart Korean Application No. 10-2016-0029849.
Communication dated Jul. 29, 2015, issued by the International Searching Authority in counterpart International Application No. PCT/KR2015/005142.
Khalilbeigi et al., "FoldMe: Interacting with Double-sided foldable displays". In Proceedings of the Sixth International Conference on Tangible, Embedded and Embodied Interaction, Feb. 19, 2012, pp. 33-40. (Year: 2012).
Office Action dated Mar. 29, 2023 by the China National Intellectual Property Administration in corresponding Chinese Patent Application No. 202010222887.4.
Communication dated Apr. 19, 2023 by the Indian Patent Office for Indian Patent Application No. 1971/MUMNP/2015.
Communication issued on Oct. 7, 2023 by the China National Intellectual Property Administration in Chinese Patent Application No. 202010222887.4.

\* cited by examiner

FIG. 45

| LIST OF RELATED APPLICATIONS | |
| --- | --- |
| FIRST APPLICATION | SECOND APPLICATION |
| BOOK | DICTIONARY |
| BOOK | NOTE |
| PHONE | CONTACTS |
| CAMERA | PHOTO ALBUM |
| SNS | PHOTO ALBUM |
| BANKING | CALCULATOR |
| ⋮ | ⋮ |

FOLDABLE DEVICE AND METHOD OF CONTROLLING THE SAME

RELATED APPLICATIONS

This application is a continuation application of U.S. patent application Ser. No. 14/721,210, filed on May 26, 2015, which claims priority from Korean Patent Application No. 10-2014-0062544, filed on May 23, 2014 in the Korean Intellectual Property Office, Korean Patent Application No. 10-2014-0127683, filed on Sep. 24, 2014 in the Korean Intellectual Property Office, and Korean Patent Application No. 10-2015-0026080, filed on Feb. 24, 2015 in the Korean Intellectual Property Office, the disclosures of which are incorporated herein in their entireties by reference.

BACKGROUND

1. Field

Apparatuses and methods consistent with exemplary embodiments relate to a foldable device and a method of controlling the same.

2. Description of the Related Art

As display-related technologies have been developed, flexible display apparatuses, transparent display apparatuses, or the like have been developed. Since the user may fold or unfold the flexible display apparatus, an exposed surface area of an electronic device screen may vary significantly.

Flexible display apparatuses may be an organic light-emitting diode (OLED) display apparatus, a liquid crystal display (LCD) apparatus, or the like. A flexible display apparatus may be manufactured using an LCD apparatus or an OLED display apparatus by using a flexible material, e.g., by replacing a glass substrate with a plastic film. Also, a foldable display device may be manufactured using an LCD apparatus or an OLED display apparatus by using a flexible material in a foldable part thereof.

Applications for foldable display devices are varied. For example, the flexible display device may be used in electronic books that may replace publications including magazines, textbooks, comic books, or the like, and portable information technology (IT) products, such as an ultra-small personal computer (PC) that may be carried while its display is folded or rolled, a smart card allowing real-time information confirmation, or the like. Accordingly, there is an increasing demand for the development of an interface capable of reflecting a characteristic of the flexible display device and using merits of the flexible display device.

SUMMARY

One or more exemplary embodiments provide a device having a flexible characteristic in which a user may conveniently view a plurality of application screens.

Further, one or more exemplary embodiments provide a flexible device in which a user may easily use related functions.

Further still, one or more exemplary embodiments provide a flexible device in which a user may view an application screen for a current situation by simply folding or unfolding the flexible device.

According to an aspect of an exemplary embodiment, there is provided a foldable device including: a flexible display configured to display an execution screen of an application; and a controller configured to control the flexible display to display an execution screen of at least one first application on a first surface of the flexible display that is used as a display of the foldable device when the flexible display is folded, and control, in response to the flexible display being unfolded, the flexible display to display the execution screen of the at least one first application and an execution screen of at least one second application related to the at least one first application to be displayed on a second surface of the flexible display that is used as a display of the foldable device when the flexible display is unfolded.

The foldable device may further include a user interface configured to receive an input of a user's selection and the controller may be further configured to control the flexible display to, while the flexible display is folded, co-display the execution screen of the at least one first application and a second application selection menu for selecting the at least one second application, and to determine the at least one second application according to the user's selection via the second application selection menu.

The foldable device may further include a user interface configured to receive an input of a user's selection, and the controller may be further configured to control the flexible display to, while the execution screen of the at least one first application is displayed, display both the execution screen of the at least one first application and a second application selection menu for selecting the at least one second application, and to determine the at least one second application according to the user's selection via the second application selection menu.

The controller may be further configured to determine the at least one second application based on a pre-stored list of related applications.

The controller may be further configured to determine the at least one second application based on an input with respect to the at least one first application.

The controller may be further configured to determine an application related to a notification event that occurs in the foldable device as the at least one second application.

The controller may be further configured to determine the at least one second application based on an application use history of a user.

The controller may be further configured to determine a user-set application as the at least one second application.

The second surface of the flexible display may be disposed on an opposite side of the flexible display to the first surface of the flexible display.

The foldable device may further include a state detector configured to detect a partially-folded state in which at least one portion of the second surface is folded to face towards a same side as the first surface.

The controller may be further configured to control the flexible display to, in response to the state detector detecting the partially-folded state, display the execution screen of the at least one first application on the first surface of the flexible display that is used as a display of the foldable device in the partially-folded state, and the execution screen of the at least one second application on a region of the at least one portion of the second surface that faces towards the same side as the first surface that is used as the display of the foldable device in the partially-folded state.

According to an aspect of another exemplary embodiment, there is provided a method of controlling a foldable device including: displaying an execution screen of at least one first application on a first surface of the flexible display that is used as a display of the foldable device when the flexible display is folded; and displaying, in response to the flexible display being unfolded, the execution screen of the at least one first application and an execution screen of at least one second application related to the at least one first application on a second surface of the flexible display that is used as a display of the foldable device when the flexible display is unfolded.

The method may further include: co-displaying, while the flexible display is folded, the execution screen of the at least one first application and a second application selection menu for selecting the at least one second application; receiving an input of a user's selection via the second application selection menu; and determining the at least one second application according to the user's selection.

The displaying of the execution screen of the at least one first application may include co-displaying the execution screen of the at least one first application and a second application selection menu for selecting the at least one second application.

The method may further include: receiving an input of a user's selection via the second application selection menu; and determining the at least one second application according to the user's selection.

The method may further include determining the least one second application based on a pre-stored list of related applications.

The method may further include determining the least one second application based on an input with respect to the at least one first application.

The method may further include determining an application related to a notification event that occurs in the foldable device as the at least one second application.

The method may further include determining the at least one second application based on an application use history of a user.

The method may further include determining a user-set application as the at least one second application.

The method may further include: detecting a partially-folded state in which at least one portion of the second surface is folded to face towards a same side as the first surface; displaying, in response to the partially-folded state being detected, the execution screen of the at least one first application on the first surface of the flexible display that is used as a display of the foldable device in the partially-folded state; and displaying the execution screen of the at least one second application on a region of the at least one portion of the second surface that faces toward the same side as the first surface that is used as the display of the foldable device in the partially-folded state.

According to an aspect of another exemplary embodiment, there is provided a foldable device including: a first display disposed on a first surface of the foldable device; a second display disposed on a second surface of the foldable device; a sensor configured to detect a folding state of the foldable device; and a controller configured to control the first display to display a first application while the flexible display is folded, and control the second display to, in response to the flexible display being unfolded, display the first application and a second application.

The controller may be further configured to, in response to the flexible display being unfolded, select the second application to be displayed based on the first application.

The foldable device may be further configured to be partially folded such that a portion of the first display is overlapped by a portion the second display and another portion of the first display is not overlapped by the second display, and the controller may be further configured to, is response to the foldable device being partially folded, control the second display to display the second application on the portion of the second display overlapping the first display.

The controller may be further configured to, is response to the foldable device being partially folded, adjust a screen size of the first application to correspond to the another portion of the first display and control the first display to display the first application on the another portion of the first display.

The foldable device may be further configured to be partially folded into a multi-region folded state of the foldable device comprises a plurality of portions of the second display folded to overlap with non-contiguous portions of the first display, another portion of the first display is not overlapped by the second display.

The controller may be further configured to, in response to the flexible display being in the multi-region folded state, control the first display to display the first application on the another portion of the first display and control the second display to display the second application on at least one of the plurality of portions overlapping the first display.

The controller may be further configured to, in response to the flexible display being in the multi-region folded state, control the second display to display the second application on a first portion of the plurality of portions overlapping the first display and display a third application on a second portion of the plurality of portions overlapping the first display.

Additional aspects will be set forth in part in the description which follows and, in part, will be apparent from the description, or may be learned by practice of one or more exemplary embodiments.

BRIEF DESCRIPTION OF THE DRAWINGS

The above and/or other aspects will become apparent and more readily appreciated from the following description of certain exemplary embodiments, taken in conjunction with the accompanying drawings in which:

FIG. 45 is a list of related applications, according to an exemplary embodiment;

DETAILED DESCRIPTION

Advantages and features of exemplary embodiments and methods of accomplishing the same may be understood more readily by reference to the following detailed description of certain exemplary embodiments and the accompanying drawings. The inventive concept may, however, be embodied in many different forms and should not be construed as being limited to one or more exemplary embodiments set forth herein. Rather, these one or more exemplary embodiments are provided so that this disclosure will be thorough and complete and to fully convey the concept of one or more exemplary embodiments to those skilled in the art, and the inventive concept will only be defined by the appended claims and their equivalents.

All terms including descriptive or technical terms which are used herein should be construed as would one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention.

Throughout the specification, when a part "includes" or "comprises" an element, unless there is a particular description contrary thereto, the part can further include other elements. Also, throughout the specification, the term 'unit' means a software component, a hardware component, or a combination of software and hardware components, such as a field-programmable gate array (FPGA) or an application-specific integrated circuit (ASIC), and performs a specific function. However, the term 'unit' is not limited to software or hardware. The 'unit' may be formed so as to be in an addressable storage medium, or may be formed so as to operate on or in one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, databases, data structures, tables, arrays, or variables. A function provided by the components and 'units' may be associated with the smaller number of components and 'units', or may be divided into additional components and 'units'.

Throughout the specification, a 'foldable device' means a foldable electronic device, a device or an electronic device.

Figure 1A:
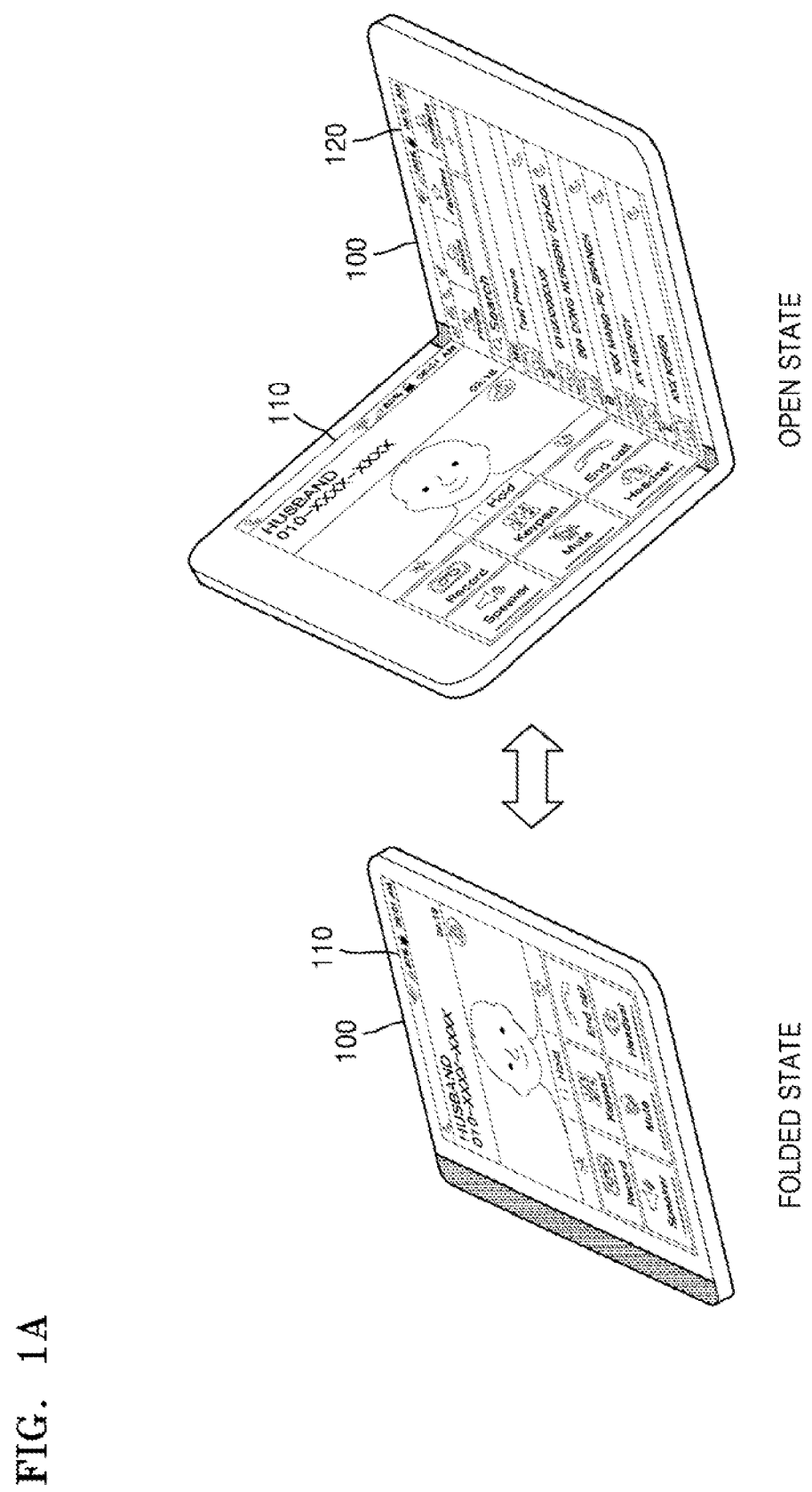
FIG. 1A illustrates a foldable device using a hinge according to an exemplary embodiment.
Figure 1B:
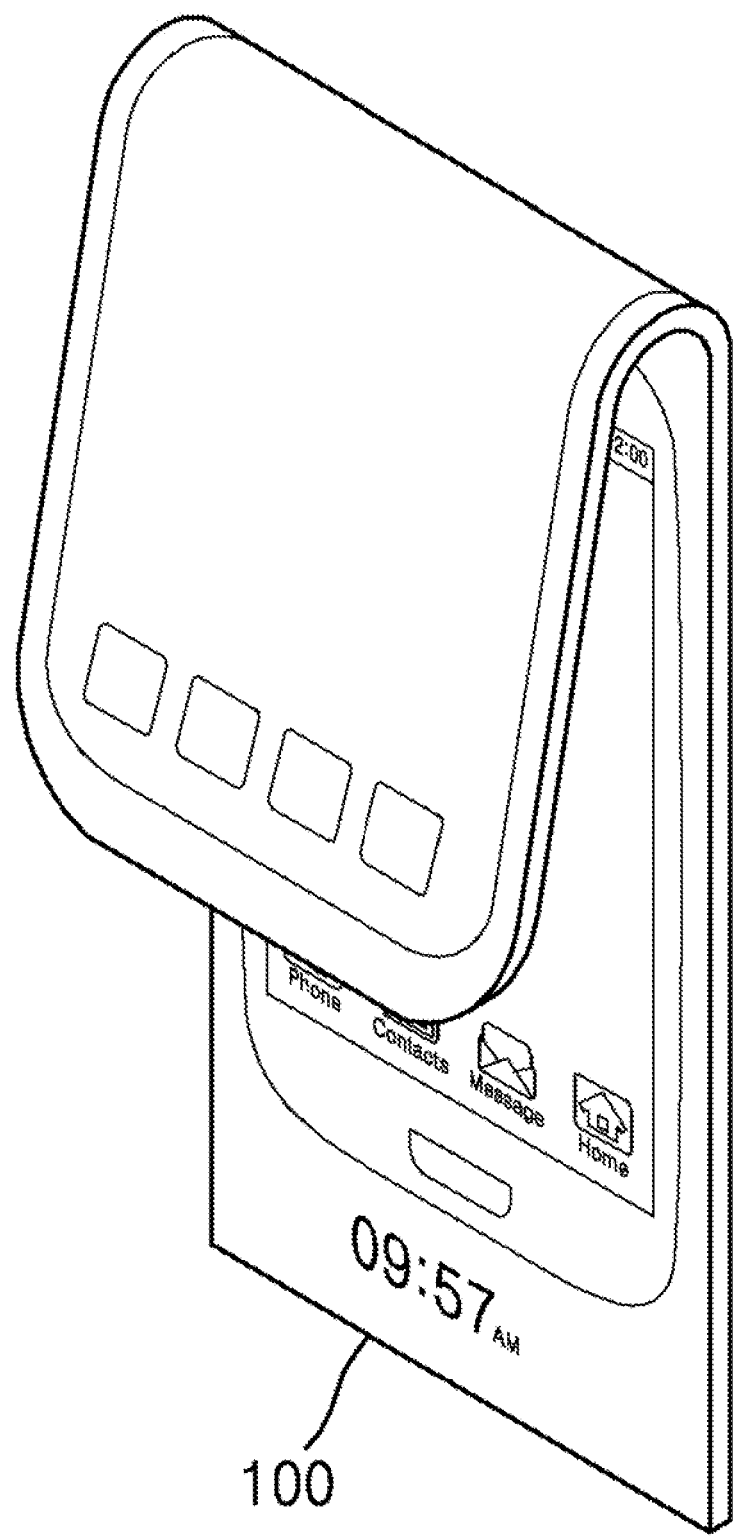
FIG. 1B illustrates a bendable device according to another exemplary embodiment.
Figure 2:
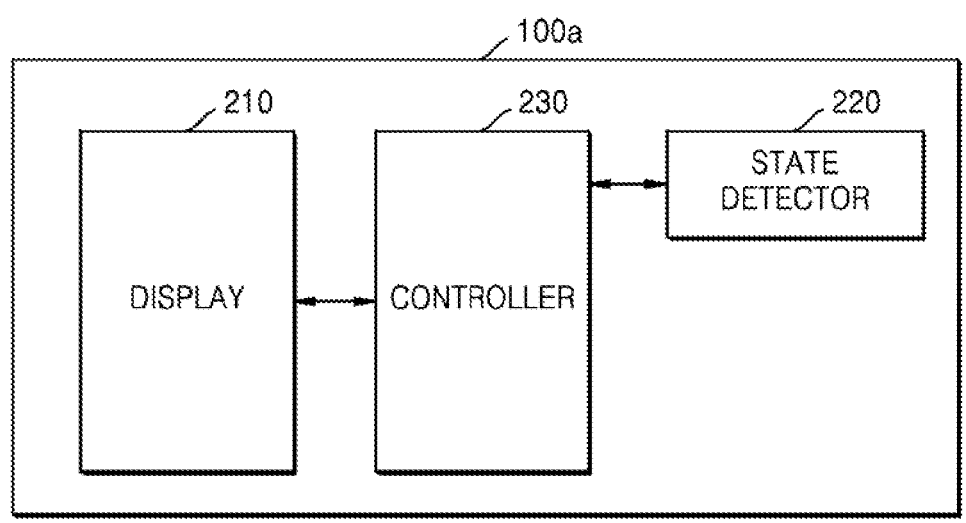
FIG. 2 is a block diagram of a device, according to an exemplary embodiment.

Also, the term 'is folded' may mean that a flat electronic device is deformed, so that two facing surfaces of the electronic device approach each other to the extent that they almost contact each other (refer to FIGS. 1 and 2). A flat electronic device may be deformed by being folded or by being bent using a hinge.

For example, when a hinge is mounted at the foldable device 100, the foldable device 100 may be folded in a manner that two surfaces of the foldable device 100 are folded by using the hinge to the extent that the two surfaces contact or almost contact each other and become parallel or almost parallel. Also, when the foldable device 100 is formed of a flexible material, the foldable device 100 may be folded at a random line to the extent that two surfaces of the foldable device 100 approach each other and become parallel.

One or more exemplary embodiments will now be described more fully with reference to the accompanying drawings, in which certain exemplary embodiments are shown. In the following description, well-known functions or constructions are not described in detail since they would obscure the disclosure with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, the term "co-display or (are) co-displayed" is used when a device simultaneously displays a screen of an A application and a screen of a B application or when a screen of an A application and a screen of a B application are simultaneously displayed on a device.

FIG. 1A illustrates the device 100, i.e., an electronic device 100, that is folded using a hinge according to an exemplary embodiment.

The device 100 may be the foldable electronic device 100 that is folded using the hinge, as shown in FIG. 1A.

The device 100 may be used in a folded state may be used in an open state, as shown in FIG. 1A.

The device 100 may switch its screen according to a state of the device 100. Throughout the specification, a state of an electronic device may be defined to two states that are a folded state and an open state. The folded state and the open state will be described in greater detail later.

Also, throughout the specification, a state of the electronic device 100 is changed from the open state to the folded state via a folding motion. The state of the electronic device 100 is changed from the folded state to the open state via an unfolding motion.

According to one or more exemplary embodiments, the device 100 may include a smartphone, a tablet personal computer (PC), a notebook, a wearable device, an electronic book, or the like.

In an exemplary embodiment, while an execution screen 110 of a first application is displayed on the device 100, if the device 100 detects the folding motion or the unfolding motion, the device 100 may co-display the execution screen 110 of the first application and an execution screen 120 of a second application. The second application may vary according to various exemplary embodiments.

Throughout the specification, "an execution screen of a first application", "a first application screen" or "a screen of a first application" means a screen that is displayed, on a display, as a result of executing the first application. Also, "an execution screen of a second application", "a second application screen" or "a screen of a second application" means a screen that is displayed, on the display, as a result of executing the second application. Referring to FIG. 1A, areas of two surfaces that face each other when the device 100 is in the folded state are the same. Thus, the device 100 may be symmetrically folded, but this is merely an example and the areas of the two surfaces that face each other in the folded state may be different. Thus, the device 100 may be asymmetrically folded.

FIG. 1B illustrates a device 100 that is folded by being bent according to another exemplary embodiment.

As illustrated in FIG. 1B, the device 100 may be bent at a random line, and since the device 100 is bent, a region where the random line exists may be bent by a preset degree. Also, when two surfaces that face each other since the device 100 is bent become parallel, the device 100 may be in the folded state.

FIG. 2 is a block diagram a device 100a, according to another exemplary embodiment.

The device 100a includes a display 210, i.e., a display unit, a state detector 220, i.e., a state detecting unit, and a controller 230, i.e., a control unit.

The display 210 displays a screen of an application that is executed by the controller 230, a user interface screen, or a screen showing a state of the device 100a. The controller 230 executes at least one application, and controls the display 210 to display a screen of the at least one executed application on the display 210. While an execution screen of at least one first application is displayed, if the controller 230 detects a folding motion or an unfolding motion with respect to the device 100a, the controller 230 co-displays the execution screen of the at least one first application and an execution screen of at least one second application.

For example, as illustrated in FIG. 1A, while the device 100a in a folded state displays an execution screen of a first application 110, if the device 100a is unfolded and thus the controller 230 detects a unfolding motion, the device 100a may co-display the execution screen of the first application 110 and an execution screen of a second application 120.

In one or more exemplary embodiments, when the execution screen of the first application and the execution screen of the second application are displayed in a folded state and an open state, the execution screens may display same contents and only sizes of the execution screens may vary.

In one or more exemplary embodiments, when the execution screen of the first application and the execution screen of the second application are displayed in the folded state and the open state, a layout of each execution screen may become different. For example, according to the folded state or the open state, a position or a size of a menu on each screen may become different or a position or a size of an icon may become different.

The controller 230 may generally control operations of the device 100a. For example, the controller 230 may execute and may control an operating system (OS) of the device 100a, may process various types of data, and may control elements of the device 100a including the display 210, the state detector 220, or the like.

The state detector 220 detects the folding motion and the unfolding motion with respect to the device 100a.

In one or more exemplary embodiments, the state detector 220 may detect a motion by which a state of the device 100a is changed from the folded state to the open state or a motion by which the state of the device 100a is changed from the open state to the folded state.

Figure 78:
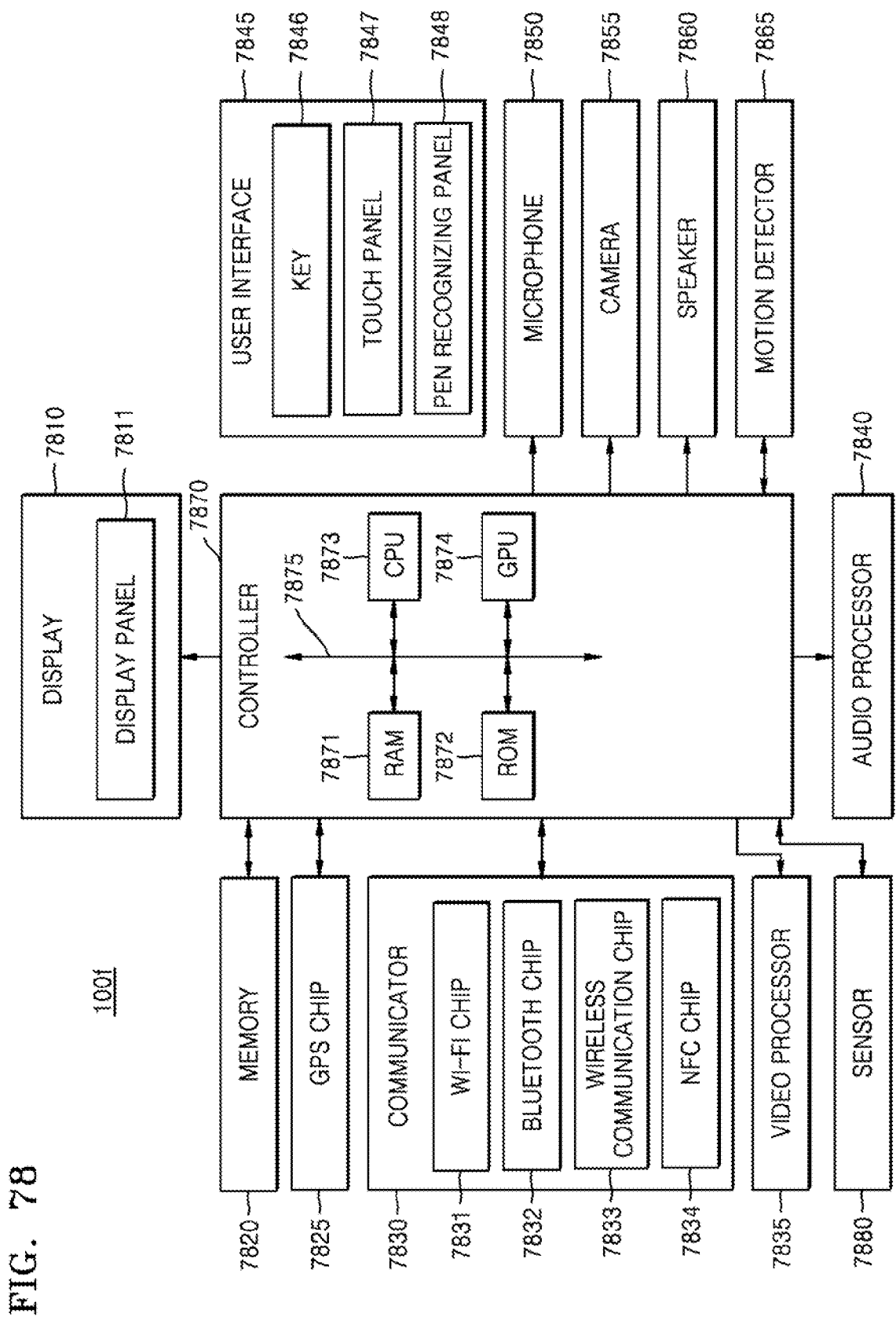
FIG. 78 illustrates a block diagram of a device, according to an exemplary embodiment.

The device 100 may include a sensor 7880, i.e., a sensor (refer to FIG. 78). The sensor 7880 may sense a state of the device 100, a movement of the device 100, or a state around the device 100, and may transfer sensed information to the controller 230.

The sensor 7880 may include at least one of a magnetic sensor, an acceleration sensor, a hall sensor, a bending sensor, a gyroscope sensor, a proximity sensor, a temperature/humidity sensor, an infrared sensor, a position sensor (e.g., a global positioning system (GPS)), an air pressure sensor, and an RGB sensor (i.e., a luminance sensor), but one or more exemplary embodiments are not limited thereto. Functions of the sensors may be understood by one of ordinary skill in the art based on the names of the sensors or are known in the related art.

In one or more exemplary embodiments, the state detector 220 of the device 100a may detect, by using the sensor 7880, a motion by which a state of the device 100a is changed to the open state or the folded state. For example, the state detector 220 may detect the folding motion or the unfolding motion by using a hall sensor or a magnetic sensor arranged in a folded region.

In one or more exemplary embodiments, the state detector 220 may detect whether a current state of the device 100a is an open state or a folded state, and, when the current state is changed, the state detector 220 may detect a folding motion or an unfolding motion.

In one or more exemplary embodiments, the state detector 220 may measure a bend angle or a folded angle of the device 100a. If the device 100a has a hinge, the state detector 220 may measure the folded angle of the hinge.

In one or more exemplary embodiments, a state detecting sensor is included at regions of the device 100a that approach each other when the device 100a is bent or is folded, and thus the state detector 220 may detect the folded state. The state detecting sensor may include at least one of a proximity sensor, an illuminance sensor, a magnetic sensor, a hall sensor, a touch sensor, a bending sensor, and an infrared sensor, or a combination thereof.

In one or more exemplary embodiments, the state detector 220 may determine whether the device 100a is in the folded state or the open state, and may provide a determination result to the controller 230. In this case, the controller 230 may not need to separately determine the folded state or the open state, and may recognize whether the state of the device 100a is the folded state or the open state, according to an output from the state detector 220.

In one or more exemplary embodiments, when the state detector 220 provides, to the controller 230, information about the bent angle or the folded angle or sensing information obtained by the state detecting sensor, the controller 230 may determine the folded state or the open state of the device 100a.

Figure 3:
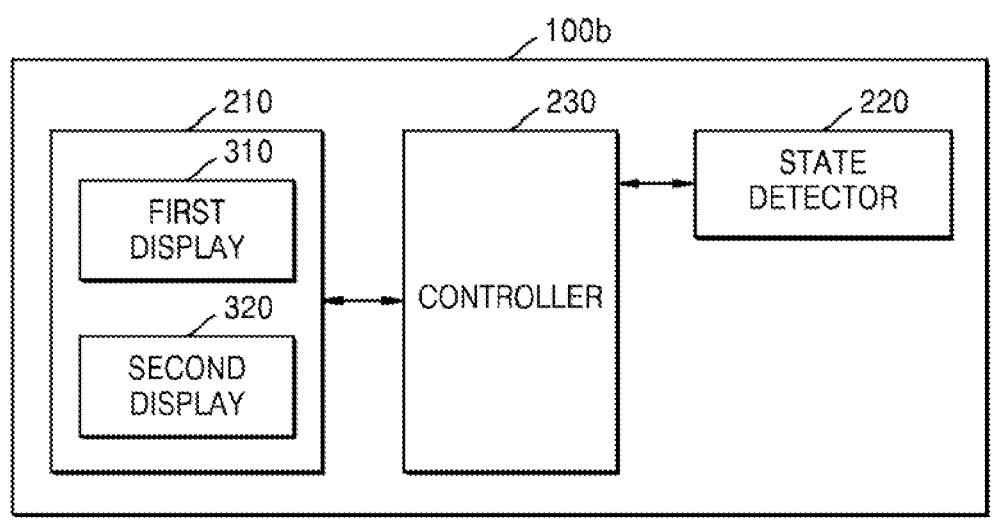
FIG. 3 is a block diagram of a device, according to another exemplary embodiment.

FIG. 3 is a block diagram of a device 100b, according to another exemplary embodiment.

The device 100b may include a first display 310 and a second display 320. The first display 310 and the second display 320 may be distinguished from each other in a hardware manner or a software manner.

For example, the first display 310 and the second display 320 may be two hardware screens. The first display 310 and the second display 320 may be disposed at any surfaces of the foldable device 100b, respectively, in a same direction. Also, the first display 310 may be disposed at a front surface of the foldable device 100b, and the second display 320 may be disposed at a rear surface of the foldable device 100b.

In one or more exemplary embodiments, the first display 310 and the second display 320 may be one physical element including two different regions as software.

One display formed at one surface of the foldable device 100b may be divided into at least two software regions, and the at least two software regions may function as display parts, respectively. For example, a hardware screen arranged at a front surface of the foldable device 100b may be divided into at least two software regions, and the at least two software regions may be the first display 310 and the second display 320, respectively.

Also, a portion of a hardware screen arranged on the front surface of the foldable device 100b may be the first display 310, and a portion of a hardware screen arranged at a rear surface of the foldable device 100b may be the second display 320.

Where a display is software, a position and size of the display may be changed according to whether the foldable device 100b is folded or rolled. The position or size of the display may be changed dynamically.

While FIG. 3 illustrates two displays, i.e., the first display 310 and the second display 320, in one or more exemplary embodiments, the foldable device 100b may include at least three displays.

The controller 230 may control the first application screen and the second application screen to be displayed on at least one of the first display 310 and the second display 320. In one or more exemplary embodiments, the first application screen may be displayed on the first display 310, and the second application screen may be displayed on the second display 320.

Figure 4:
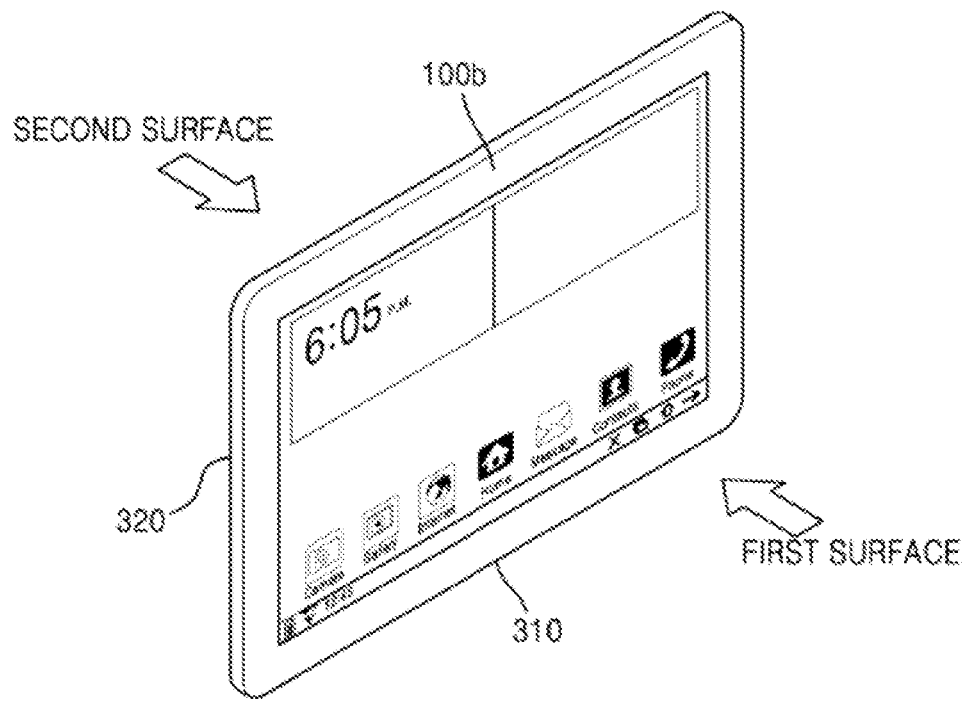
FIG. 4 illustrates disposition of a first display and a second display, according to an exemplary embodiment.

FIG. 4 illustrates a disposition of the first display 310 and the second display 320, according to an exemplary embodiment.

As illustrated in FIG. 4, when a front surface of the device 100b is a first surface, and a rear surface of the device 100b is a second surface, the first display 310 may be disposed on the first surface of the electronic device 100b, and the second display 320 may be disposed on the second surface of the electronic device 100b.

Each of the first display 310 and the second display 320 may correspond to a portion of a surface of the electronic device 100b or may correspond to an entire portion of the surface. In one or more exemplary embodiments, the first display 310 may be disposed as one body on the first surface of the device 100b, or may be divided into a plurality of regions and may be disposed on the first surface of the device 100b. In one or more exemplary embodiments, the second display 320 may be disposed as one body on the second surface of the device 100b, or may be divided into a plurality of regions and may be disposed on the second surface of the device 100b.

Figure 5:
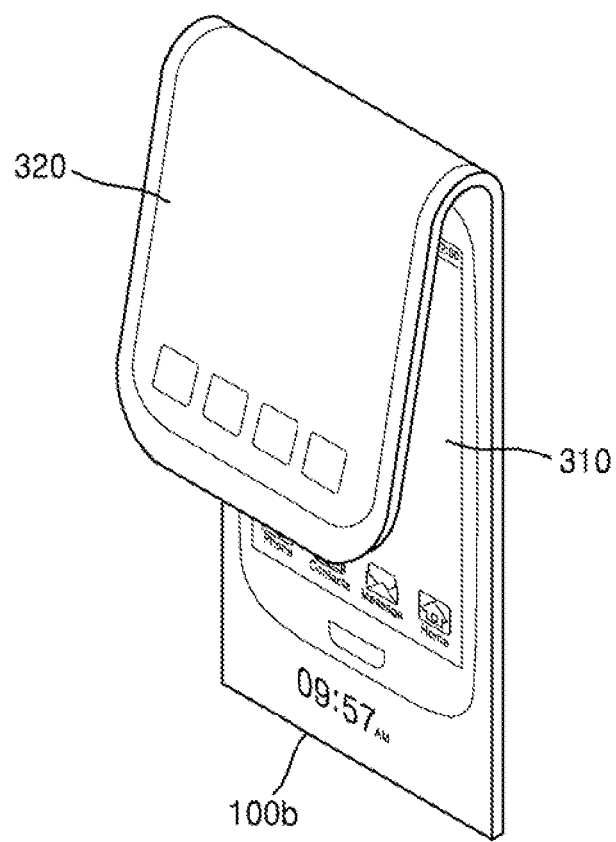
FIG. 5 illustrates a foldable device according to an exemplary embodiment.

FIG. 5 illustrates the device 100 that is embodied to have a foldable structure according to an exemplary embodiment.

The device 100 may be embodied in such a manner that elements of the device 100 including the first display 310, the second display 320, the controller 230, a housing, or the like are flexible. In one or more exemplary embodiments, only some elements (e.g., the housing, etc.) of the device 100 may be flexible, and other elements (e.g., a battery, etc.) may be rigid.

The display 210 may be embodied to have at least one of a foldable structure, a flexible structure, and a rigid structure. Also, the first display 310 may be foldable, and the second display 320 may be rigid.

When the display 210 has a foldable characteristic, a folded region of the display 210 may be disposed to match with a folded region of the device 100.

When the display 210 has a flexible characteristic, the display 210 may be freely disposed on the device 100.

When the display 210 has a rigid characteristic, the display 210 may be disposed at a region of the device 100, except for the foldable region or a bendable region of the device 100.

FIGS. 6 through 11 illustrate displays that are physically distinguished therebetween, according to various exemplary embodiments.

The displays may be flexible displays.

The device 100 including the flexible displays may be deformed by using a hinge or by being bendable. The device 100 may be folded via the deformation. In FIGS. 6 through 11, when the device 100 is folded by, a folded region 610 may indicate a portion that is deformed by being folded.

Figure 6:
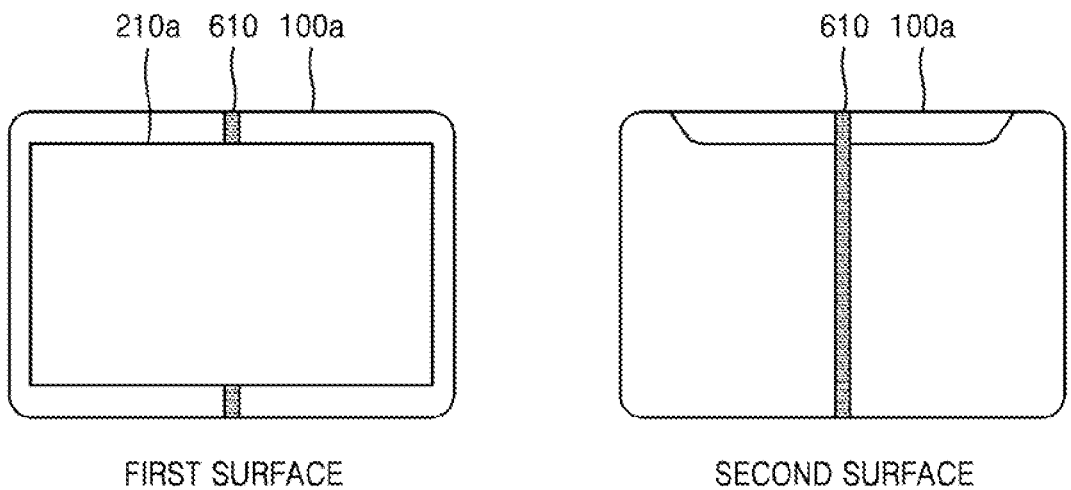
FIGS. 6 through 11 illustrate displays that are physically distinguished from each other, according to various exemplary embodiments.

As illustrated in FIG. 6, a display 210a may be one body so as to span across a folded region 610 at a first surface of the device 100a. The display 210a may be a foldable display or a flexible display. The display may not be disposed at a second surface of the device 100a.

A folding motion may be defined as a motion by which the first surface is exposed, and two regions of the second surface that is divided due to the folded region 610 are folded so as to face each other. An unfolding motion may be defined as a motion by which the device 100a is unfolded after the device 100a was folded.

Figure 7:
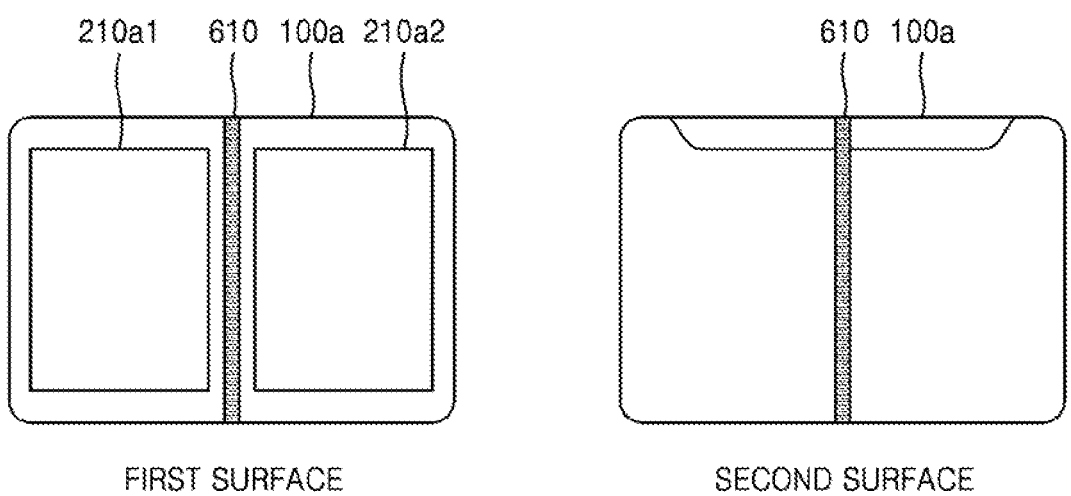

FIG. 7 illustrates structures of displays 210a1 and 210a2, according to another exemplary embodiment.

The displays 210a1 and 210a2 may be disposed at two regions of a first surface of the device 100a, wherein the two regions do not overlap a folded region 610. Therefore, the regions are divided by the folded region 610. Each of the displays 210a1 and 210a2 may be at least one of a foldable display device, a flexible display device, and a rigid display device.

A folding motion may be defined as a motion by which the first surface is exposed, and two regions of the second surface that is divided by the folded region 610 are folded so as to face each other. An unfolding motion may be defined as a motion by which the device 100a is unfolded after the device 100a was folded.

Figure 8:
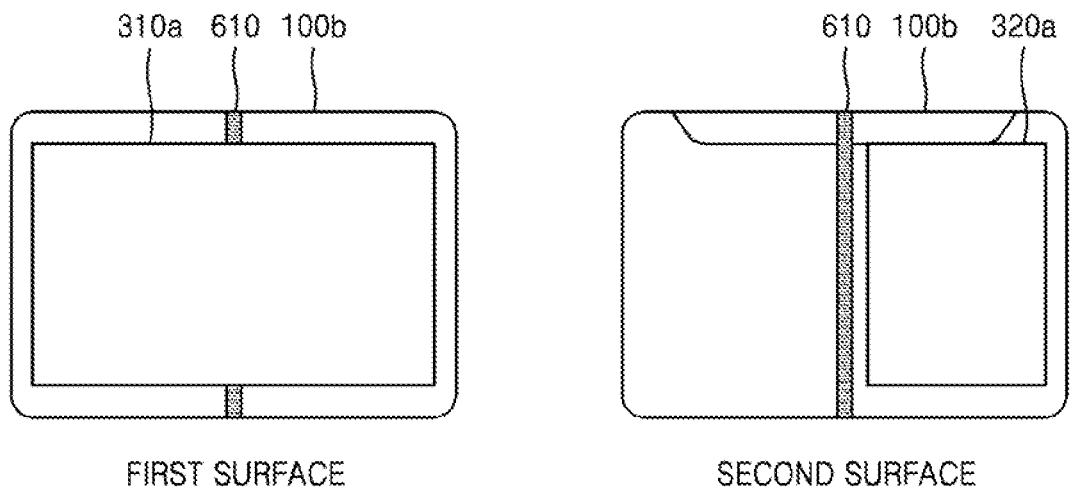

FIG. 8 illustrates a first display 310a and a second display 320a, according to another exemplary embodiment.

The first display 310a may be one body so as to span across a folded region 610 at a first surface of the device 100b. The second display 320a may be disposed at one of two regions of a second surface of the device 100b, wherein the two regions are separated by the folded region 610. The first display 310a may be a foldable display device or a flexible display device. The second display 320a may be at least one of a foldable display device, a flexible display device, and a rigid display device.

Figure 9:
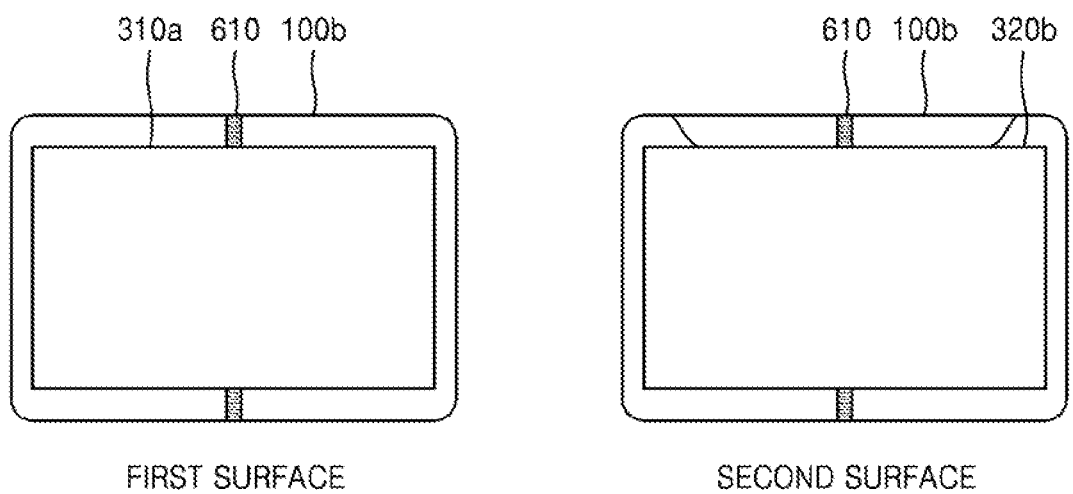

FIG. 9 illustrates structures of a first display 310a and a second display 320b, according to another exemplary embodiment.

The first display 310a may be one body so as to span across a folded region 610 at a first surface of the device 100b. The second display 320b may be one body so as to span across the folded region 610 at a second surface of the device 100b. Each of the first display 310a and the second display 320b may be a foldable display device or a flexible display device.

Figure 10:
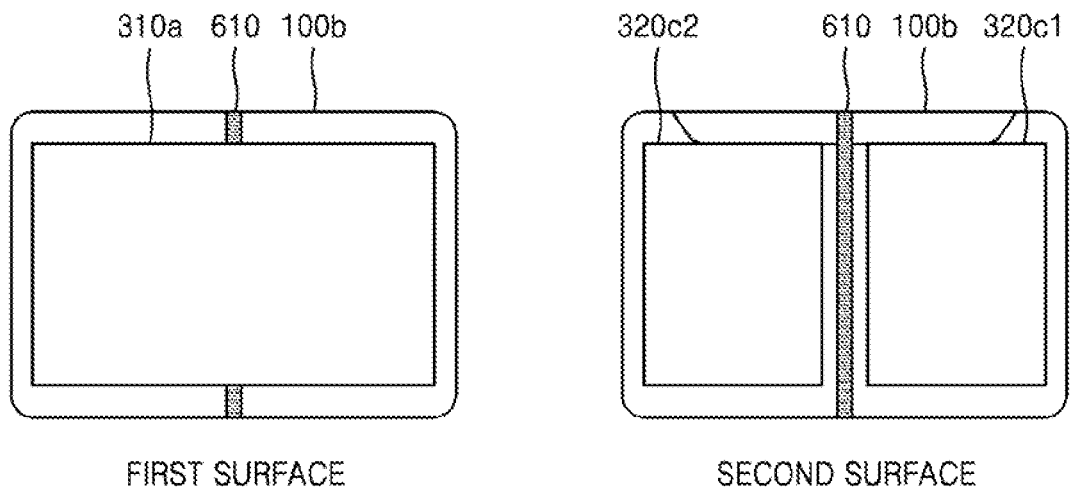

FIG. 10 illustrates structures of a first display 310a and second displays 320c1 and 220c2, according to another exemplary embodiment.

The first display 310a may be one body so as to span across a folded region 610 at a first surface of the device 100b. The second displays 320c1 and 220c2 may be disposed at two regions of a second surface of the device 100b, wherein the two regions separated by the folded region 610. The first display 310a may be a foldable display device or a flexible display device. Each of the second displays 320c1 and 220c2 may be at least one of a foldable display device, a flexible display device, and a rigid display device.

Figure 11:
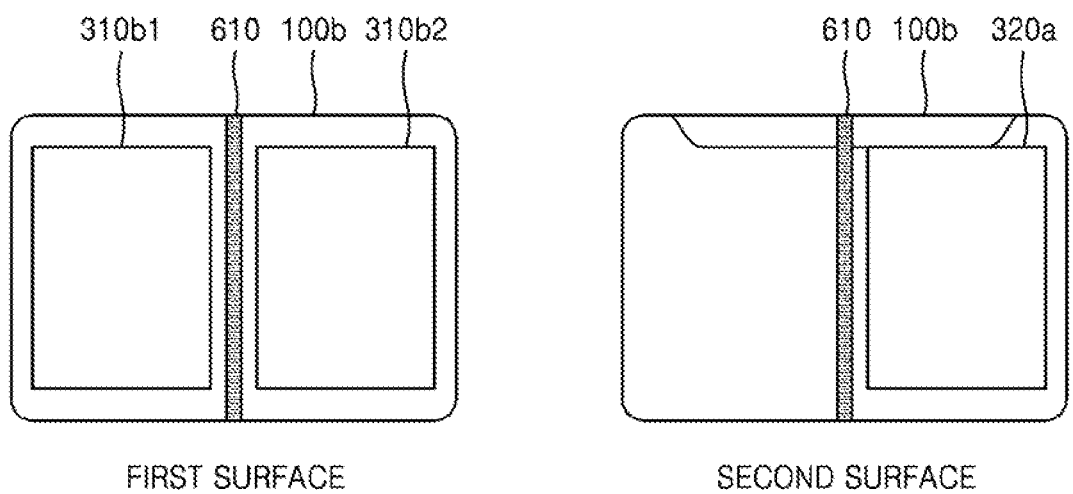

FIG. 11 illustrates structures of first displays 310b1 and 310b2 and a second display 320a, according to another exemplary embodiment.

The first displays 310b1 and 310b2 may be disposed at two regions of a first surface of the device 100b, respectively, wherein the two regions do not meet a folded region 610 and are divided by the folded region 610. The second display 320a may be disposed at one of two regions of a second surface of the device 100b, wherein the two regions are separated by the folded region 610. Each of the first displays 310b1 and 310b2 and the second display 320a may be at least one of a foldable display device, a flexible display device, and a rigid display device.

Figure 12:
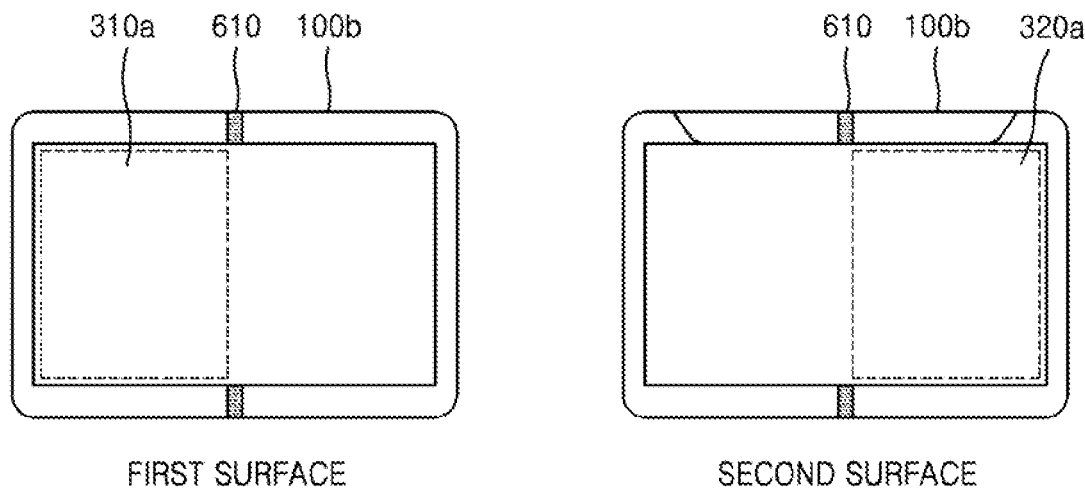
FIGS. 12 and 13 illustrate displays that are distinguished from each other in a software manner, according to various exemplary embodiments.
Figure 13:
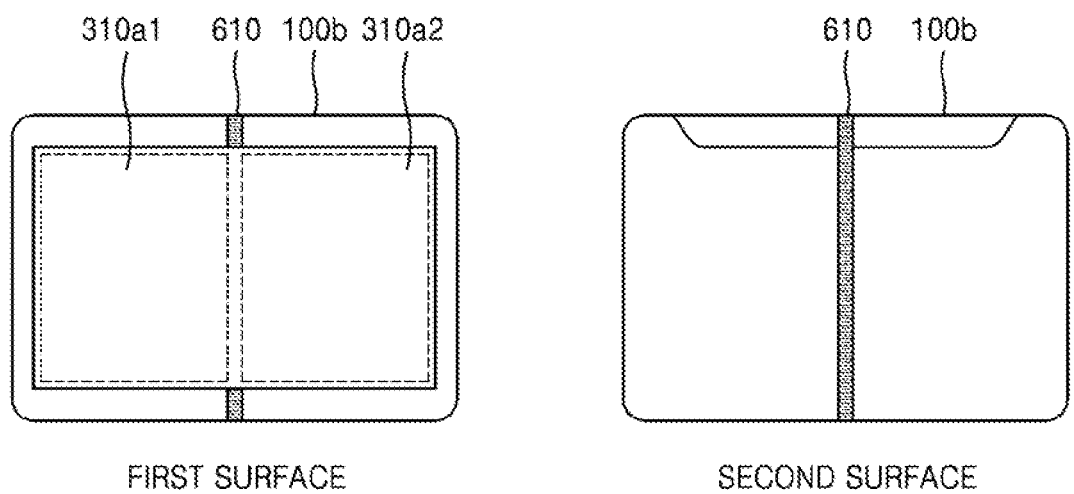

FIGS. 12 and 13 illustrate displays that are distinguished therebetween in a software manner, according to various exemplary embodiments.

As illustrated in FIG. 12, a first display 310a may correspond to a portion of a hardware screen disposed at a first surface of the device 100b. A second display 320a may correspond to a portion of a hardware screen disposed at a second surface of the device 100b.

As illustrated in FIG. 13, a first display 310a1 may correspond to a portion of a hardware screen disposed at a first surface of the device 100b. A second display 310a2 may correspond to a residual region of the hardware screen other than the portion of the first display 310a1.

FIGS. 14A to 14F illustrate folded states of the device 100, according to various exemplary embodiments.

Figure 14A:
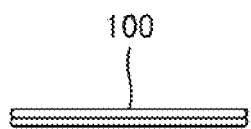
FIGS. 14A to 14F illustrates folded states of a device, according to various exemplary embodiments.
Figure 14B:
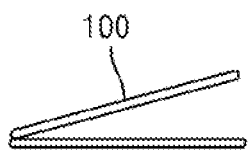
Figure 14C:
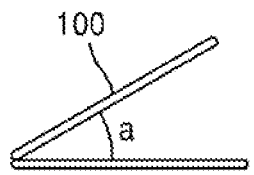
Figure 14D:
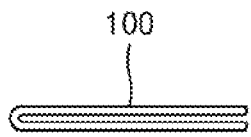
Figure 14E:
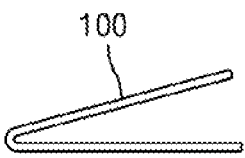
Figure 14F:
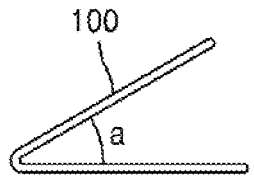

Folded states FIGS. 14A, 14B, and 14C are examples of the foldable device 100 that is folded using a hinge. Folded states FIGS. 14D, 14E, and 14F are examples of the foldable device 100 that is folded by being bent.

A folded state and an open state may be quantized to folded shape evaluation values within a preset range. A folded shape evaluation value may vary according to a structure of the state detector 220. For example, the folded shape evaluation value may be a bent angle of the device 100, a folded angle of the device 100, or a sensing value of the state detecting sensor. For example, the sensing value of the state detecting sensor may be a sensing value of the proximity sensor, a sensing value of the illuminance sensor, a sensing value of the magnetic sensor, a sensing value of the hall sensor, or a sensing value of the touch sensor.

The folded state of the device 100 may be evaluated based on a folded angle of the device 100, but one or more exemplary embodiments are not limited thereto.

The folded state means a state in which the folded angle of the device 100 is within a first range. For example, the folded state may mean a state in which the folded angle of the device 100 is approximately 0 degrees. As illustrated in FIGS. 14A to 14F, the folded angle indicates an angle defined from a vertex where two facing regions meet, which occurs due to folding.

In some exemplary embodiments, the folded state means a state in which a sensing value is within a third range in the proximity sensor, the magnetic sensor, the infrared sensor, or the like, wherein the sensing value indicates a proximity level of two regions due to folding.

A folding line for the device 100 may be preset, so that the device 100 may be folded only at the preset folding line. The number of folded lines may vary according to various exemplary embodiments. For example, the device 100 may be folded in various ways, e.g., the device 100 may be folded two or three times.

In one or more exemplary embodiments, the device 100 may be folded or may be bent at a random point of the device 100. In this case, the device 100 may detect a folded or bent shape by using a sensor.

Figure 15:
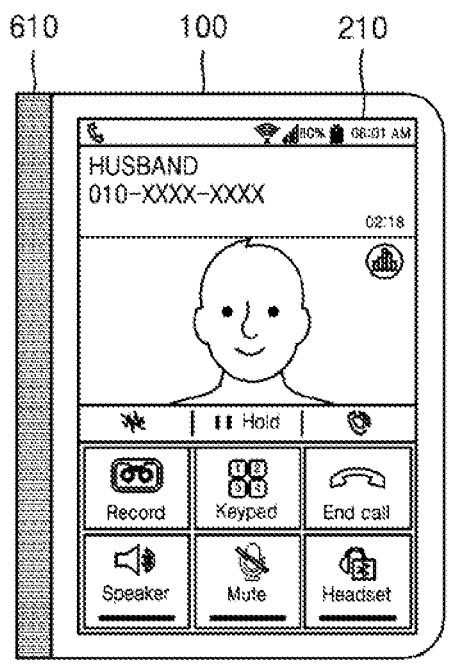
FIG. 15 illustrates a folded state of a device, according to an exemplary embodiment.

FIG. 15 illustrates a folded state of the device 100, according to an exemplary embodiment.

The folded state of the device 100 indicates a state in which the device 100 is folded symmetrically. As illustrated in FIG. 15, the device 100 may be symmetrically folded at a folded region 610. The device 100 may be symmetrically folded by using a hinge. In one or more exemplary embodiments, the device 100 may be symmetrically folded by being bent.

Figure 16:
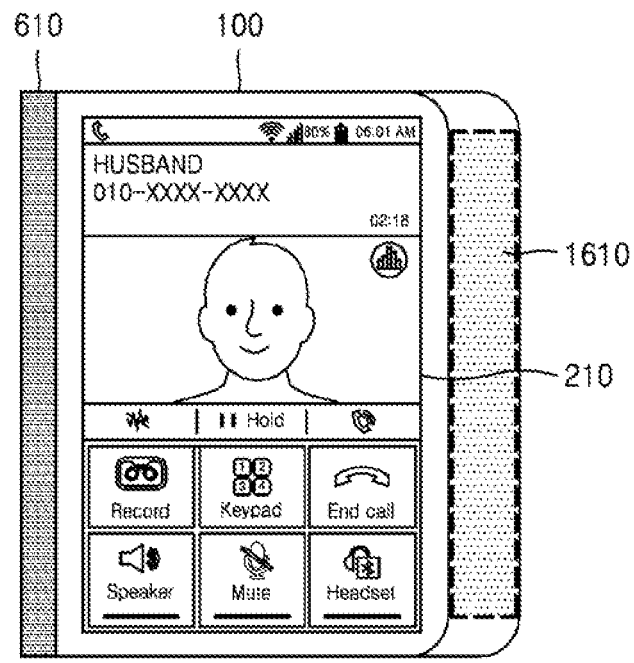
FIG. 16 illustrates a folded state of a device, according to another exemplary embodiment.

FIG. 16 illustrates a folded state of the device 100, according to another exemplary embodiment.

Here, the folded state of the device 100 indicates a state in which the device 100 is asymmetrically folded. As illustrated in FIG. 16, the device 100 may be asymmetrically folded so as to expose a first region 1610. The device 100 may be asymmetrically folded by using a hinge. In one or more exemplary embodiments, the device 100 may be asymmetrically folded by being bent.

In one or more exemplary embodiments, a key button, a portion of a display 210, a touch sensor, or the like may be disposed in the first region 1610.

Figure 17:
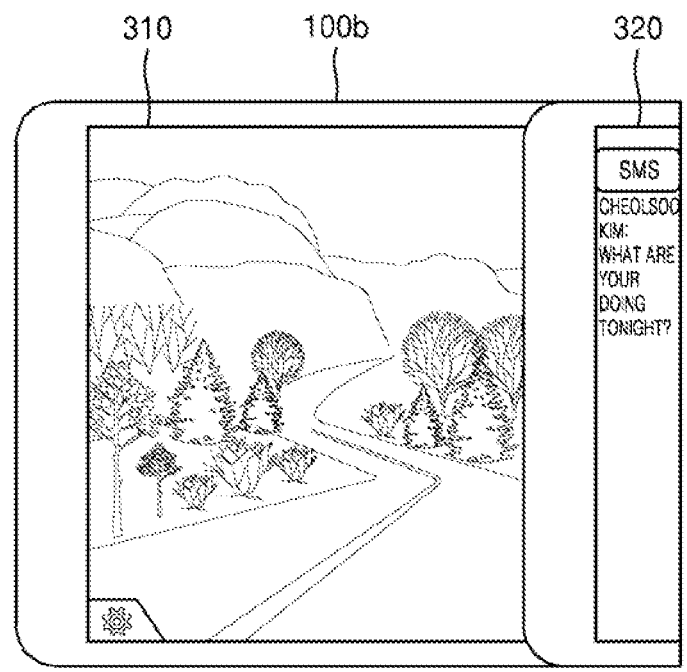
FIG. 17 illustrates a folded state of a device, according to an exemplary embodiment.

FIG. 17 illustrates a folded state of the device 100b, according to an exemplary embodiment.

Here, the folded state of the device 100b indicates a state in which, while one of a first display 310 and a second display 320 of the device 100b is disposed to face a user, a quadrangular portion of the other one of the first display 310 and the second display 320 that does not face the user is asymmetrically folded so as to face the user. For example, as illustrated in FIG. 17, while the first display 310 is disposed to face the user, a portion of the second display 320 may be folded so as to face the user. The device 100b may be asymmetrically folded by using a hinge. In one or more exemplary embodiments, the device 100b may be asymmetrically folded by being bent.

Figure 18:
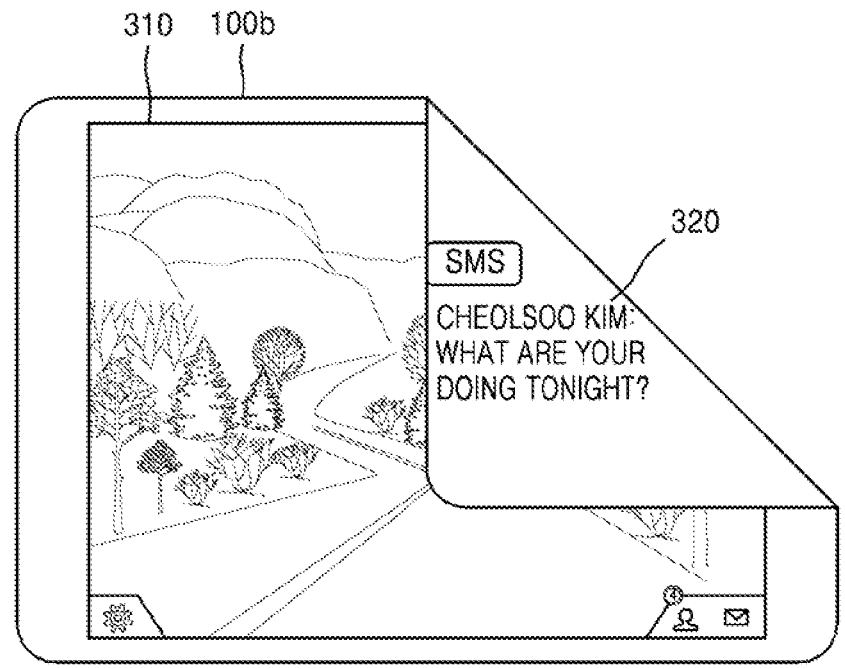
FIG. 18 illustrates a folded state of a device, according to another exemplary embodiment.

FIG. 18 illustrates a folded state of the device 100b, according to another exemplary embodiment.

The folded state of the device 100b indicates a state in which, while one of the first display 310 and the second display 320 of the device 100b is disposed to face a user, a triangular portion of the other one that does not face the user is asymmetrically folded so as to face the user. For example, as illustrated in FIG. 18, while the first display 310 is disposed to face the user, a triangular portion of the second display 320 may be folded into a triangle so as to face the user.

The device 100b may be asymmetrically folded by using a hinge or by being bent.

Figure 19:
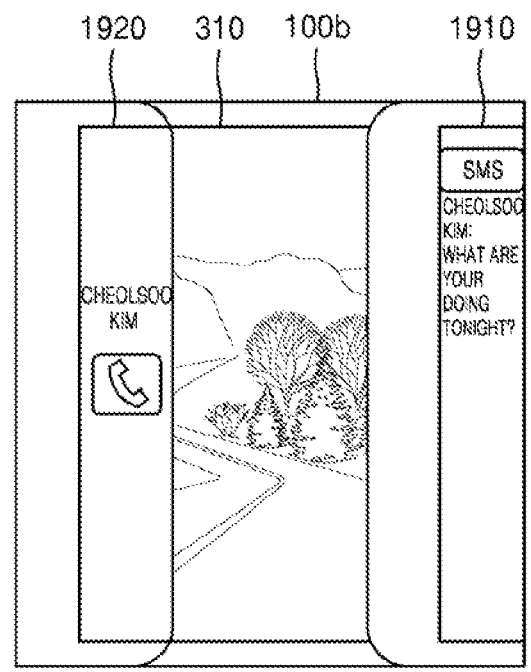
FIG. 19 illustrates a folded state of a device, according to another exemplary embodiment.

FIG. 19 illustrates a folded state of the device 100b, according to another exemplary embodiment.

The folded state of the device 100b indicates a state in which, while one of the first display 310 and the second display 320 of the device 100b is disposed to face a user, portions of the other one of the first display 310 and the second display does not face the user and are folded so as to be exposed in a plurality of regions. For example, as illustrated in FIG. 19, while the first display 310 is disposed to face the user, a third region 1910 and a fourth region 1920 of the second display 320 may be folded so as to face the user. The folded state illustrated in FIG. 19 may be called a multi-region folded state.

The device 100b may be asymmetrically folded by using a hinge or by being bent.

FIGS. 20A through 20F illustrate open states of the device 100, according to various exemplary embodiments.

Figure 20A:
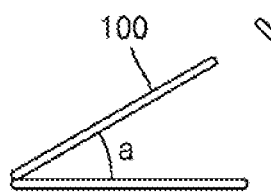
FIGS. 20A through 20F illustrates open states of a device, according to various exemplary embodiments.
Figure 20B:
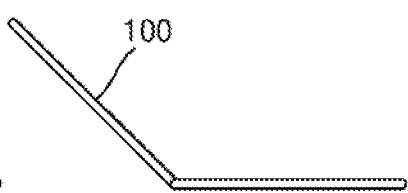
Figure 20C:
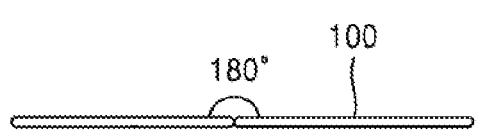
Figure 20D:
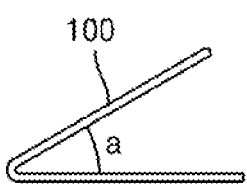
Figure 20E:
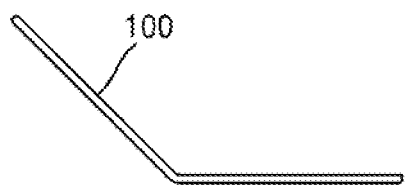
Figure 20F:
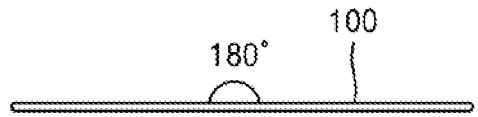

States FIGS. 20A, 20B, and 20C are examples of the foldable device 100 that is folded by using a hinge. States FIGS. 20D, 20E, and 20F are examples of the foldable device 100 that is folded by being bent.

The open state means a state in which a folded angle of the device 100 is within a second range. For example, the open state may mean a state in which the folded angle of the device 100 is equal to approximately 180 degrees.

In some exemplary embodiments, the open state means a state in which a sensing value is within a fourth range in the proximity sensor, the magnetic sensor, the infrared sensor, or the like, wherein the sensing value indicates a proximity level of two regions due to folding.

Figure 21:
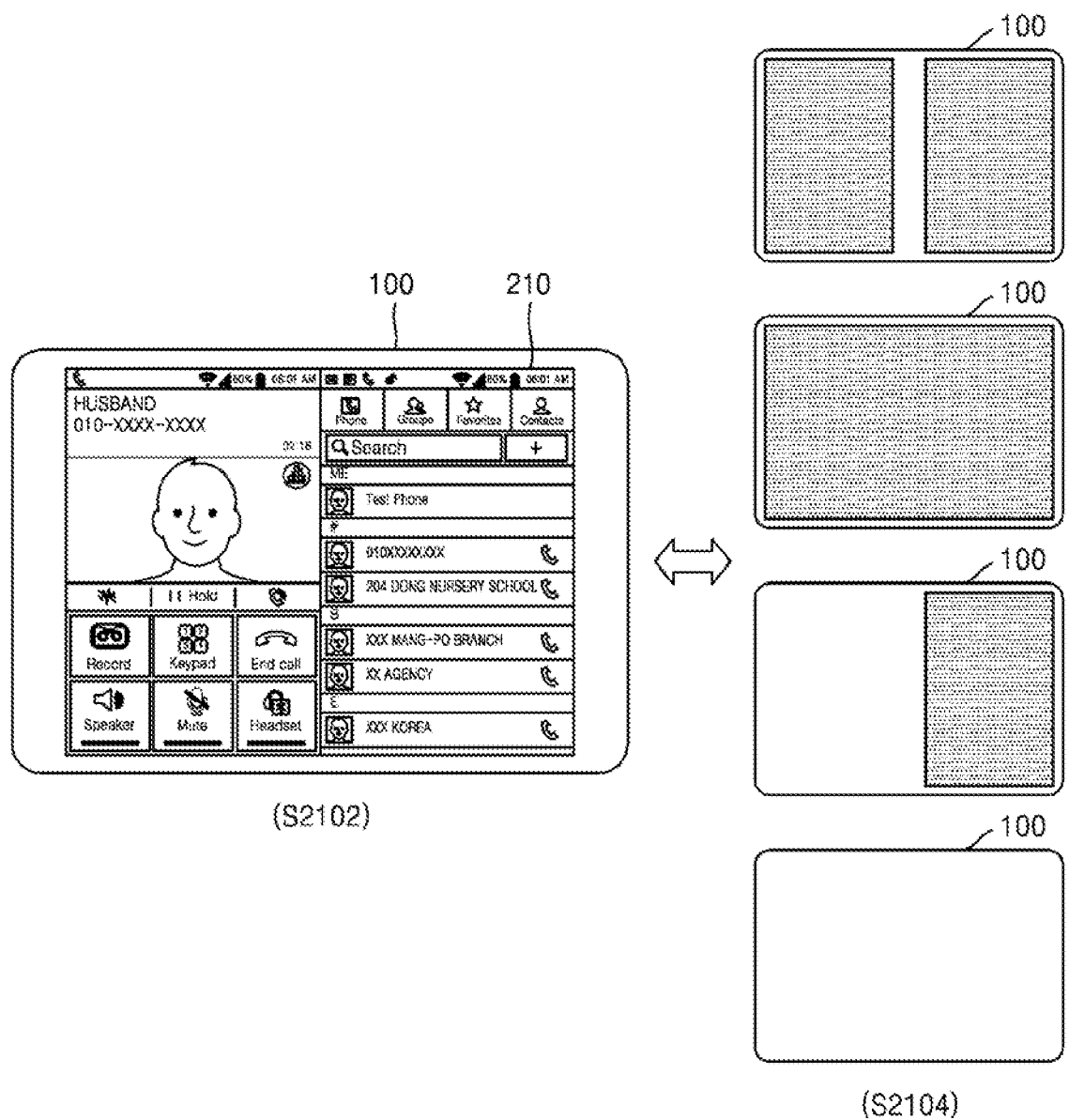
FIG. 21 illustrates an open state of a device, according to an exemplary embodiment.

FIG. 21 illustrates an open state of the device 100, according to an exemplary embodiment.

As illustrated in FIG. 21, in the open state, the device 100 is unfolded when a folded angle of the device 100 is 180 degrees. As illustrated in FIG. 21, a window of the display 210 shown in the open state may be partitioned, so that a plurality of application screens may be displayed on the partitioned window (S2102).

In one or more exemplary embodiments, at least one display having one of various shapes may be arranged on an opposite surface of the display 210 that is exposed in the open state. Also, as illustrated in FIG. 21, displays on the opposite surface may be in an OFF state (S2104).

Figure 22:
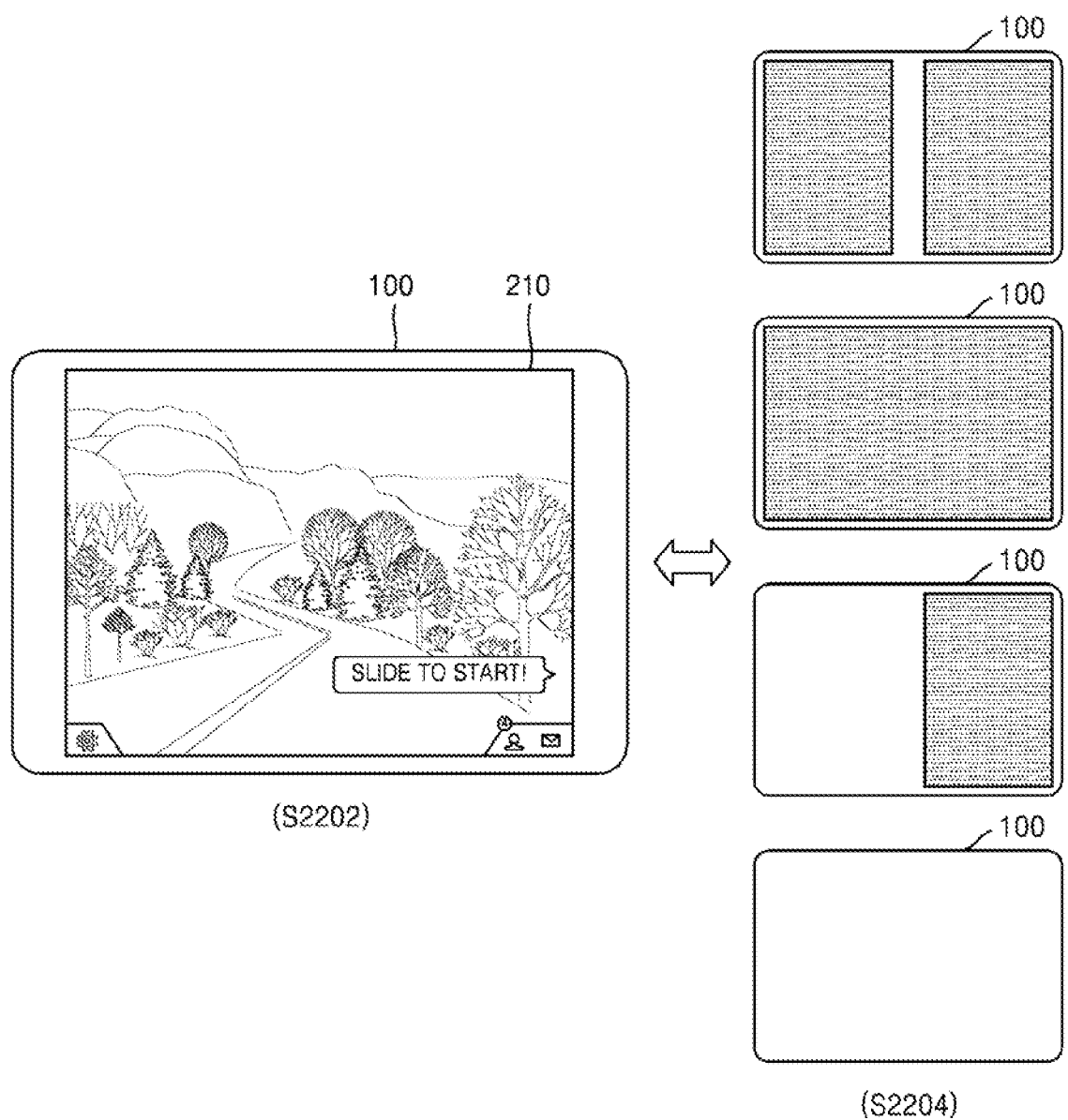
FIG. 22 illustrates an open state of a device, according to another exemplary embodiment.

FIG. 22 illustrates an open state of the device 100, according to another exemplary embodiment.

As illustrated in FIG. 22, in the open state, the device 100 is unfolded and, thus, a folded angle of the device 100 is about 180 degrees. As illustrated in FIG. 22, one application screen may be displayed on the display 210 that is exposed in the open state (S2202).

In one or more exemplary embodiments, at least one display having one of various shapes may be arranged on an opposite surface of the display 210 that is exposed in the open state. Also, as illustrated in FIG. 22, displays on the opposite surface may be in an OFF state (S2204).

Figure 23:
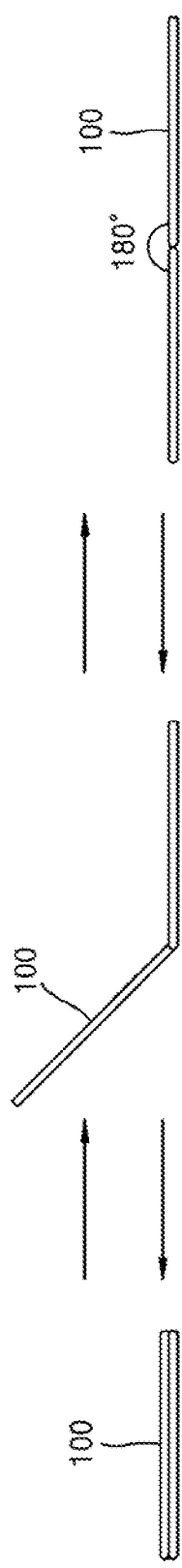
FIG. 23 illustrates a folding motion and an unfolding motion, according to an exemplary embodiment.

FIG. 23 illustrates a folding motion and an unfolding motion, according to an exemplary embodiment. The folding motion and the unfolding motion may be performed in a manner shown in FIG. 23.

Figure 24:
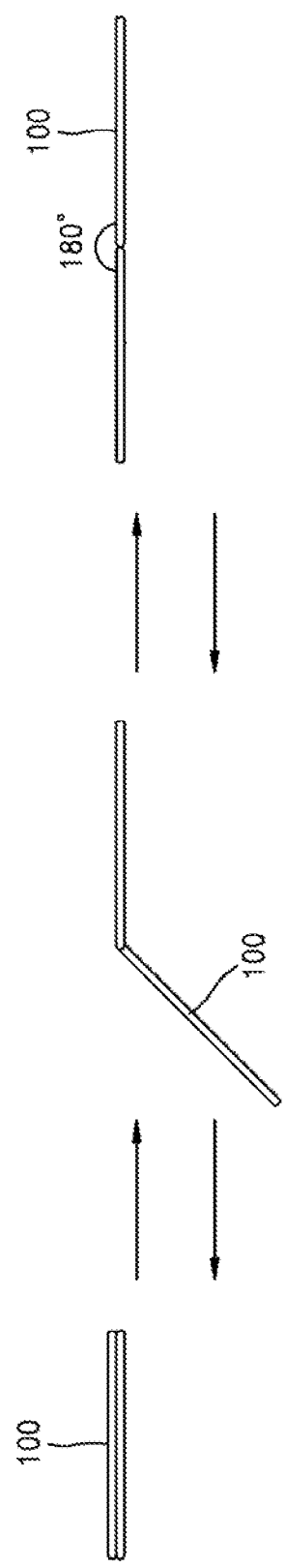
FIG. 24 illustrates a folding motion and an unfolding motion, according to another exemplary embodiment.

FIG. 24 illustrates a folding motion and an unfolding motion, according to another exemplary embodiment. The folding motion and the unfolding motion may be performed in a manner shown in FIG. 24.

Figure 25:
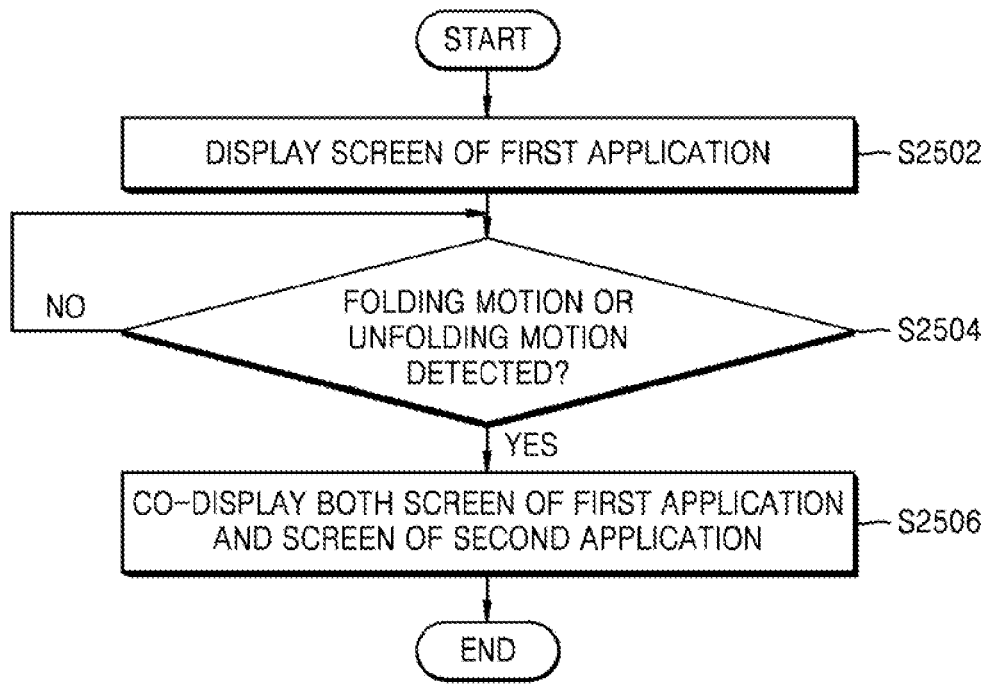
FIG. 25 is a flowchart of a method of controlling a device, according to an exemplary embodiment.

FIG. 25 is a flowchart of a method of controlling a device, according to an exemplary embodiment.

The device to be controlled by using the method may be any electronic device that is folded by using a hinge or is folded by being bent and that has at least one display. For example, the method may be performed on the device 100a shown in FIG. 2 or the device 100b shown in FIG. 3. The method is performed on the device 100a shown in FIG. 2, but one or more exemplary embodiments are not limited thereto.

The device 100a displays a screen of a first application on the display 210 (S2502).

When the state detector 220 or the controller 230 detects a folding motion or an unfolding motion (S2504), the controller 230 co-displays the screen of the first application and a screen of a second application on the display 210 (S2506).

As illustrated in FIGS. 7 through 11, when a plurality of displays that are physically separated are used, an operation S2506 of displaying the screen of the first application and the screen of the second application may be performed by using another display other than the display that displayed the screen of the first application in operation S2502, or may be performed by using both the other display and the display that displayed the screen of the first application.

Figure 26:
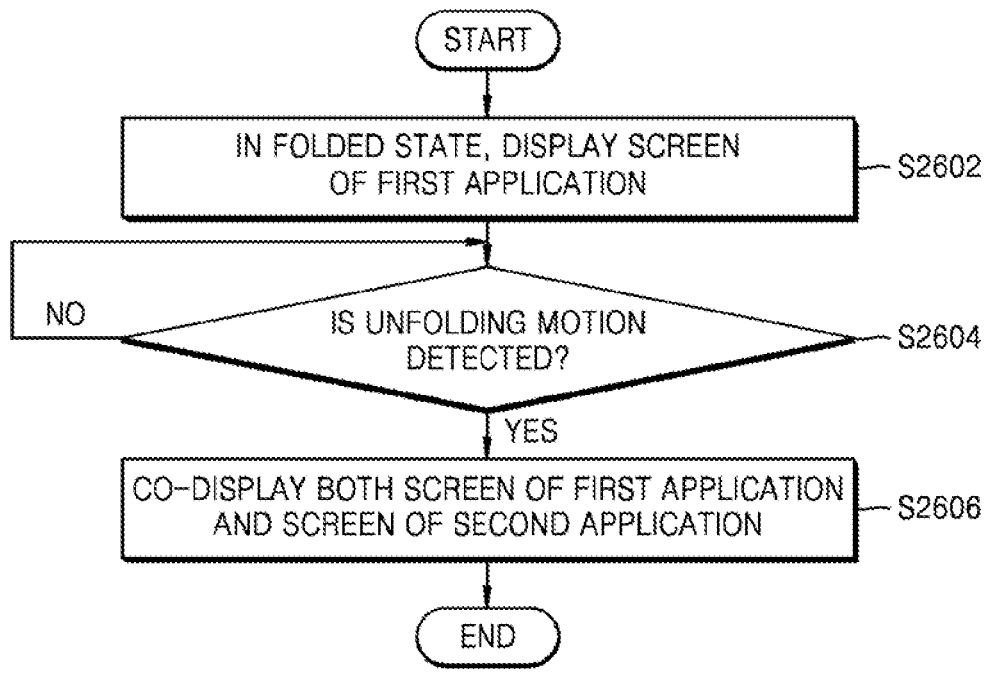
FIG. 26 is a flowchart of a method of controlling a device, according to another exemplary embodiment.

FIG. 26 is a flowchart of a method of controlling a device, according to another exemplary embodiment.

When an unfolding motion by which a state of the device 100 is changed from a folded state to an open state is detected, an execution screen of a first application and an execution screen of a second application may be co-displayed.

First, the device 100 in a folded state displays the execution screen of the first application (S2602).

The controller 230 may display the execution screen of the first application on a first surface of a flexible display that is used as a display when the foldable device 100 is in the folded state. As illustrated in FIG. 6, in a case where the display 210a is one body on the first surface of the foldable device 100, the execution screen of the first application may be displayed on a region of the display 210a. As illustrated in FIG. 7, in a case where the displays 210a1 and 210a2 are disposed at the two regions of the first surface of the device 100a, respectively, wherein the two regions are separated by the folded region 610, the execution screen of the first application may be displayed on only one of the displays 210a1 and 210a2.

As illustrated in FIGS. 9 and 12, in a case where the second display 320b is disposed so as to span across the folded region 610, the execution screen of the first application may be displayed on a region of the second display 320b. The region of the second display 320b may be a region that faces a user, a predefined region, or the like. As illustrated in FIG. 10, in a case where the second displays 320c1 and 320c2 are disposed at the two regions of the second surface of the device 100a, respectively, wherein the two regions are separated by the folded region 610, the execution screen of the first application may be displayed on only one of the second displays 320c1 and 320c2. The one of the second displays 320c1 and 320c2 on which the execution screen of the first application is displayed may be a region that faces a user, a predefined region, or the like.

Next, when the state detector 220 detects an unfolding motion (S2604), the controller 230 co-displays the execution screen of the first application and the execution screen of the second application (S2606).

When the foldable device 100 in the folded state is unfolded, the controller 230 may display the execution screen of the first application and the execution screen of the second application on a second surface of the flexible display that is used as a display. The second application may be related to the first application. A user may typically use the device 100 in the folded state, and then, when the user desires to use a larger screen, the user may unfold and use the device 100. Also, since the device 100 in the open state may co-display the execution screen of the first application and the execution screen of the second application, the user may conveniently use a plurality of applications.

Figure 27:
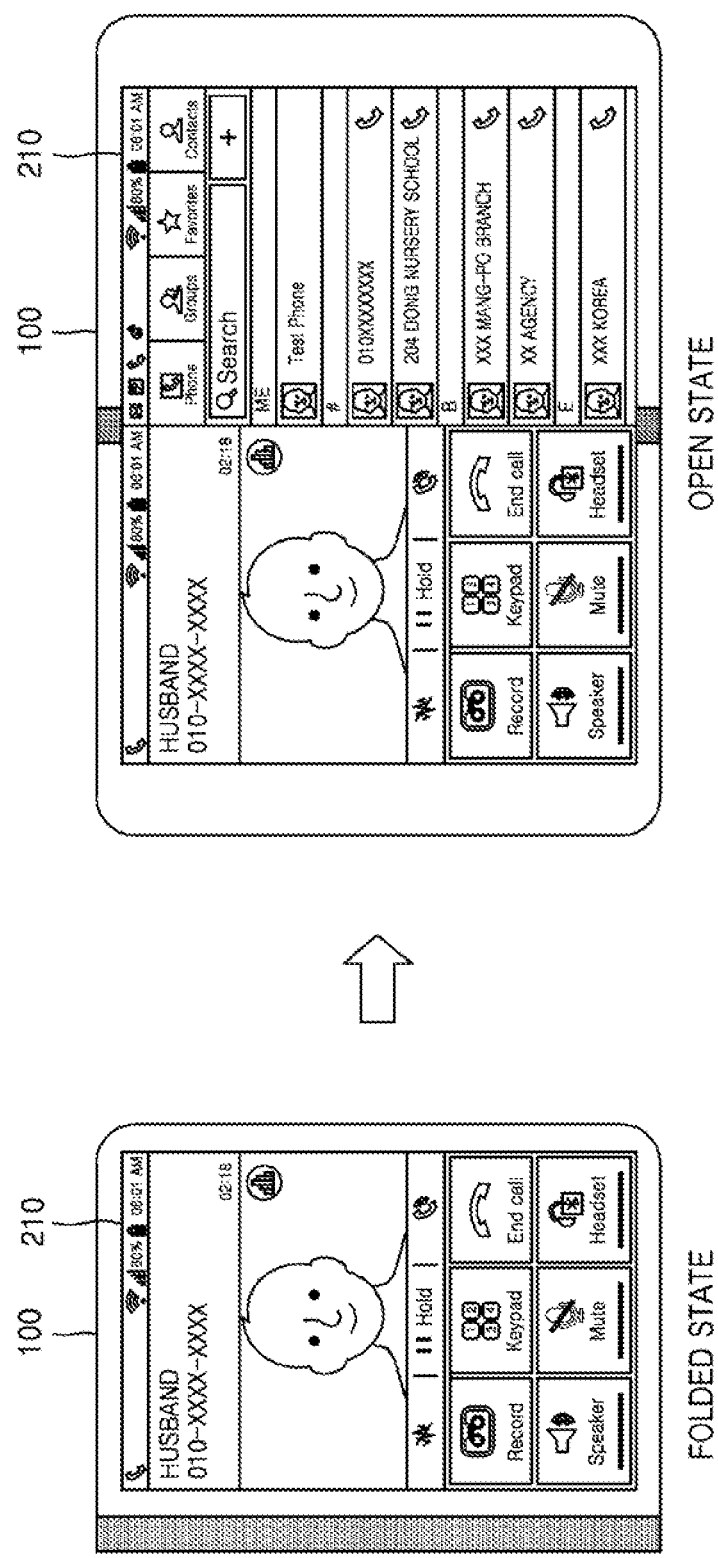
FIG. 27 illustrates a screen in a folded state and a screen in an open state, according to an exemplary embodiment.

FIG. 27 illustrates a screen in a folded state and a screen in an open state, according to an exemplary embodiment.

As illustrated in FIG. 27, when a state of the device 100 is changed to an open state from a folded state in which a screen of a first application is displayed on the display 210, the screen of the first application and a screen of a second application may be co-displayed on the display 210.

When the device 100 is in the folded state, the screen of the first application is displayed on a region of the display 210 of a first surface of the device 100, and when the device 100 is in the open state, the screen of the first application and the screen of the second application are displayed on an entire region of the display 210 of the first surface.

In one or more exemplary embodiments, when the device 100 is in the folded state, the screen of the first application is displayed on a region of the display 210 of a first surface of the device 100, and when the device 100 is in the open state, the screen of the first application and the screen of the second application are displayed on the display 210 of a second surface of the device 100.

Figure 28:
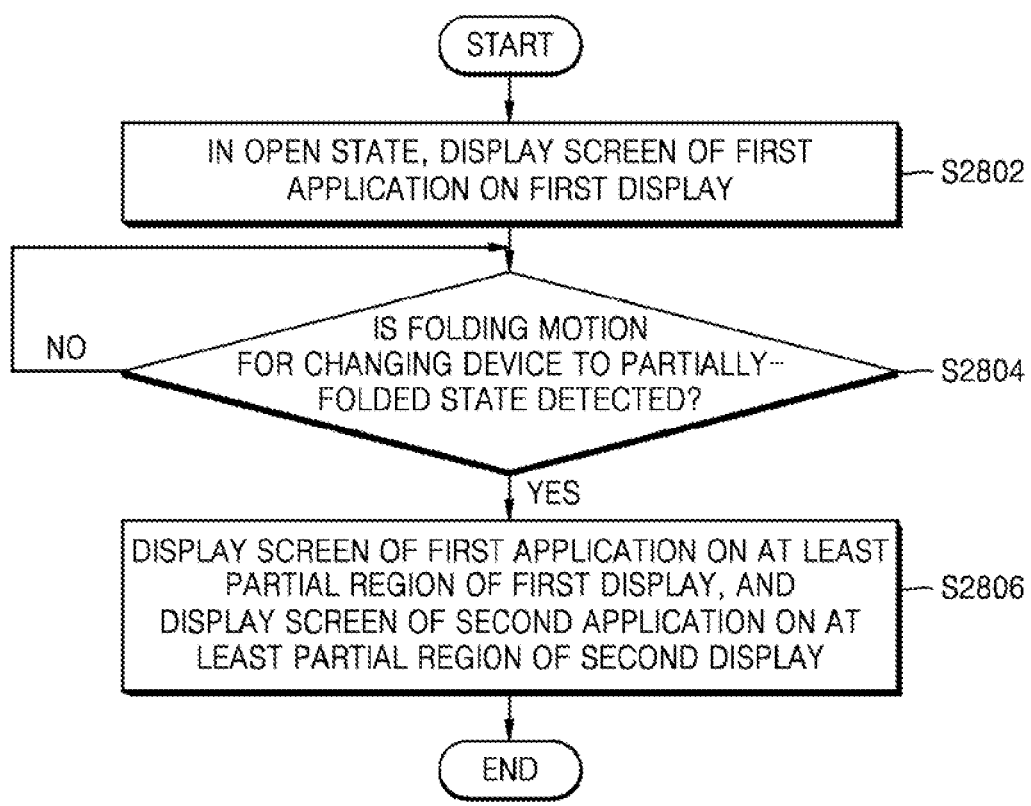
FIG. 28 is a flowchart of a method of controlling a device, according to another exemplary embodiment.

FIG. 28 is a flowchart of a method of controlling a device, according to another exemplary embodiment.

When the device 100b detects a folding motion by which a state of the device 100b is changed from an open state to a partially-folded state, the device 100b co-displays a screen of a first application and a screen of a second application. The partially-folded state, as illustrated in FIGS. 17 through 19, means a state in which, while one of the first display 310 and the second display 320 of the device 100b is disposed to face a user, a portion of the other one of the first display 310 and the second display 320 that does not face the user is asymmetrically folded so as to face the user.

First, the device 100b in the open state displays the screen of the first application on the first display 310 (S2802). When the state detector 220 detects a folding motion for changing the device 100b to the partially-folded state (S2804), the controller 230 displays the screen of the first application on a region of the first display 310, and displays the screen of the second application on a region of the second display 320 (S2806).

In the embodiment of FIG. 28, the first display 310 and the second display 320 may be disposed on different surfaces of the device 100b, respectively.

The region of the first display 310 may be a region of the first display 310 that is exposed to the user according to the partially-folded state of the device 100b. That is, the region of the first display 310 may not be covered by the second display 320.

The region of the second display 320 may indicate a region that is disposed in such a direction that the region is exposed to the user according to the partially-folded state of the device 100b.

Figure 29A:
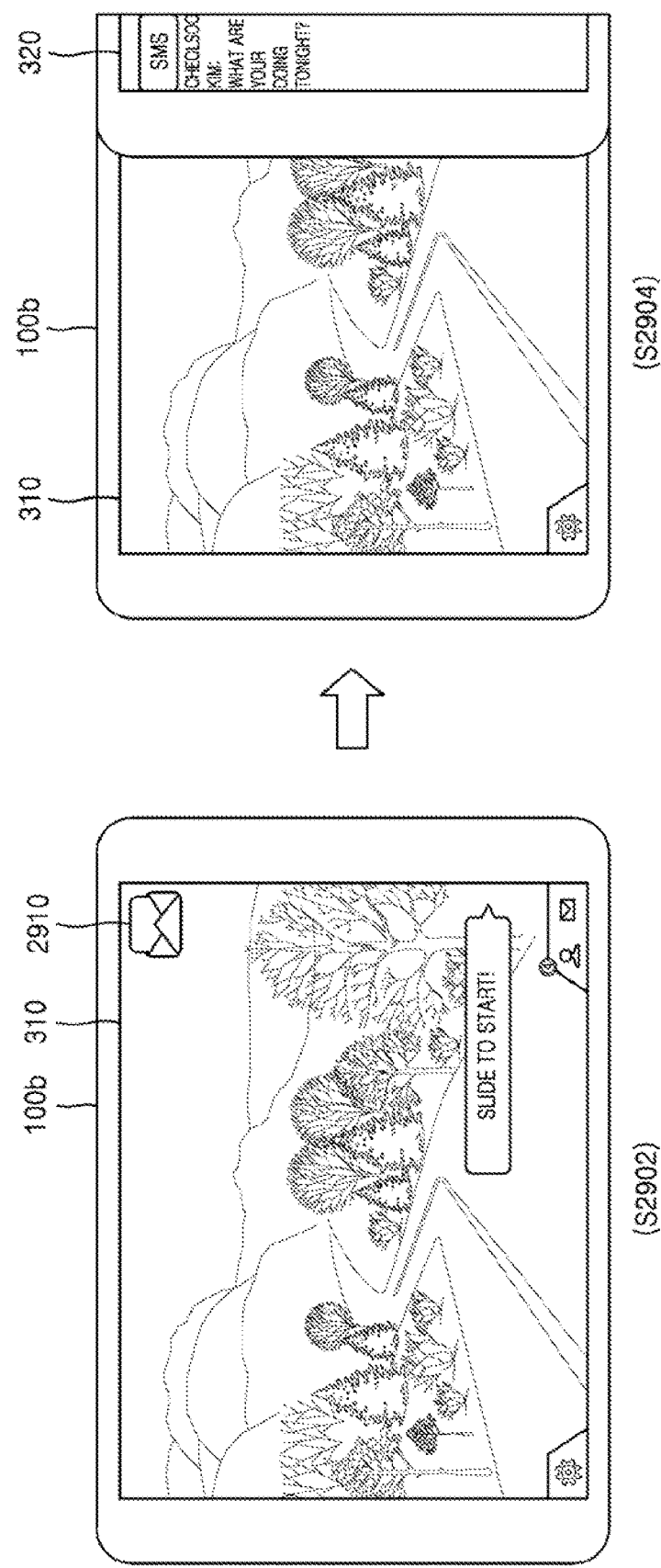
FIGS. 29A and 29B illustrate screens of an open state and a partially-folded state, according to various exemplary embodiments.
Figure 29B:
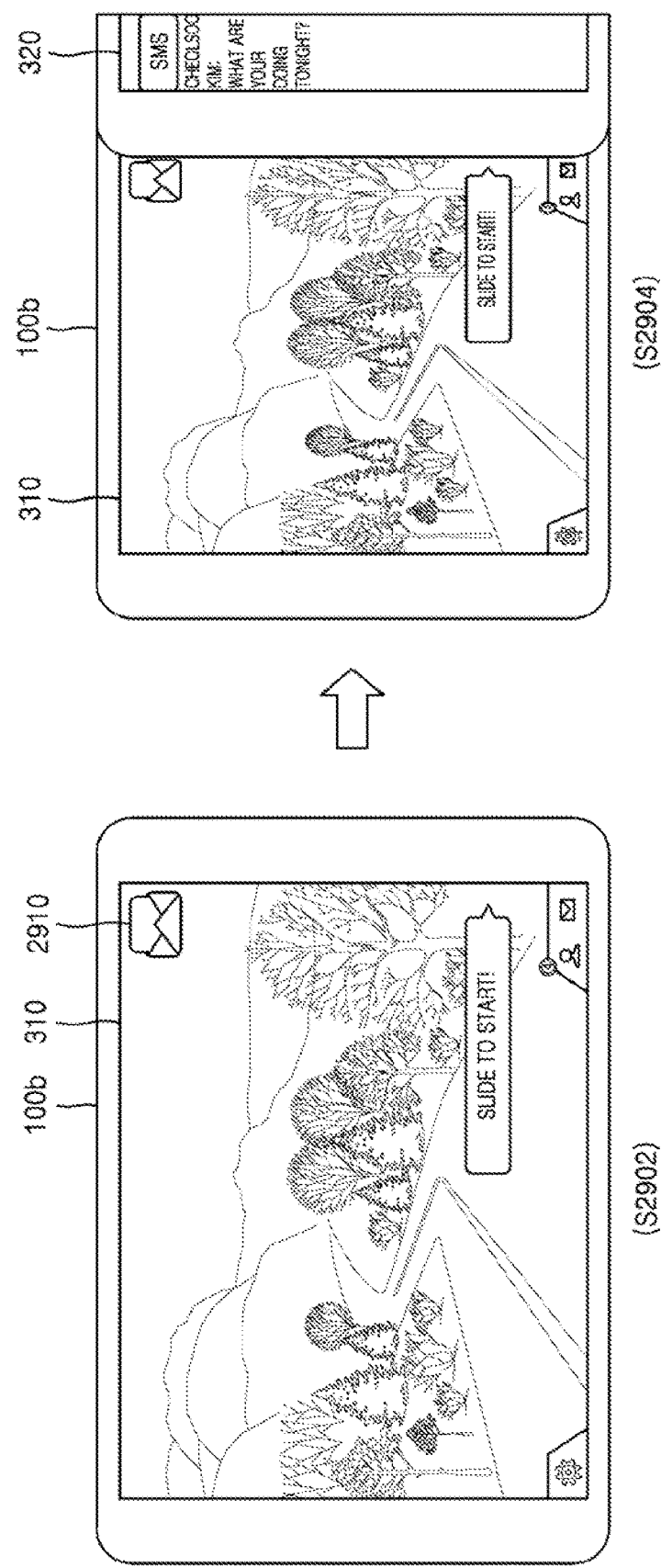

FIGS. 29A and 29B illustrate screens of an open state and a partially-folded state, according to various exemplary embodiments.

As illustrated in FIGS. 29A and 29B, while a screen of a first application is displayed on the first display 310 of the device 100b in an open state (S2902), when the device 100a is changed to a partially-folded state with a quadrangular shape (S2904), the screen of the first application may be displayed on a region of the first display 310, and a screen of a second application may be displayed on a region of the second display 320.

As illustrated in FIG. 29A, the screen of the first application may be displayed while a portion of the screen of the first application is covered. That is, the portion of the screen of the first application may be covered by the second display 320.

Alternatively, as illustrated in FIG. 29B, in one or more exemplary embodiments, at least one of a size and a ratio of the screen of the first application may be changed to match an area of a region that is not covered by the second display 320. The screen of the second application may be displayed on a region of the second display 320 that is disposed on a same side as the first display 310 due to folding. The screen of the second application may be resized to match with the size of the screen of the first application that is changed due to the folding, or may be displayed while a portion of the screen of the second application is covered.

Figure 30A:
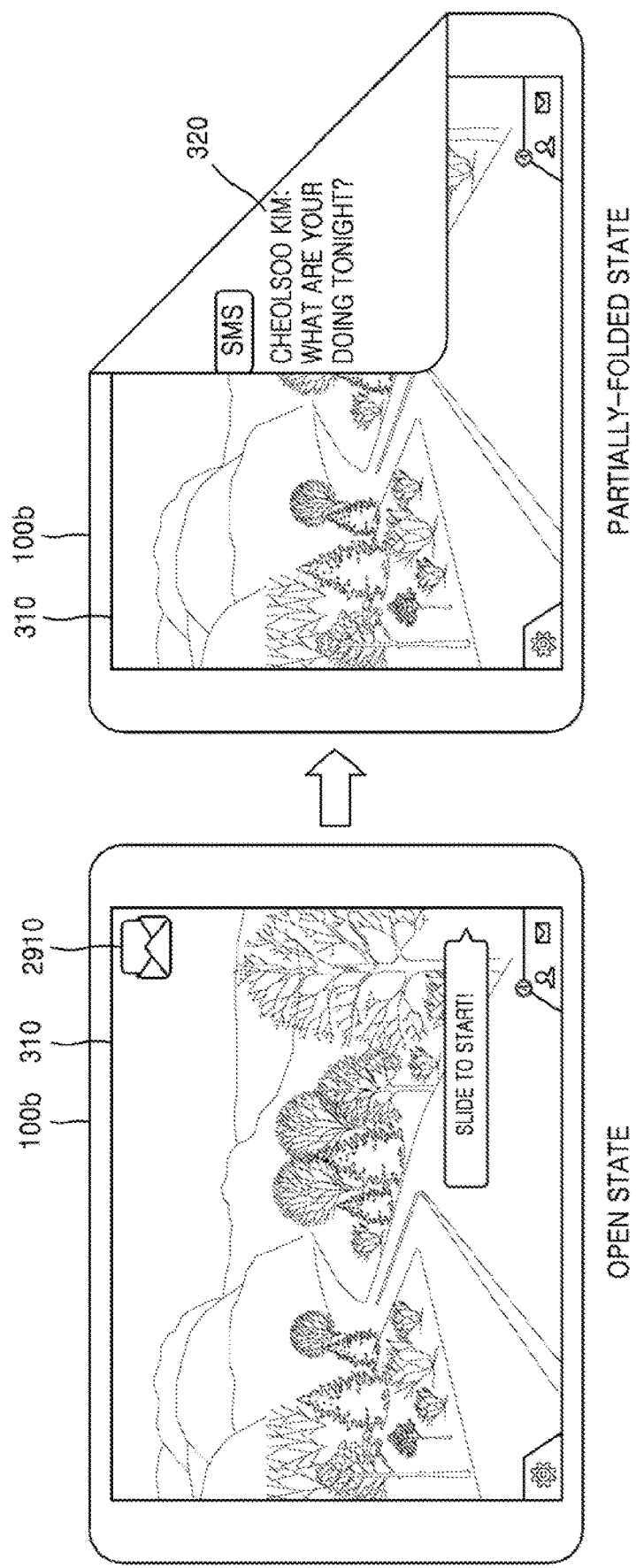
FIGS. 30A and 30B illustrate screens of an open state and a folded state, according to various exemplary embodiments.
Figure 30B:
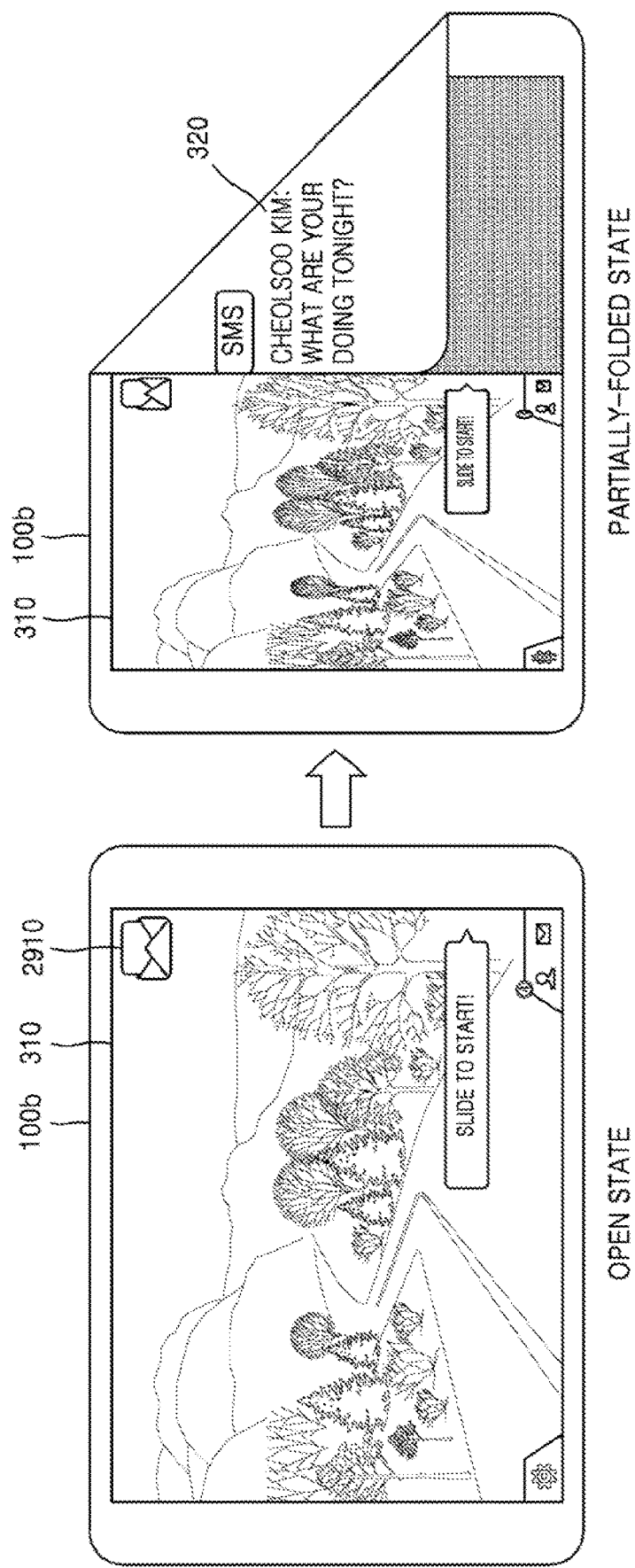

FIGS. 30A and 30B illustrate screens of an open state and a folded state, according to various exemplary embodiments.

As illustrated in FIGS. 30A and 30B, while a screen of a first application is displayed on the first display 310 of the device 100b in the open state, when the device 100b is changed to a partially-folded state with a triangular shape, the screen of the first application may be displayed on a region of the first display 310, and a screen of a second application may be displayed on a region of the second display 320.

As illustrated in FIG. 30A, the screen of the first application may be displayed while a portion of the screen of the first application is covered. That is, the portion of the screen of the first application may be covered by the second display 320.

Alternatively, as illustrated in FIG. 30B, in one or more exemplary embodiments, at least one of a size and a ratio of the screen of the first application may be changed to correspond to an area of a region that is not covered by the second display 320. Also, in one or more exemplary embodiments, a blank region whereon nothing is displayed may be included in the region that is not covered by the second display 320. The blank region may be of a size or shape so that that the screen of the first application is displayed in a rectangular shape.

The screen of the second application may be displayed on a region of the second display 320 that is disposed on a same side as the first display 310 due to the folding. The screen of the second application may be resized to match a size of the region of the second display 320.

Figure 31A:
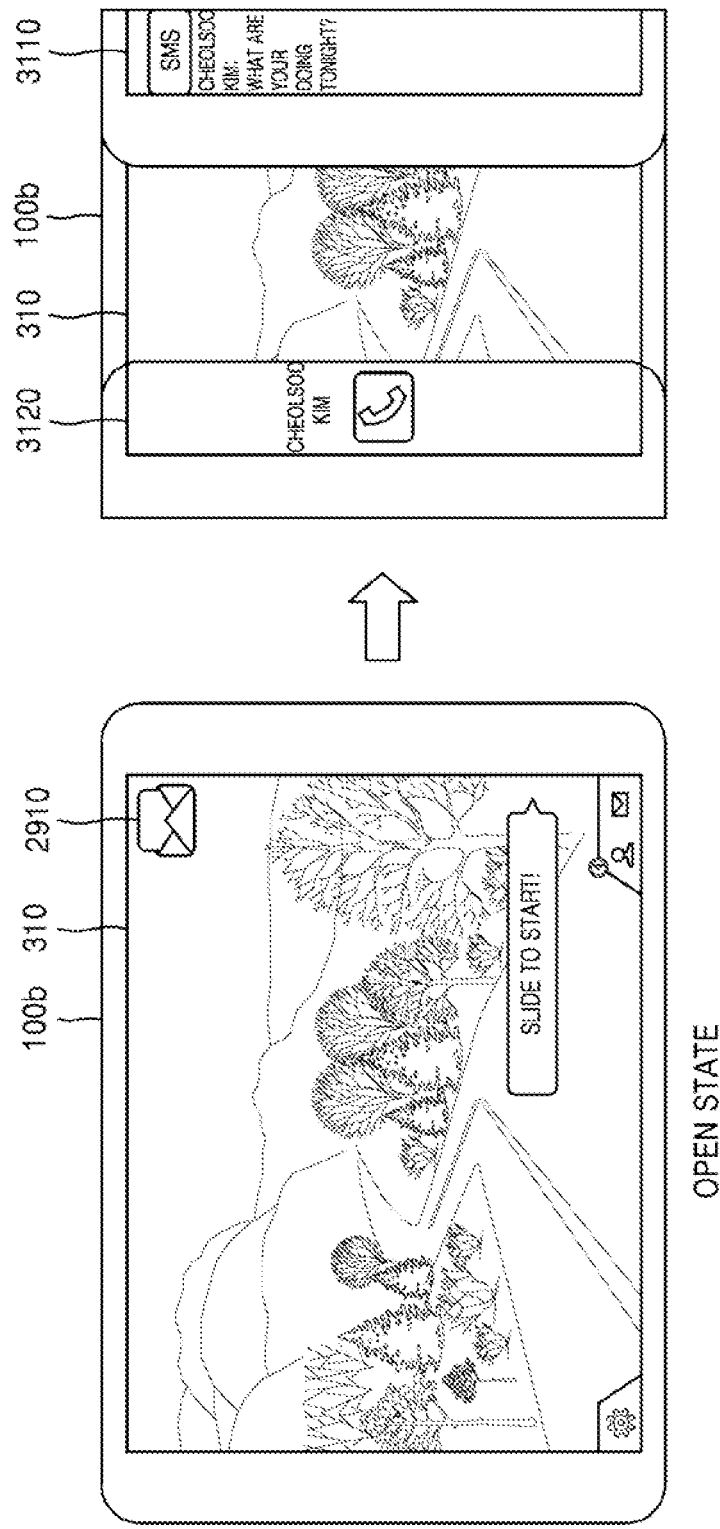
FIGS. 31A and 31B illustrate screens of an open state and a folded state, according to various exemplary embodiments.
Figure 31B:
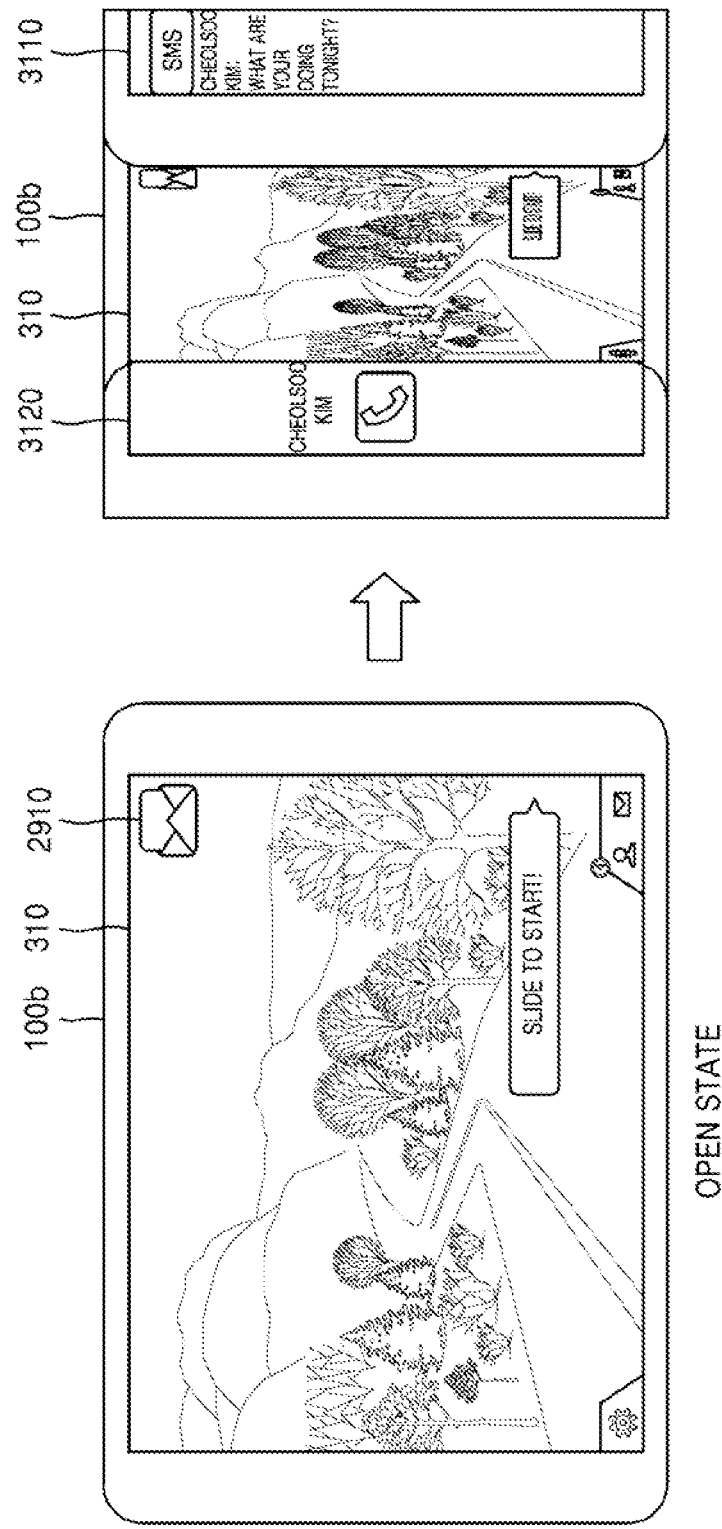

FIGS. 31A and 31B illustrate screens of an open state and a folded state, according to various exemplary embodiments.

As illustrated in FIGS. 31A and 31B, while a screen of a first application is displayed on the first display 310 of the device 100b in the open state, when a plurality of regions of the device 100b are changed to a partially-folded state, the screen of the first application may be displayed on a region of the first display 310, and a screen of a second application may be displayed on one or more regions of the second display 320. For example, a text message received from a person named Cheolsoo KIM may be displayed on the region 3110, and a phone application screen that displays an icon for calling Cheolsoo KIM may be displayed on the region 3120.

As illustrated in FIG. 31A, the screen of the first application may be displayed while a portion of the screen of the first application is covered. That is, the portion of the screen of the first application may be covered by a plurality of regions 3110 and 3120 of the second display 320.

Alternatively, as illustrated in FIG. 31B, in one or more exemplary embodiments, at least one of a size and a ratio of the screen of the first application may be changed to match an area of a region that is not covered by the regions 3110 and 3120 of the second display 32

The screen of the second application may be displayed on the regions 3110 and 3120 of the second display 320 that are disposed on a same side as the first display 310 due to folding. Also, screens of different applications may be displayed on the plurality of regions 3110 and 3120 of the second display 320.

Screens of the second application may be resized to match sizes of the regions 3110 and 3120 of the second display 320 that are in the same direction as the first display 310 due to folding.

According to the various exemplary embodiments described with reference to FIGS. 28 through 31B, the device 100b may be folded by using a hinge by being bendable.

While the user uses the device 100b in the open state, if the user wants to check simple content, the user may fold a region of the device 100b and thus may check the simple content by using a display on an opposite surface of the device 100b. For example, while the user watches a video, if a notice 2910 indicating a receipt of a text message is displayed, the user may fold the region of the device 100b and may simply check a content of the text message.

Figure 32:
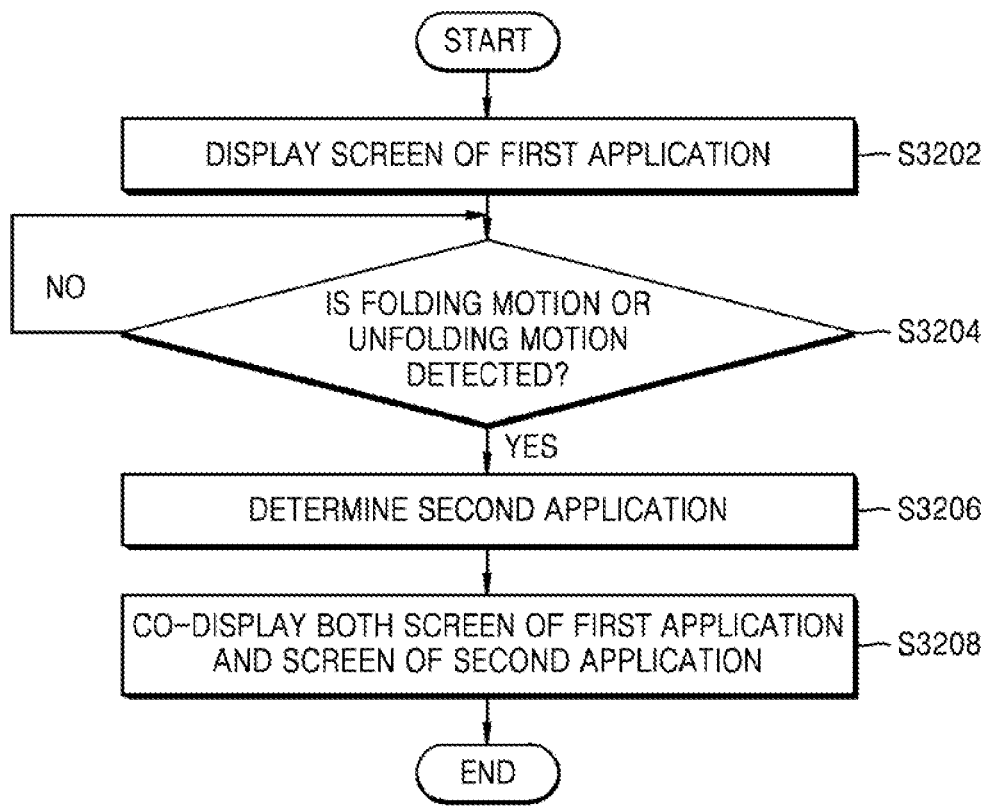
FIG. 32 is a flowchart of a method of controlling the device, according to another exemplary embodiment.

FIG. 32 is a flowchart of a method of controlling the device 100, according to another exemplary embodiment.

When the device 100 detects a folding motion or an unfolding motion, the device 100 determines a second application according to a preset standard. The preset standard for determining the second application may vary according to one or more exemplary embodiments.

First, the device 100 displays a screen of a first application (S3202), and when the state detector 220 detects the folding motion or the unfolding motion (S3204), the controller 230 determines the second application (S3206). Next, the controller 230 co-displays a screen of the determined second application and the screen of the first application (S3208).

The second application may be determined according to one of various standards, e.g., the second application may be determined according to a random or pseudo-random selection, a user-predefined second application may be determined as the second application, the second application may be determined according to a list of preset related applications, a recently-executed application may be determined as the second application, or a frequently-used application may be determined as the second application. Various examples of determining the second application are described in greater detail later.

Figure 33:
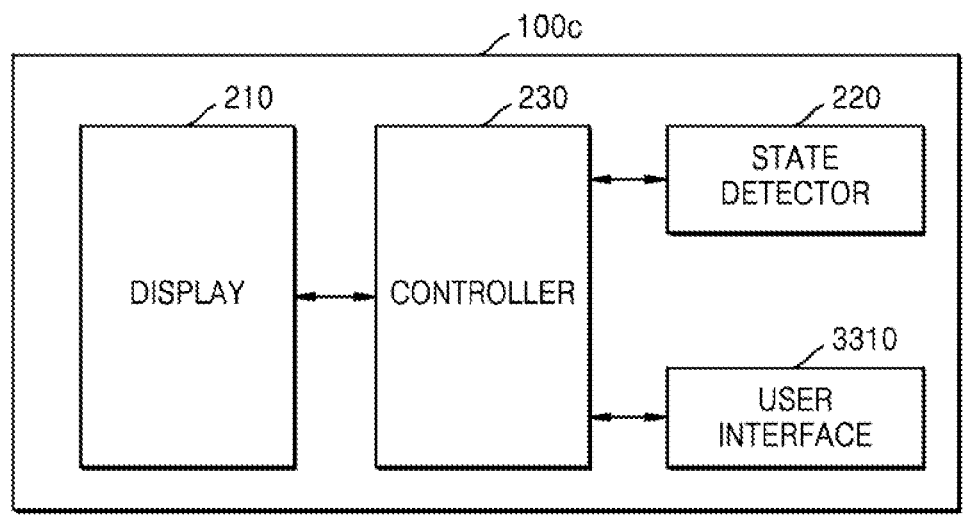
FIG. 33 is a block diagram of a device, according to another exemplary embodiment.

FIG. 33 illustrates a structure of a device 100c, according to another exemplary embodiment.

The device 100c includes the display 210, the state detector 220, the controller 230, and a user interface 3310, i.e., a user input unit or an input/output (I/O) unit.

The display 210 displays a screen of an application executed by the controller 230, a screen of a user interface, or a screen indicating a state of the device 100c. The display 210 may include a first display 310 disposed on a first surface of the device 100c, and a second display 320 disposed on a second surface of the device 100c.

The controller 230 executes at least one application, and controls the display 210 to display a screen of the at least one application. While a screen of a first application is displayed, if the controller 230 detects a folding motion or an unfolding motion, the controller 230 co-displays the screen of the first application and a screen of a second application.

The controller 230 may generally control operations of the device 100c. For example, the controller 230 may execute an operating system of the device 100c, may process various types of data, and may control elements of the device 100c including the display 210, the state detector 220, the user interface 3310, or the like.

The user interface 3310 receives a user input. The user interface 3310 may include at least one of a key, a touch sensor, a touchscreen, a pen recognition panel, a bending sensor, a biological signal detecting sensor, and a microphone, or a combination thereof. The user interface 3310 may be provided along with a user interface screen via a graphical user interface (GUI).

The user interface 3310 may receive a user input for controlling the device 100c. For example, the user interface 3310 may receive a user input of turning the device 100c on and off, a user input of executing an application, a user input with respect to an application, and the like. Also, the user interface 3310 may receive a user input of selecting a second application, a user input of selecting, when a folding motion or an unfolding motion is detected, whether to co-display the screen of the first application and a screen of the second application, or a user input of selecting a display method related to the screen of the second application when the folding motion or the unfolding motion is detected.

The user interface 3310 may receive a user input of selecting a second application. For example, the controller 230 may display a second application selection menu on the display 210, and may receive a user input via the second application selection menu. The controller 230 may determine the second application, based on the user input via the user interface 3310.

In one or more exemplary embodiments, when the folding motion or the unfolding motion is detected, the user interface 3310 may receive a user input of selecting whether to display a screen of a second application along with the screen of the first application. The controller 230 may display the screen of the second application along with the screen of the first application only when a user selects to display the screen of the second application.

Figure 34:
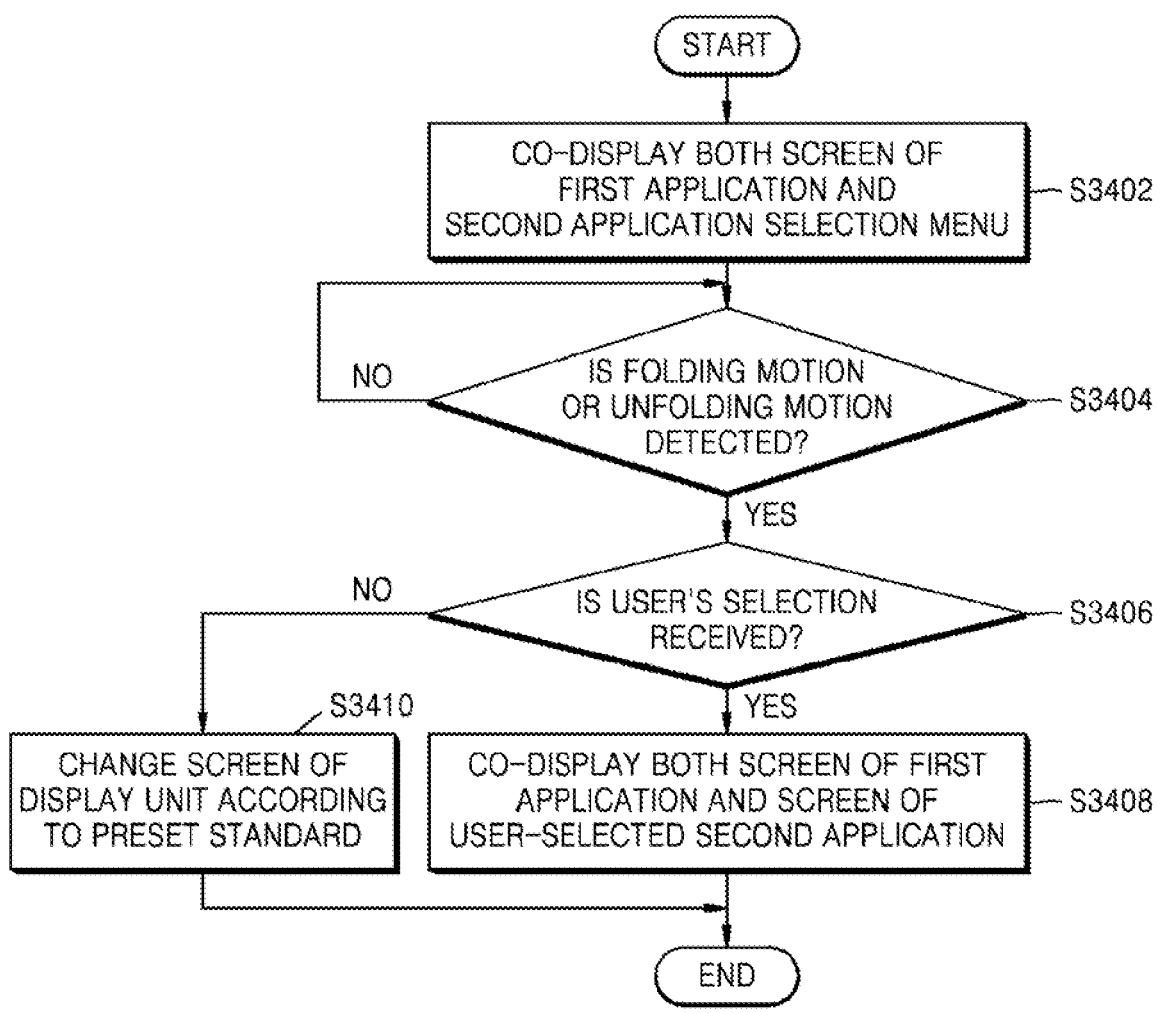
FIG. 34 is a flowchart of a method of controlling the device, according to another exemplary embodiment.

FIG. 34 is a flowchart of a method of controlling the device 100, according to another exemplary embodiment.

A second application selection menu for selecting a second application is provided with a screen of a first application, and the second application may be selected according to user selection.

First, the controller 230 co-displays the second application selection menu and the screen of the first application (S3402). The second application selection menu is provided to allow a user to select the second application.

The second application selection menu may be displayed as a GUI on the display 210.

In one or more exemplary embodiments, the second application selection menu is provided so as to receive a user input via a touch sensor, a key button, etc. that is disposed in a predetermined region of a housing of the device 100c. Here, information about the second application selection menu may be displayed on a region of the display 210.

Next, when the state detector 220 detects a folding motion or an unfolding motion (S3404), the controller 230 determines whether an input of a user's selection has been received via the second application selection menu (3406).

If the input of the user's selection has been received (S3406), the controller 230 may determine a user-selected application as the second application, and may co-display the screen of the first application and a screen of the second application (S3408).

If the input of the user's selection has not been received (S3406), the controller 230 changes a screen of the display

210 according to a preset standard (S3410). The preset standard may vary according to various exemplary embodiments. The preset standard may involve determining an application as the second application, wherein the application was previously set to be executed with the first application. In one or more exemplary embodiments, the preset standard may involve determining an application as the second application, wherein the application was preset by a user via a setting menu or the like. In one or more exemplary embodiments, the preset standard may involve, when a folding motion or an unfolding motion is detected, changing the screen of the first application by changing a size or a disposition of the screen of the first application.

When the second application is determined, a user's intention may be reflected by the determination. Also, when the user already selected the second application that the user wants to view together with the screen of the first application, when a folding motion or an unfolding motion is performed, the screen of the second application is automatically displayed along with the screen of the first application. Thus, the user may conveniently use a multi-window interface.

Figure 35:
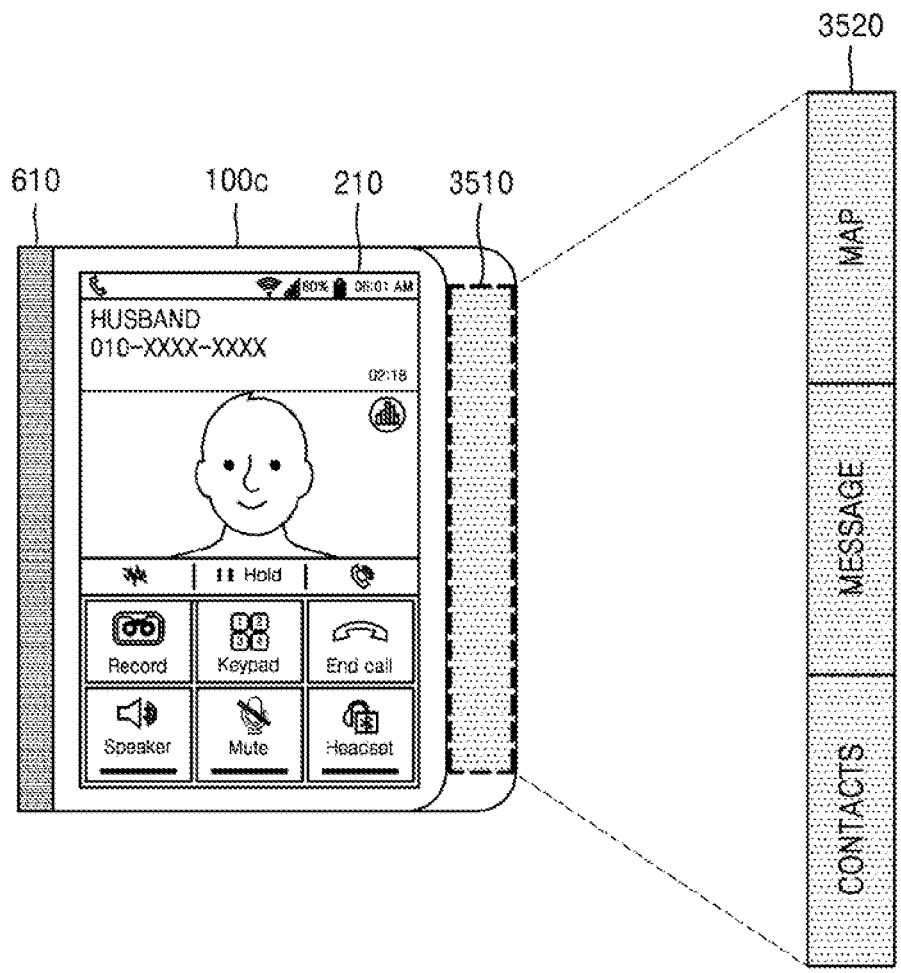
FIG. 35 illustrates an example in which a second application selection menu is provided, according to an exemplary embodiment.

FIG. 35 illustrates an example in which a second application selection menu 3520 is provided, according to an exemplary embodiment.

The device 100*c* is asymmetrically folded. In a folded state, the device 100*c* displays a screen of a first application on the display 210, and provides the second application selection menu 3520 via a first region 3510.

The second application selection menu 3520 displays one or more user-selectable applications, and receives a user input of selecting an application. As illustrated in FIG. 35, the first region 3510 may be partitioned into a plurality of regions, and the user-selectable applications may be matched to the plurality of regions, respectively.

The screen of the first application may be displayed on the second display 320, and the first region 3510 may be on the first display 310. The first region 3510 may be defined as a portion of the first display 310 that is exposed in the folded state. If the first display 310 is a touchscreen, the second application selection menu 3520 may be displayed on the first region 3510, and the device 100*c* may receive a user input as a touch input to the first display 310.

In one or more exemplary embodiments, the first region 3510 may be a region on a housing of the device 100*c* in which a touch sensor, a proximity sensor, etc. are disposed. In one or more exemplary embodiments, information about the second application selection menu 3520 may be displayed on the first region 3510 on the housing, or may be displayed on an externally-exposed region of the display 210.

The second application selection menu 3520 is provided via a predetermined region that is physically separated from the display 210 that is asymmetrically folded and displays the first application. Thus, the user may intuitively access the second application selection menu 3520. Furthermore, since the second application selection menu 3520 is provided by using a region of a lower layer that is exposed due to asymmetrical folding, the second application selection menu 3520 may be displayed without covering the screen of the first application and without making a screen disposition complicated.

Figure 36:
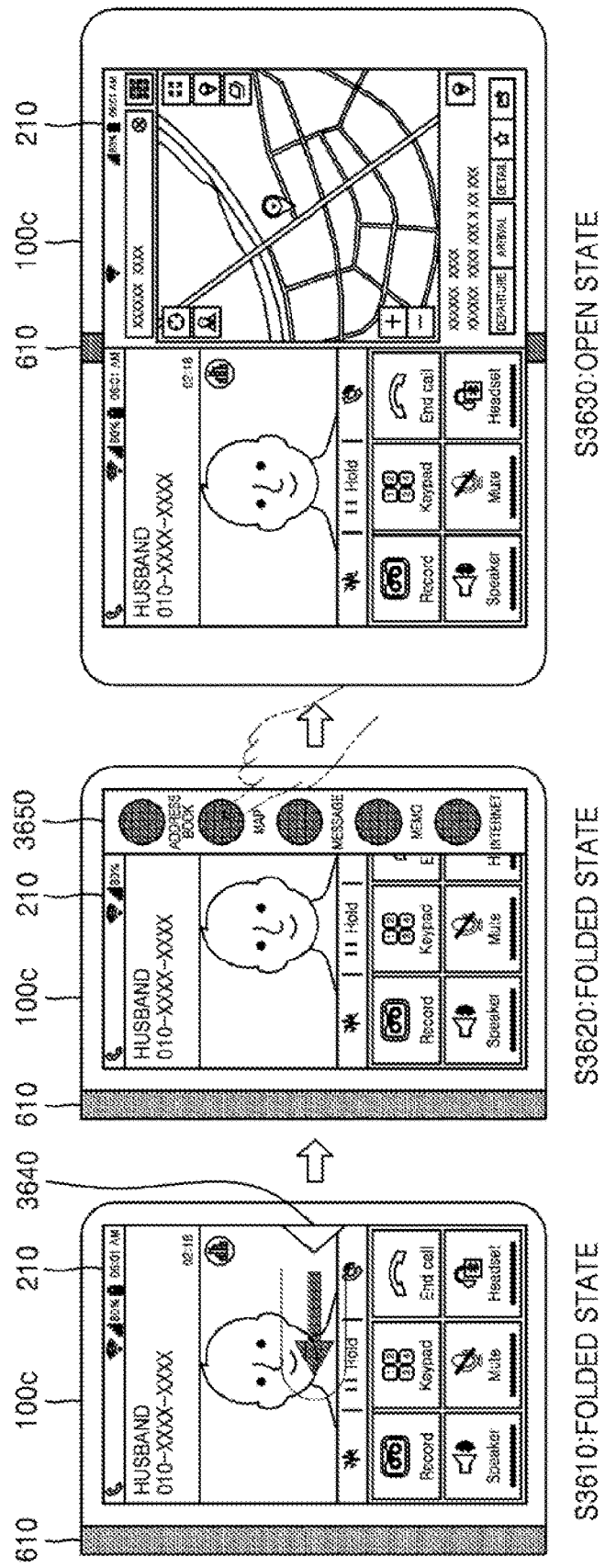
FIG. 36 illustrates an example in which a second application selection menu is provided, according to another exemplary embodiment.

FIG. 36 illustrates an example in which a second application selection menu 3650 is provided, according to another exemplary embodiment.

Referring to FIG. 36, the second application selection menu 3650 may be provided only in response to a user requests for the second application selection menu 3650. For example, the controller 230 of the device 100*c* in a folded state may display, on the display 210, a screen of a first application and a first menu 3640 for requesting the second application selection menu 3650 (S3610). The user may request the device 100*c* to display the second application selection menu 3650, by selecting the first menu 3640. For example, the user may request the device 100*c* to display the second application selection menu 3650, by clicking or dragging the first menu 3640.

When the user requests the device 100*c* to display the second application selection menu 3650, the controller 230 may display the screen of the first application and the second application selection menu 3650 on the display 210 (S3620). The user may select a second application from the second application selection menu 3650. A user input may be received in the form of a touch input, a key input, a pen input, a voice input, or the like.

When the user selects the second application from the second application selection menu 3650, and changes the device 100*c* to an open state (S3630), the controller 230 displays the screen of the first application and a screen of the second application on the display 210 (S3630). As described above with reference to FIG. 34, if the user did not select the second application, when a folding motion or an unfolding motion is detected, a screen of the display 210 may be determined and displayed according to a preset standard.

Referring to FIG. 36, a state of the device 100*c* is changed from the folded state to an open state. In one or more exemplary embodiments, even if it is preset that a screen of a first application and a screen of a second application are co-provided when the state of the device 100*c* is changed from the open state to the folded state, the first menu 3640 for requesting the second application selection menu 3650 may be provided. That is, in the folded state of the device 100*c*, the screen of the first application and the first menu 3640 may be provided, and when the user requests for the second application selection menu 3650, the device 100*c* in the folded state may co-display the screen of the first application and the second application selection menu 3650. Also, if the user selects a second application, when the state of the device 100*c* is changed from the folded state to the open state, the device 100*c* in the open state may co-display the screen of the first application and a screen of the user-selected second application.

The second application selection menu 3650 may be displayed along with the screen of the first application only when the user desires. Thus, it is possible to significantly reduce a problem in which a screen disposition is complicated due to the second application selection menu 3650 or the screen of the first application is covered by the second application selection menu 3650.

Figure 37:
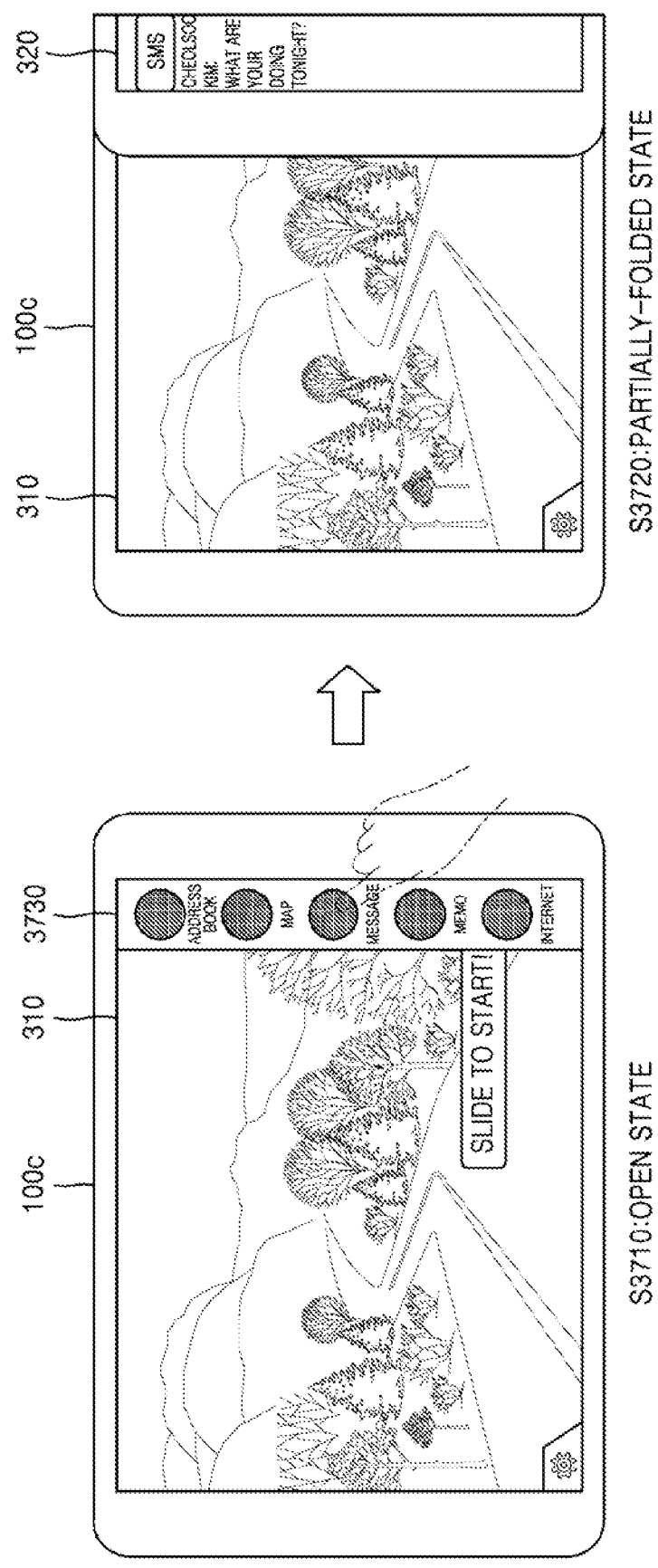
FIG. 37 illustrates an example in which a second application selection menu is provided, according to another exemplary embodiment.

FIG. 37 illustrates an example in which a second application selection menu 3730 is provided, according to another exemplary embodiment.

Referring to FIG. 37, the controller 230 of the device 100*c* in an open state co-displays a screen of a first application and the second application selection menu 3730 on the first display 310 (S3710). When a user input of selecting a second application is received via the second application selection menu 3730, and the device 100*c* is partially folded, the controller 230 displays the screen of the first application on the first display 310, and displays a screen of a user-selected second application on an exposed region of the second display 320 (S3720).

A user who has selected the second application may view the screen of the second application by performing a simple gesture, e.g., partially bending or folding a portion of the device 100c, and, thus, the user may conveniently view the screen of the second application.

Figure 38:
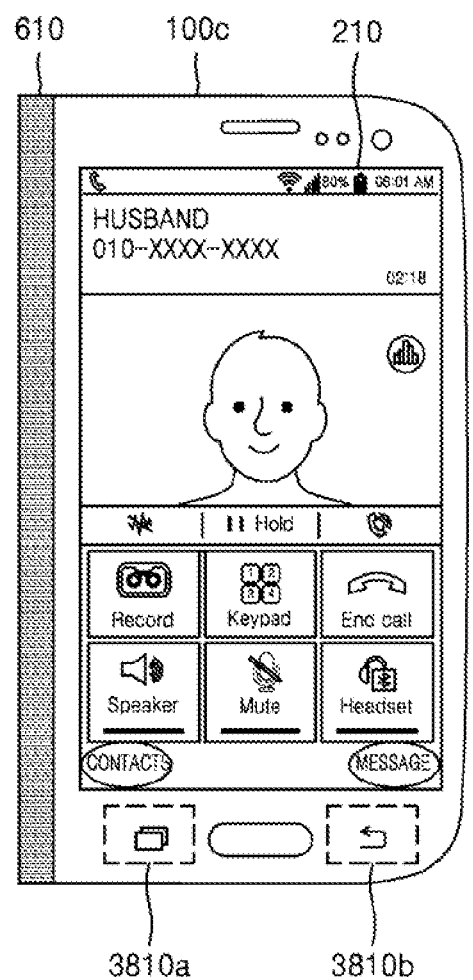
FIG. 38 illustrates an example in which a second application selection menu is provided, according to another exemplary embodiment.

FIG. 38 illustrates an example in which a second application selection menu is provided, according to another exemplary embodiment.

Referring to FIG. 38, the device 100c co-displays a first application screen and information about the second application selection menu, and receives a user's selection by using elements of the user interface 3310 formed on a housing of the device 100c. For example, the device 100c may receive the user's selection by using touch sensors 3810a and 3810b that are the elements of the user interface 3310.

The device 100c may further accurately receive a user input by using the user interface 3310 disposed on the housing of the device 100c, and an area of a screen occupied by the second application selection menu is decreased.

Figure 39:
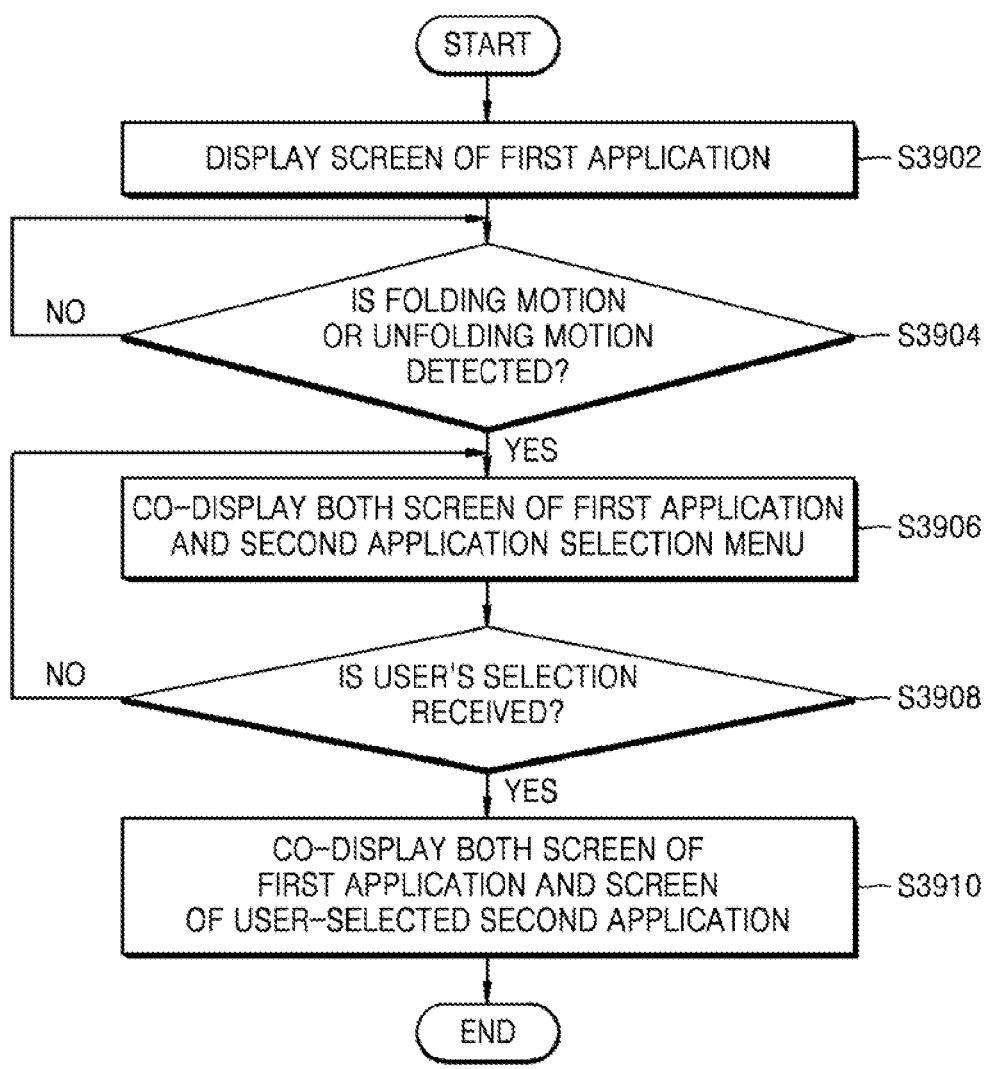
FIG. 39 is a flowchart of a method of controlling a device, according to another exemplary embodiment.

FIG. 39 is a flowchart of a method of controlling a device, according to another exemplary embodiment.

Referring to FIG. 39, when a folding motion or an unfolding motion is detected, a screen of a first application and a second application selection menu are co-displayed, and when a user input via the second application selection menu is detected, the screen of the first application and a screen of a second application are co-displayed.

First, the controller 230 displays the screen of the first application on the display 210 (S3902).

Next, when the state detector 220 detects the folding motion or the unfolding motion (S3904), the controller 230 co-displays the screen of the first application and the second application selection menu (S3906).

When user's selection with respect to the second application is received (S3908), the controller 230 determines a user-selected application as the second application, and co-displays the screen of the first application and a screen of the second application (S3910).

After the folding motion or the unfolding motion is detected (S3904), if the user's selection is not received within a preset time, the controller 230 may remove the second application selection menu from a screen.

When the folding motion or the unfolding motion is detected, the second application selection menu is provided, so that, after the folding motion or the unfolding motion is performed, a user may easily select an application to be co-displayed.

Figure 40:
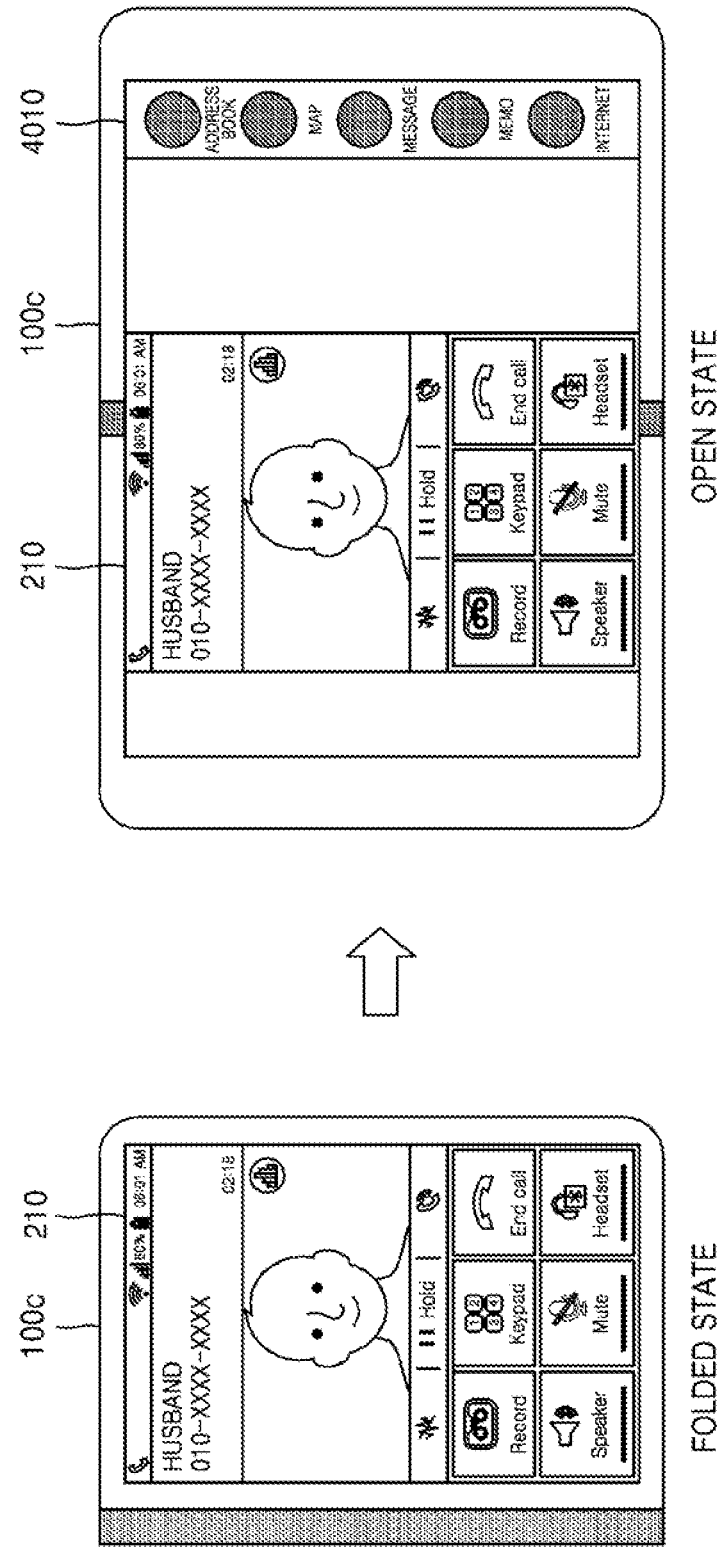
FIG. 40 illustrates an example in which the screen of the first application and the second application selection menu are displayed according to an exemplary embodiment.

FIG. 40 illustrates an example in which the screen of the first application and the second application selection menu are displayed in operation S3906 of the flowchart shown in FIG. 39.

As illustrated in FIG. 40, when an unfolding motion with respect to the device 100c is detected, the controller 230 may co-display the screen of the first application and a second application selection menu 4010 on the display 210. Further, a similar example may be made when a folding motion with respect to the device 100c is detected.

Figure 41:
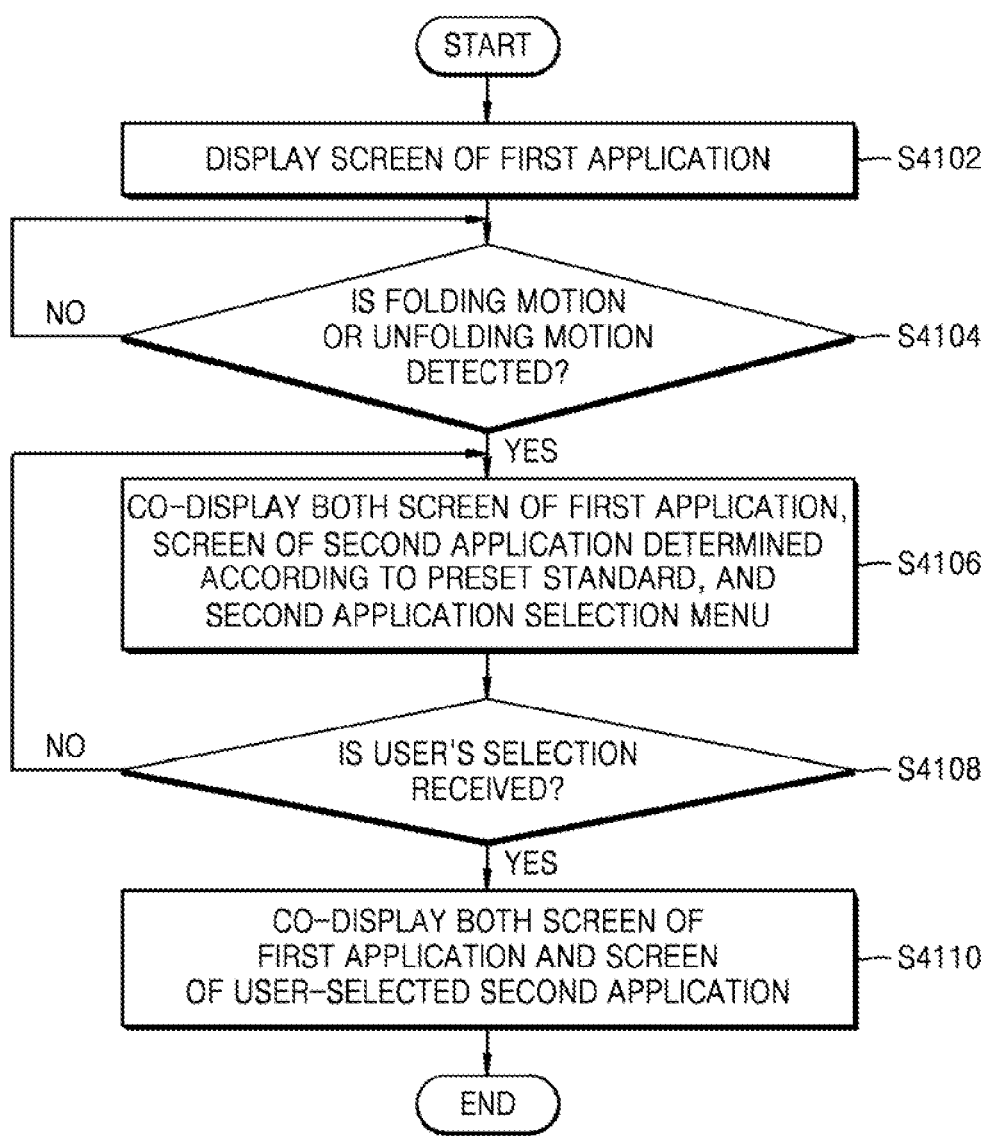
FIG. 41 is a flowchart of a method of controlling a device, according to another exemplary embodiment.

FIG. 41 is a flowchart of a method of controlling a device, according to another exemplary embodiment.

Referring to FIG. 41, when a folding motion or an unfolding motion is detected, a screen of a first application, a screen of a second application, and a second application selection menu are co-displayed.

First, the controller 230 displays the screen of the first application on the display 210 (S4102).

Next, when the state detector 220 detects the folding motion or the unfolding motion (S4104), the screen of the first application, the screen of the second application, and the second application selection menu are co-displayed (S4106).

The screen of the second application that is displayed along with the screen of the first application may be determined according to a preset standard. The second application may be determined according to one of various standards, e.g., the second application may be determined according to a random or pseudo-random selection, a user-predefined second application may be determined as the second application, the second application may be determined according to a list of preset related applications, a recently-executed application may be determined as the second application, or a frequently-used application may be determined as the second application.

When a user input of selecting a second application is received (S4108), the controller 230 co-displays the screen of the first application and a screen of the user-selected second application (S4110). The screen of the second application that was previously displayed is replaced by the screen of the user-selected second application. In one or more exemplary embodiments, the screen of the second application that was previously displayed, and the screen of the user-selected second application are co-displayed.

After the folding motion or the unfolding motion is detected (S4104), if the user input of selecting a second application is not received within a preset time, the controller 230 may remove the second application selection menu from a screen.

When the folding motion or the unfolding motion is detected, the screen of the first application and the screen of the second application may be displayed, but a user may easily change the screen of the second application. Thus, the user may conveniently view a plurality of application screens.

Figure 42:
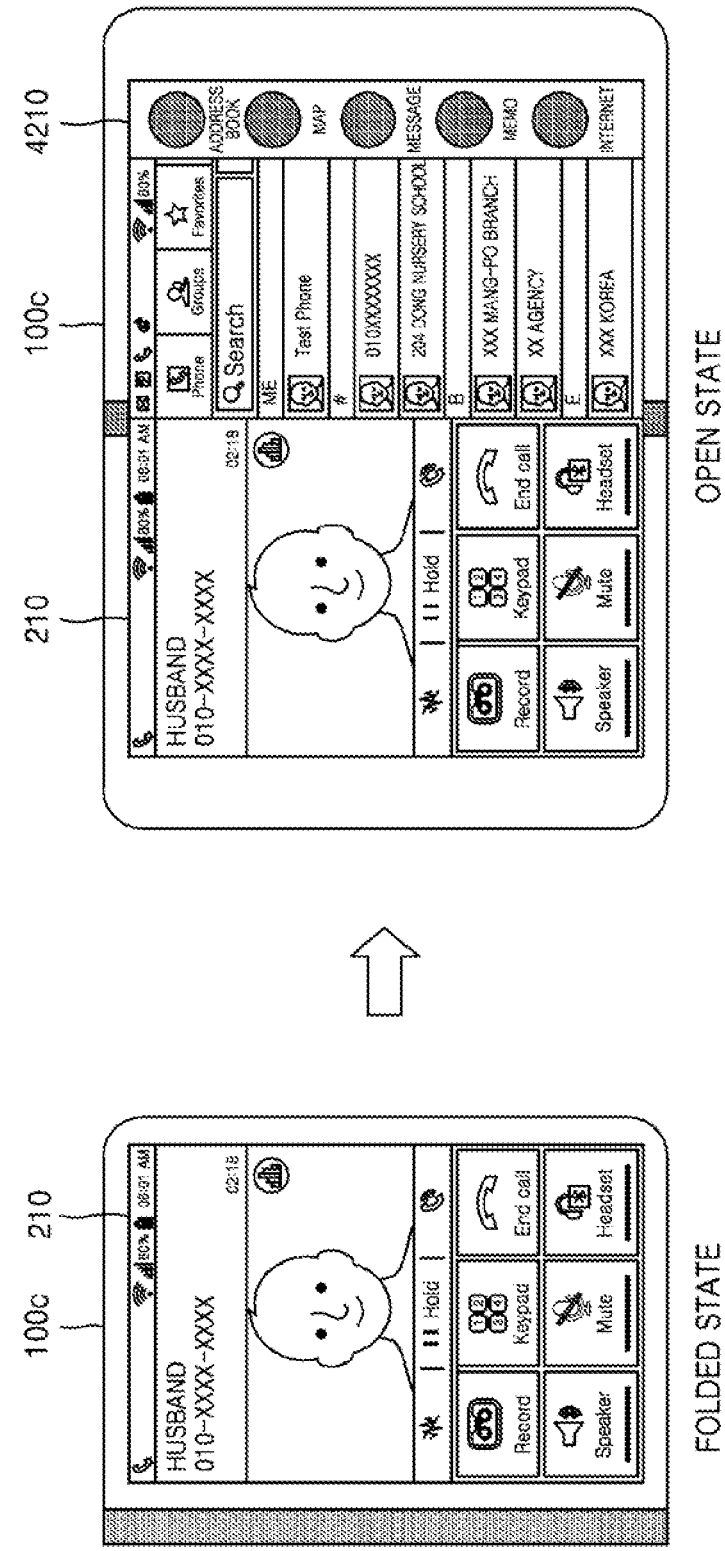
FIG. 42 illustrates an example in which a second application selection menu is provided, according to another exemplary embodiment.

FIG. 42 illustrates an example in which a second application selection menu 4210 is provided, according to another exemplary embodiment.

Referring to FIG. 42, the controller 230 of the device 100c in a folded state displays a screen of a first application on the display 210, and, when the device 100c is changed to an open state, the controller 230 may co-display the screen of the first application, a screen of a second application, and the second application selection menu 4210 on the display 210.

Figure 43:
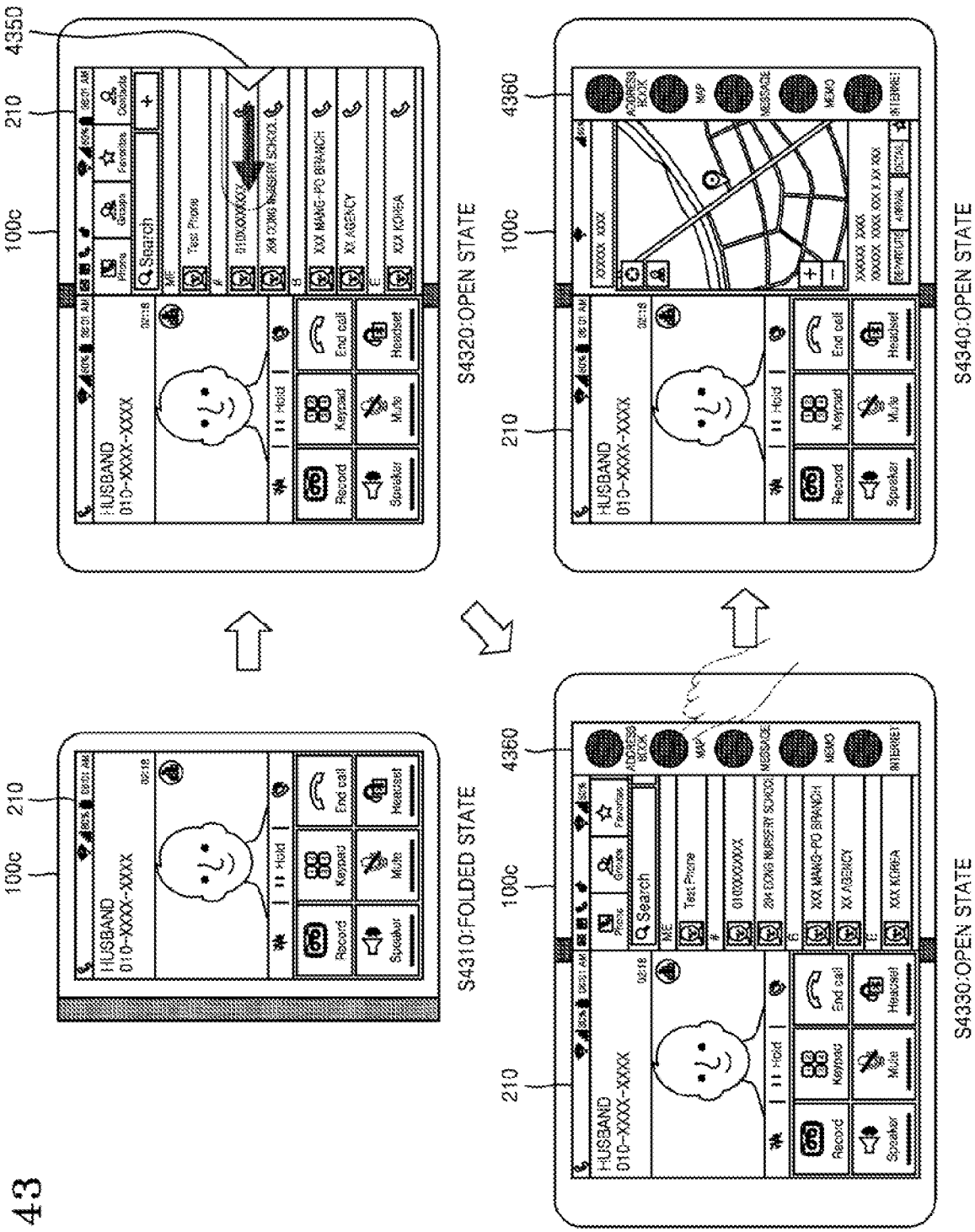
FIG. 43 illustrates an example in which a second application selection menu is provided, according to another exemplary embodiment.

FIG. 43 illustrates an example in which a second application selection menu 4360 is provided, according to another exemplary embodiment.

Referring to FIG. 43, the controller 230 of the device 100c in a folded state displays a screen of a first application on the display 210 (S4310), and when the device 100c is changed to an open state, the controller 230 may co-display, on the display 210, the screen of the first application, a screen of a second application, and a first menu 4350 for requesting the second application selection menu 4360 (S4320). When a user requests the device 100c to provide a second application selection menu via the first menu 4350, the controller 230 co-displays the screen of the first application, the screen of the second application, and the second application selection menu 4360 (S4330). When a user input is received via the second application selection menu 4360, the controller 230 co-displays the screen of the first application and a screen of a user-selected second application (S4340).

Figure 44:
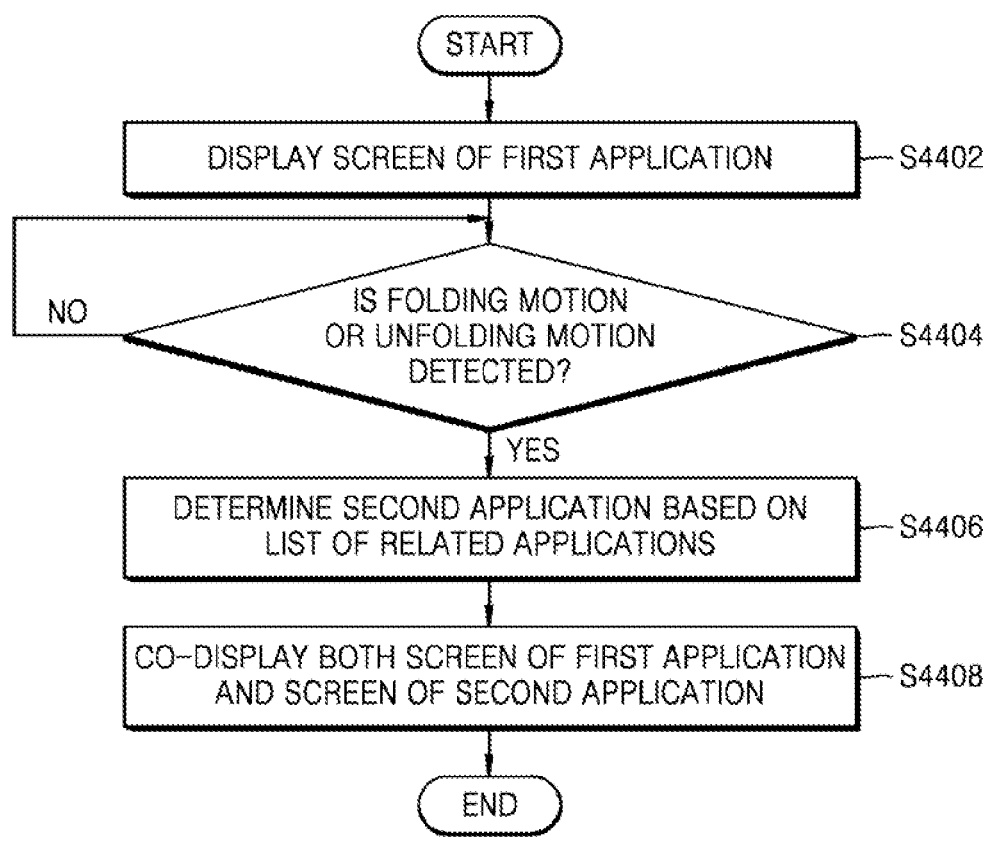
FIG. 44 is a flowchart of a method of controlling the device, according to another exemplary embodiment.

FIG. 44 is a flowchart of a method of controlling the device 100a, according to another exemplary embodiment.

Referring to FIG. 44, when a folding motion or an unfolding motion is detected, the device 100*a* determines a second application based on a pre-stored list of related applications.

First, the device 100*a* displays a screen of a first application (S4402). When the state detector 220 detects the folding motion or the unfolding motion (S4404), the controller 230 determines the second application based on the list of related applications (S4406). The list of related applications indicates types of the second application to be matched according to types of the first application. The list of related applications may be stored in the device 100*c*. For example, the list of related applications may be stored in a storage of the device 100*c*.

Next, the controller 230 co-displays a screen of the determined second application and the screen of the first application (S4408).

FIG. 45 illustrates an example of the list of related applications, according to an exemplary embodiment.

The list of related applications includes information about types of a second application to be matched according to types of a first application. For example, as illustrated in FIG. 45, if the first application is a book-related application, the second application may be a dictionary-related application. Further, if the first application is a camera-related application, the second application may be a photo album-related application.

Information about related applications that are likely to be used together by a user is stored, and the first application and the second application are automatically matched. Therefore, when the folding motion or the unfolding motion is detected, the user may conveniently use the related applications.

Figure 46:
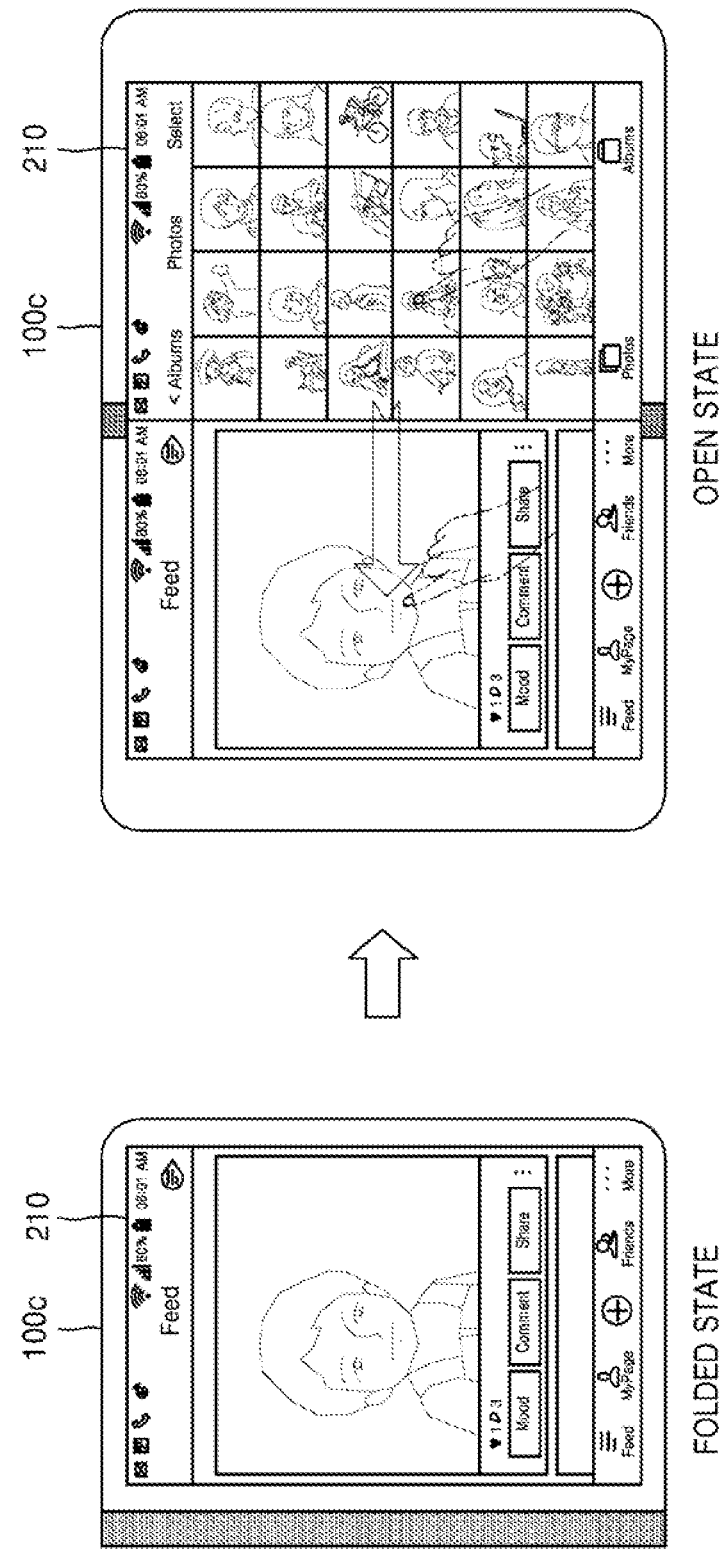
FIG. 46 illustrates an example in which a screen of a first application and a screen of a second application are co-displayed based on a list of related applications, according to an exemplary embodiment.

FIG. 46 illustrates an example in which a screen of a first application and a screen of a second application are co-displayed based on a list of related applications, according to an exemplary embodiment.

In FIG. 46, a social networking service (SNS) application is used in the device 100*c* in a folded state. When the device 100*c* is changed to an open state, the controller 230 determines the second application as a photo album application, based on the list of related applications, and co-displays a screen of the SNS application and a screen of the photo album application. A user may easily upload a picture to the SNS application by dragging and dropping the picture from the photo album application.

Figure 47:
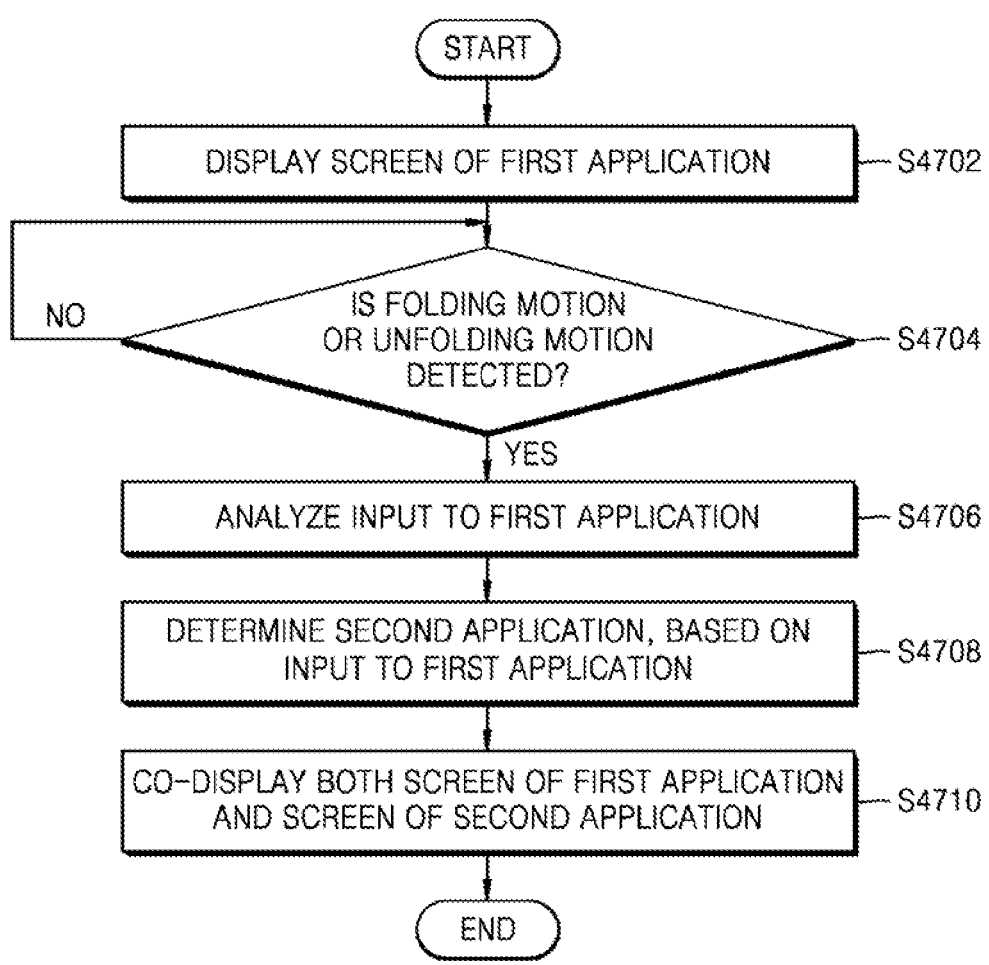
FIG. 47 is a flowchart of a method of controlling the device, according to another exemplary embodiment.

FIG. 47 is a flowchart of a method of controlling the device 100*c*, according to another exemplary embodiment.

Referring to FIG. 47, when the device 100*c* detects a folding motion or an unfolding motion, the device 100*c* determines a second application, based on an input to a first application. Since the input to the first application usually represents current user interests, it is possible to obtain information about the current interests of the user.

First, the device 100*c* displays a screen of the first application (S4702). When the state detector 220 detects the folding motion or the unfolding motion (S4704), the controller 230 analyzes the input to the first application so as to determine the second application (S4706). For example, the input to the first application may include a voice of a caller or a receiver of a phone application, a message of a messenger, or the like. Next, the controller 230 determines the second application, based on a result of analyzing the input to the first application (S4708).

When the second application is determined, the controller 230 co-displays a screen of the determined second application and a screen of the first application (S4710).

Figure 48:
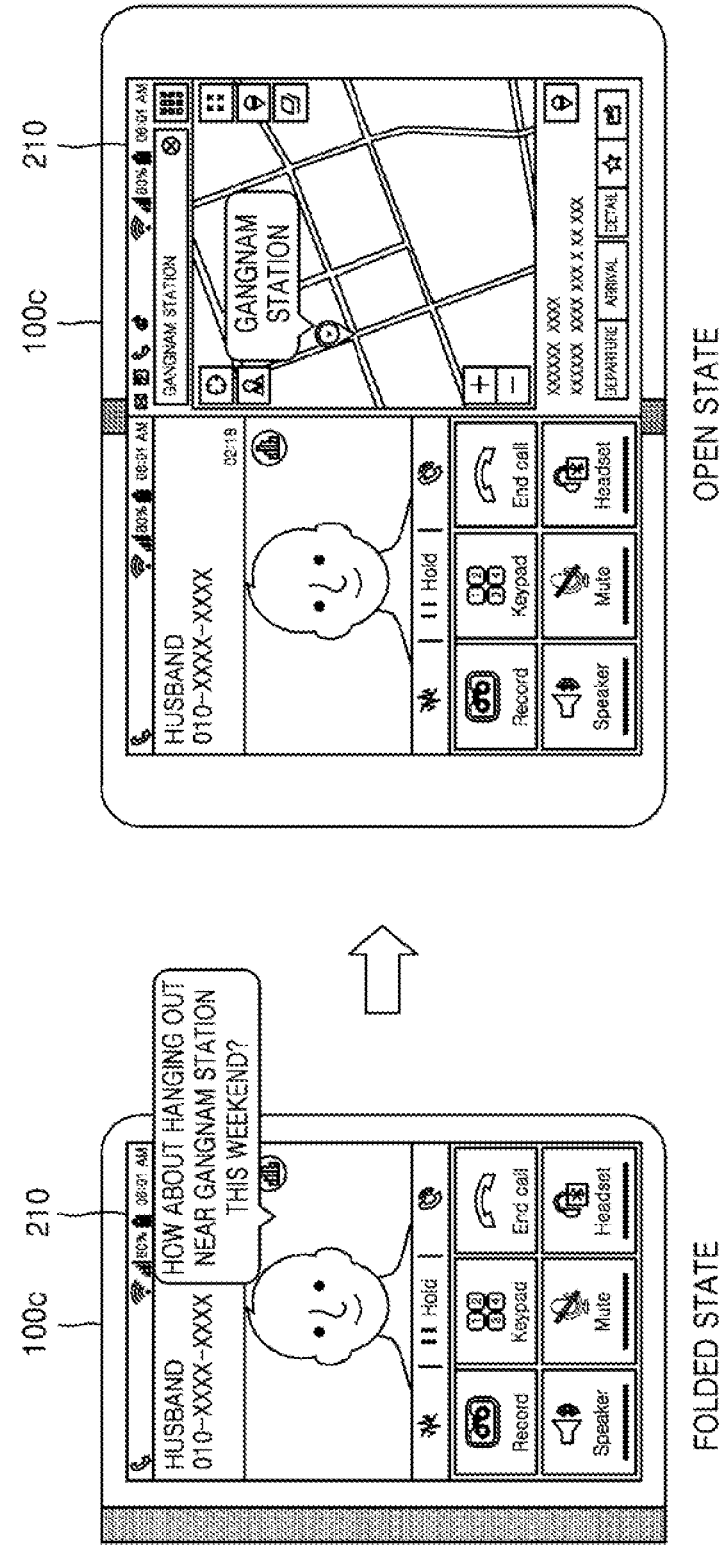
FIG. 48 illustrates an example in which a second application is determined, and a screen of the second application is displayed, according to an exemplary embodiment.

FIG. 48 illustrates an example in which a second application is determined, and a screen of the second application is displayed, according to an exemplary embodiment.

Referring to FIG. 48, when a first application is a phone application, the controller 230 recognizes contents of phone conversation between a caller and a receiver, and determines the second application according to the contents of the phone conversation. For example, if one of the call participants says "How about hanging out near Gangnam station this weekend?," the controller 230 recognizes that a specific place name is included in the phone conversation, and thus may determine a map application as the second application.

Afterward, when the device 100*c* detects a folding motion or an unfolding motion, the controller 230 displays a screen of the phone application as a screen of the first application, and displays a screen of the map application as a screen of the second application. When the screen of the map application is displayed, the controller 230 may display a map screen where "Gangnam station," recognized from the phone conversation is marked.

The device 100*c* may recognize the contents of the phone conversation of a user, and thus may easily and conveniently provide user-interested information to the user.

Figure 49:
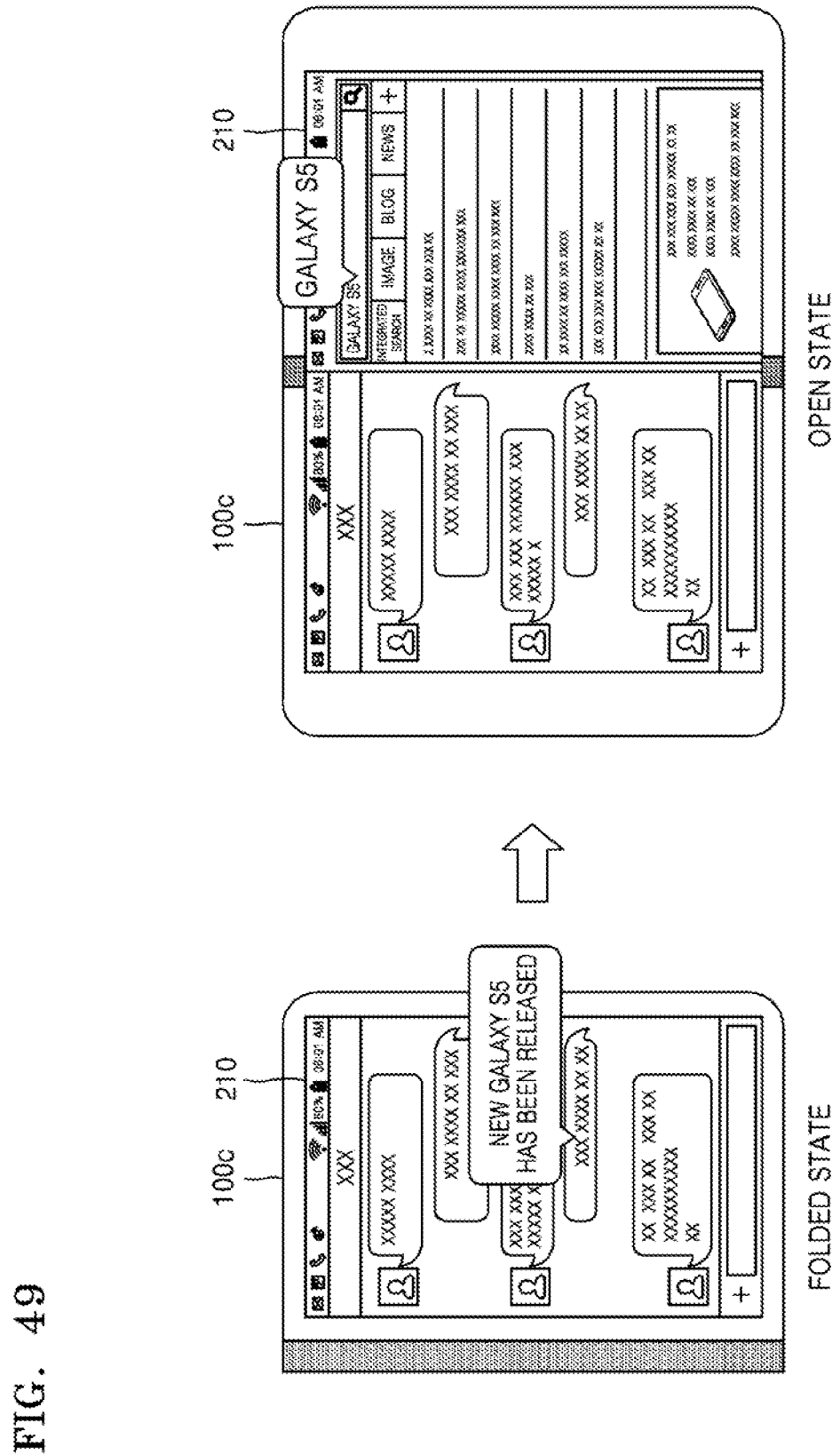
FIG. 49 illustrates an example in which a second application is determined, and a screen of the second application is displayed, according to another exemplary embodiment.

FIG. 49 illustrates an example in which a second application is determined, and a screen of the second application is displayed, according to another exemplary embodiment.

Referring to FIG. 49, when a first application is a messenger application or a short-text message application, the controller 230 may analyze contents of a message transmitted from or received by the first application, and thus may determine the second application. For example, if a message including "new galaxy S5 has been released" is transmitted or received by the first application, the controller 230 may analyze contents of the message and may determine a search application as the second application so as to search for the content of the message in websites.

Afterward, when the device 100*c* detects a folding motion or an unfolding motion, the controller 230 may co-display a screen of the messenger application or the short-text message application as the first application, and a screen of the search application as the second application. The controller 230 may display, on a screen of the search application, a screen related to a search result obtained by inputting a keyword, which is included in the message, into a search window.

Figure 50:
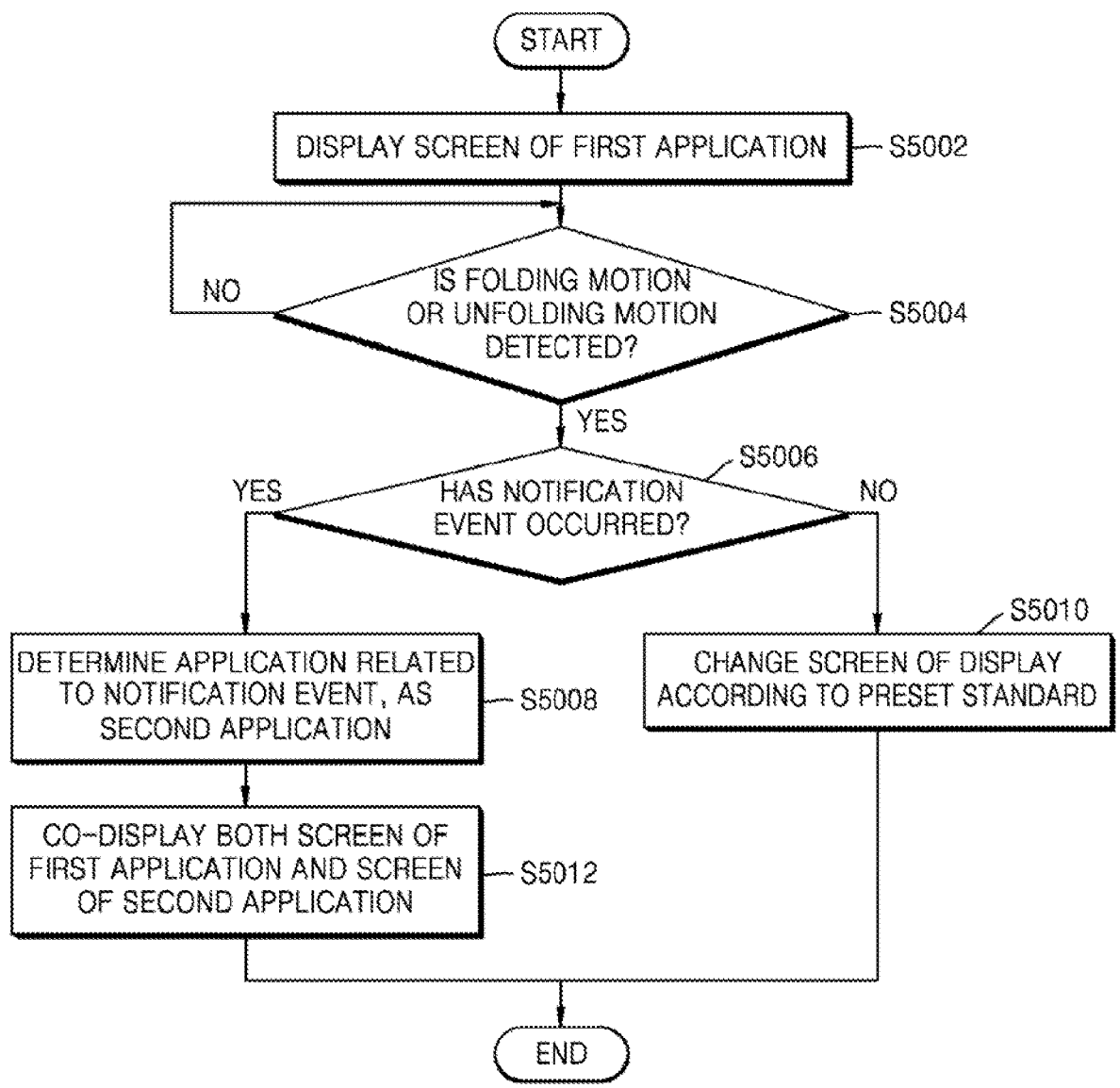
FIG. 50 is a flowchart of a method of controlling the device, according to another exemplary embodiment.

FIG. 50 is a flowchart of a method of controlling the device 100*a*, according to another exemplary embodiment.

Referring to FIG. 50, when a notification event occurs and a folding motion or an unfolding motion is detected, the device 100*a* determines, as a second application, an application related to the notification event. A user may execute the application related to the notification event, by performing a simple motion, e.g., by changing a folding state of the device 100*a*.

First, the device 100*a* displays a screen of a first application (S5002), and when the state detector 220 detects the folding motion or the unfolding motion (S5004), the controller 230 determines the second application.

The controller 230 determines whether the notification event occurs (S5006). The notification event may include reception of a short text message, reception of an incoming call, reception of an email, reception of a messenger message, reception of a notice from an SNS application, or reception of notices from various applications.

If the notification event occurs (S5006), the controller 230 determines, as the second application, an application related to the notification event (S5008). For example, if a short text message has been received, the second application is determined as a short text message application. If an email has been received, the second application is determined as a mail application. If the messenger message has been received, the second application is determined as a messenger application. If a notice has been received from the SNS application, the second application is determined as the SNS application.

Next, the controller 230 co-displays a screen of the determined second application and a screen of the first application (S5012).

If the notification event did not occur (S5006), the controller 230 changes a screen of the display 210, according to a preset standard (S5010). The preset standard may vary according to various exemplary embodiments. The preset standard may involve determining an application as the second application, wherein the application was previously set to be executed with the first application. In one or more exemplary embodiments, the preset standard may involve determining an application as the second application, wherein the application was preset by a user via a setting menu or the like. In one or more exemplary embodiments, the preset standard may involve, when a folding motion or an unfolding motion is detected, changing the screen of the first application by changing a size or a disposition of the screen of the first application.

Figure 51:
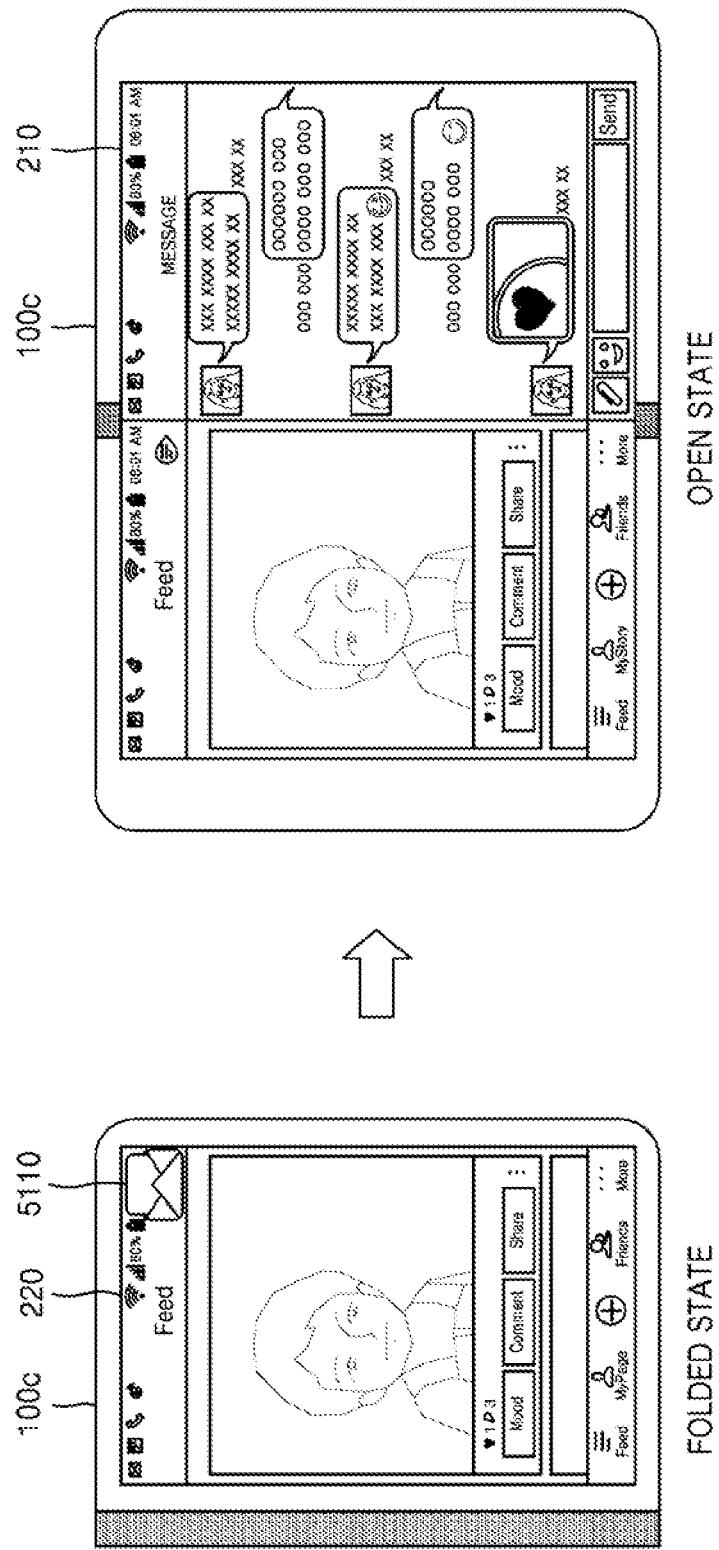
FIG. 51 illustrates an example in which a second application is determined, and a screen of the second application is displayed, according to another exemplary embodiment.

FIG. 51 illustrates an example in which a second application is determined, and a screen of the second application is displayed, according to another exemplary embodiment.

Referring to FIG. 51, the device 100*c* receives a messenger message while the device 100*c* displays a screen of a first application, and when the device 100*c* detects an unfolding motion, the controller 230 co-displays a screen of a messenger application and the screen of the first application. While the screen of the first application is displayed, if an icon 5110 indicating a notification event is displayed, a user may perform an unfolding motion on the device 100*c*, and thus may execute an application related to the notification event and may check the notification event.

Figure 52:
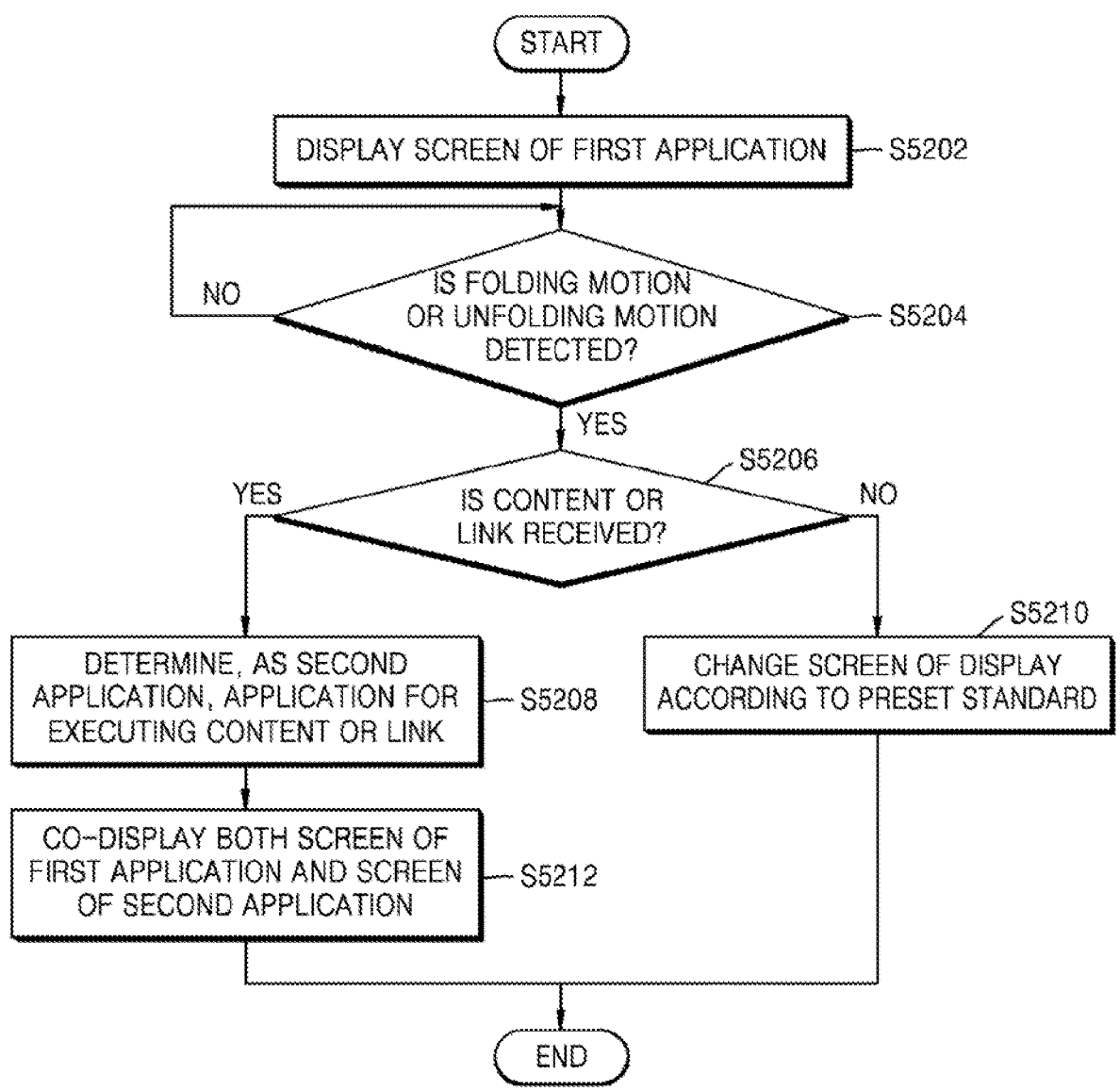
FIG. 52 is a flowchart of a method of controlling the device, according to another exemplary embodiment.

FIG. 52 is a flowchart of a method of controlling the device 100*a*, according to another exemplary embodiment.

Referring to FIG. 52, when content or a link is received, and a folding motion or an unfolding motion is detected, the device 100*a* determines, as a second application, an application for executing the content or the link. A user may execute the application for executing the content or the link, by simply folding or unfolding the device 100*a*.

First, the device 100*a* displays a screen of a first application (S5202), and when the state detector 220 detects the folding motion or the unfolding motion (S5204), the controller 230 determines whether the content or the link is received via the first application (S5206). The content may include a picture, a video, music, contact information, an electronic business card, or the like. The link may include an internet site link, an application execution path link, a map information link of a map application, or the like.

When the content or the link is received (S5206), the controller 230 determines, as the second application, an application for executing the content or the link that is received via the first application (S5208). For example, if the picture is received, the second application may be a photo album application, a photo reproducing application, a photo browser application, or the like. If the video has been received, the second application may include a video reproducing application, a video browser application in the first application, or the like. If the music is received, the second application may be a music application. If the contact information is received, the second application may be a contact information application. If the electronic business card is received, the second application may include the contact information application, an electronic business card managing application, or the like. If the internet site link is received, the second application may be an internet browser application. If the application execution path link has been received, the second application may be an application-installation application. If the map information link of the map application is received, the second application may be the map application.

Next, the controller 230 co-displays a screen of the determined second application and the screen of the first application (S5212).

When the content or the link is not received (S5206), the controller 230 changes a screen of the display 210 according to a preset standard (S5210). The preset standard may vary according to various exemplary embodiments. For example, in the present embodiment, the preset standard may involve determining an application as the second application, wherein the application was previously set to be executed with the first application. In some embodiments, the preset standard may involve determining an application as the second application, wherein the application was preset by a user via a setting menu or the like. In some embodiments, the preset standard may involve, when a folding motion or an unfolding motion is detected, changing the screen of the first application by changing a size or a disposition of the screen of the first application.

Figure 53:
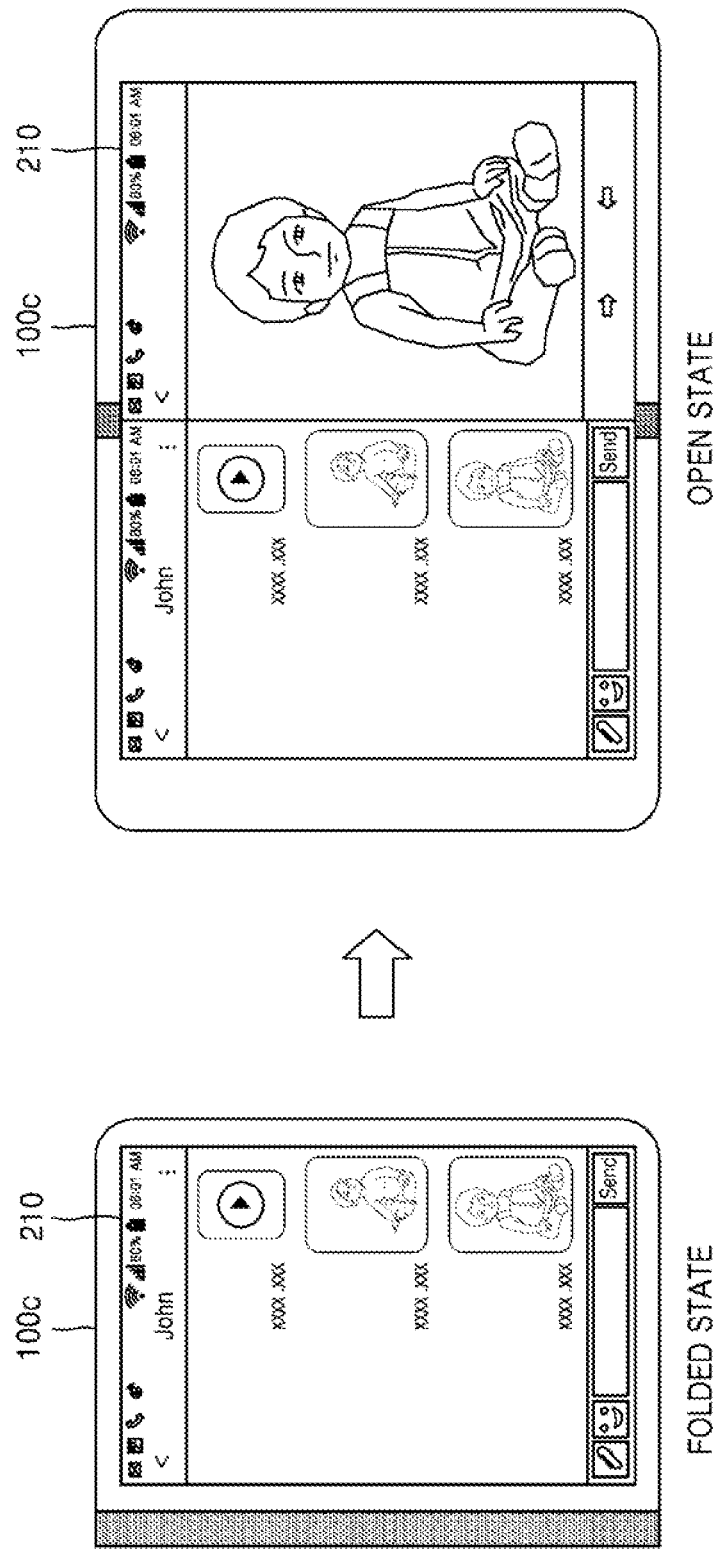
FIG. 53 illustrates an example in which a second application is determined, and a screen of the second application is displayed, according to another exemplary embodiment.

FIG. 53 illustrates an example in which a second application is determined, and a screen of the second application is displayed, according to another exemplary embodiment.

Referring to FIG. 53, in a case where a first application is a messenger application, a message attached with a picture is received via the messenger application, and an unfolding motion with respect to the device 100*c* is detected, the controller 230 may determine a photo album application as the second application. In this case, when the unfolding motion with respect to the device 100*c* is detected, a screen of the messenger application and a screen of the photo album application are co-displayed. Also, the controller 230 may display a screen where the picture attached to the message of the messenger application is reproduced in the photo album application.

Figure 54:
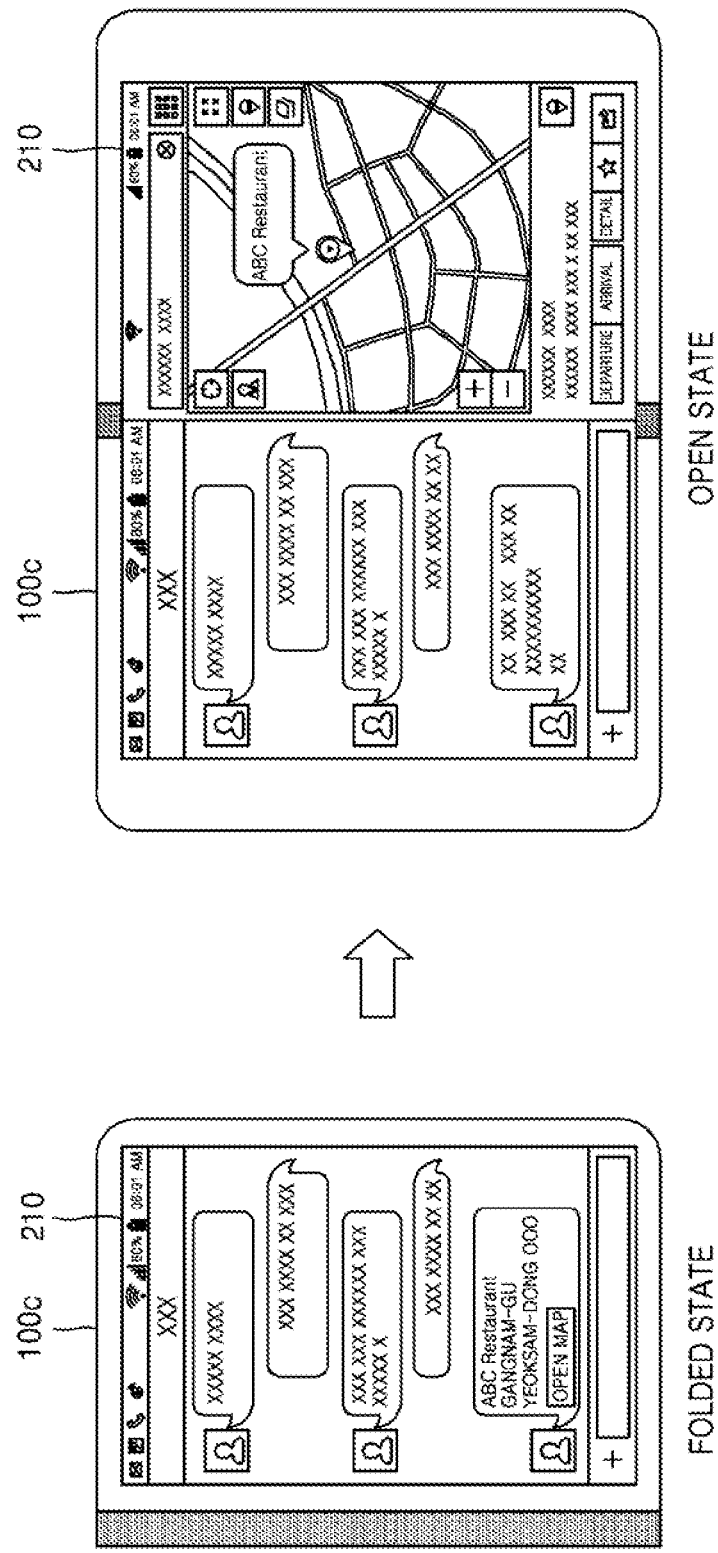
FIG. 54 illustrates an example in which a second application is determined, and a screen of the second application is displayed, according to another exemplary embodiment.

FIG. 54 illustrates an example in which a second application is determined, and a screen of the second application is displayed, according to another exemplary embodiment.

Referring to FIG. 54, in a case where a first application is a messenger application, a message attached with a map link is received via the messenger application, and an unfolding motion with respect to the device 100*c* is detected, the controller 230 may determine a map application as the second application. In this case, when the unfolding motion with respect to the device 100*c* is detected, a screen of the messenger application and a screen of the map application are co-displayed. Also, the controller 230 may display, in the map application, a map corresponding to the map link of the messenger application.

Figure 55:
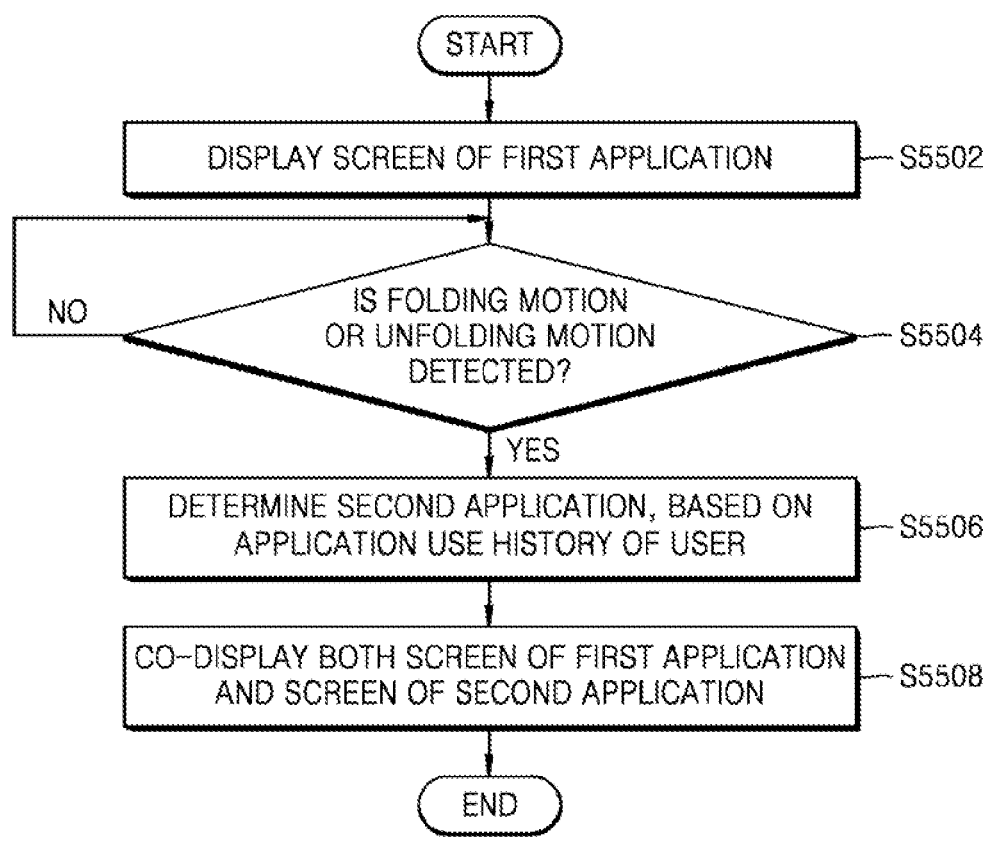
FIG. 55 is a flowchart of a method of controlling the device, according to another exemplary embodiment.

FIG. 55 is a flowchart of a method of controlling the device 100*a*, according to another exemplary embodiment.

Referring to FIG. 55, when a folding motion or an unfolding motion is detected, the device 100*a* determines a second application based on an application use history of a user.

First, the device 100*a* displays a screen of a first application (S5502), and when the state detector 220 detects the folding motion or the unfolding motion (S5504), the controller 230 determines a second application, based on the application use history of the user (S5506). For example, the controller 230 may determine, as the second application, an application that is frequently used by the user, an application that is recently used, or an application that is executed in a background. In one or more exemplary embodiments, when the user requested the device 100a to execute a particular application via a second application selection menu, the controller 230 may obtain information about a user-preferred application by learning an application selection history of the user, and may determine the user-preferred application as the second application.

Next, the controller 230 co-displays a screen of the determined second application and the screen of the first application (S5508).

Figure 56:
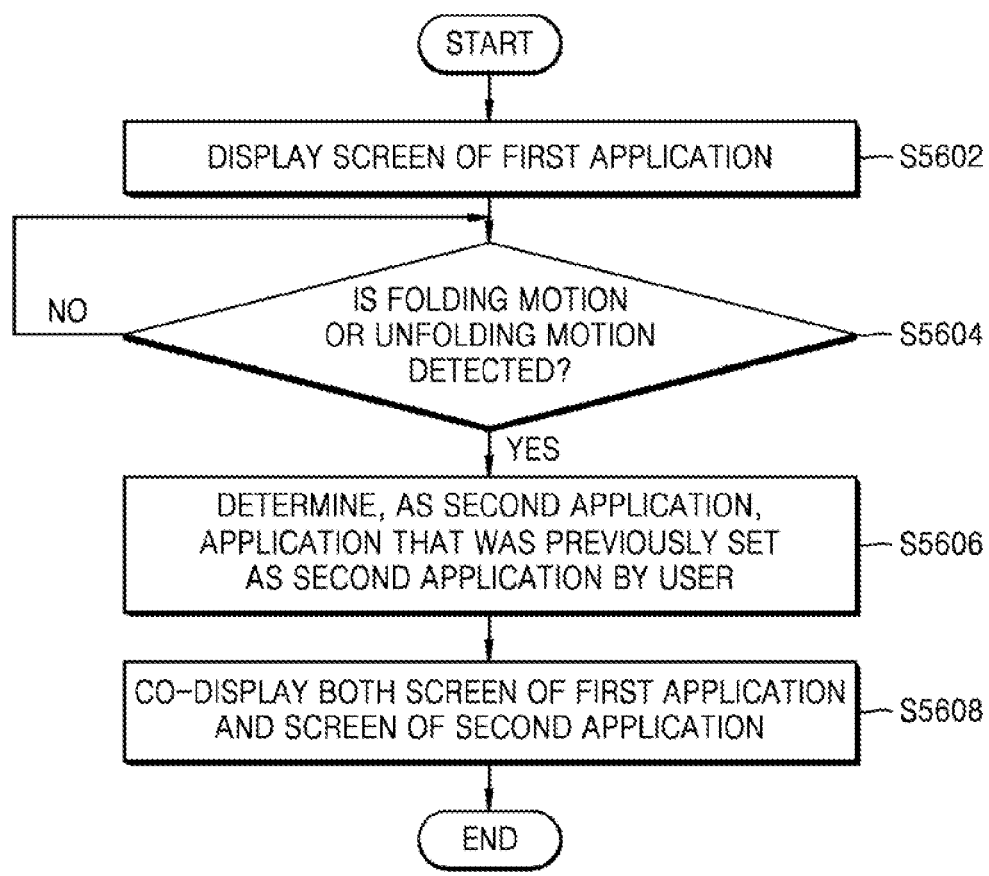
FIG. 56 is a flowchart of a method of controlling the device, according to another exemplary embodiment.

FIG. 56 is a flowchart of a method of controlling the device 100a, according to another exemplary embodiment.

Referring to FIG. 56, when the device 100a detects a folding motion or an unfolding motion, the device 100a determines a user-preset application as a second application.

First, the device 100a displays a screen of a first application (S5602), and when the state detector 220 detects the folding motion or the unfolding motion (S5604), the controller 230 determines, as the second application, an application that was previously set as the second application by the user (S5606). For example, it is possible to set in such a manner that, when the user unfolds the device 100a, i.e., when a state of the device 100a is changed from a folded state to an open state, the device 100a always co-displays the screen of the first application and a screen of an internet browser application. The user may previously set the second application by using an application for setting or a setting menu of the device 100a.

Next, the controller 230 co-displays a screen of the determined second application and the screen of the first application (S5608).

The user may set an application, which the user frequently uses, as the second application. Thus, the user may access the frequently-used application by simply performing the folding motion or the unfolding motion.

Figure 57:
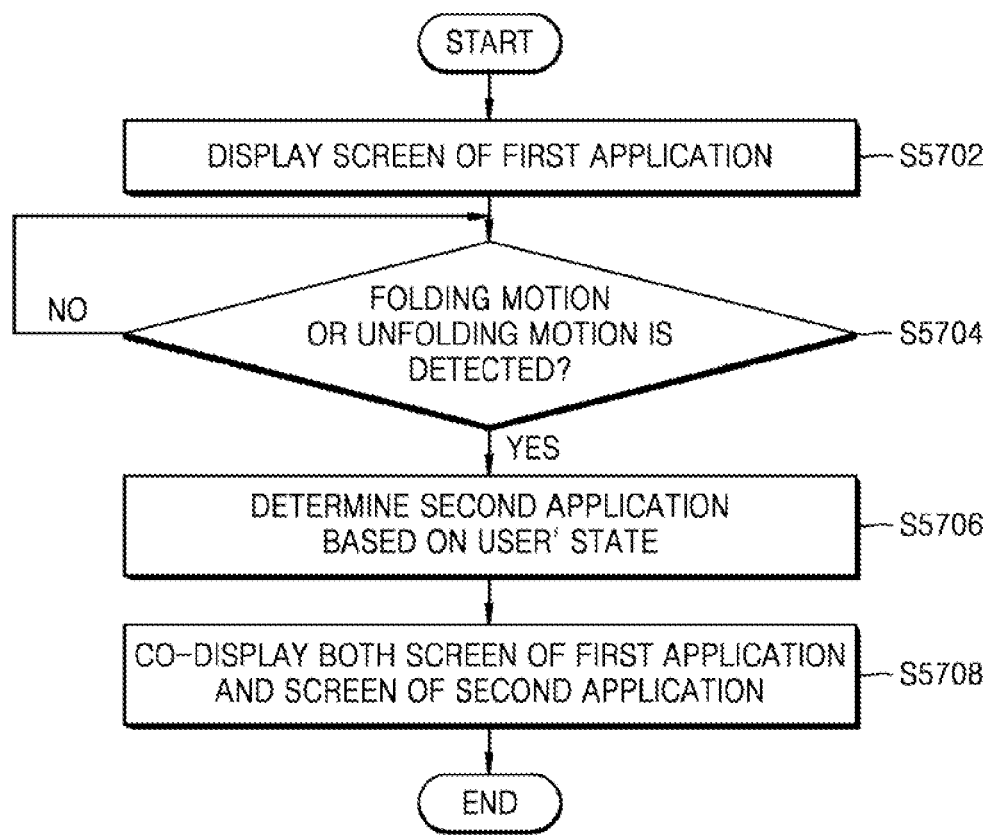
FIG. 57 is a flowchart of a method of controlling the device, according to another exemplary embodiment.

FIG. 57 is a flowchart of a method of controlling the device 100a, according to another exemplary embodiment.

Referring to FIG. 57, when the device 100a detects a folding motion or an unfolding motion, the device 100a determines a second application based on a user's state.

First, the device 100a displays a screen of a first application (S5702), and when the state detector 220 detects the folding motion or the unfolding motion (S5704), the controller 230 determines the second application based on the user' state (S5706). For example, the controller 230 may determine the second application, in consideration of a current position, a time, a schedule, etc., of a user.

Next, the controller 230 co-displays a screen of the determined second application and the screen of the first application (S5708).

Figure 58:
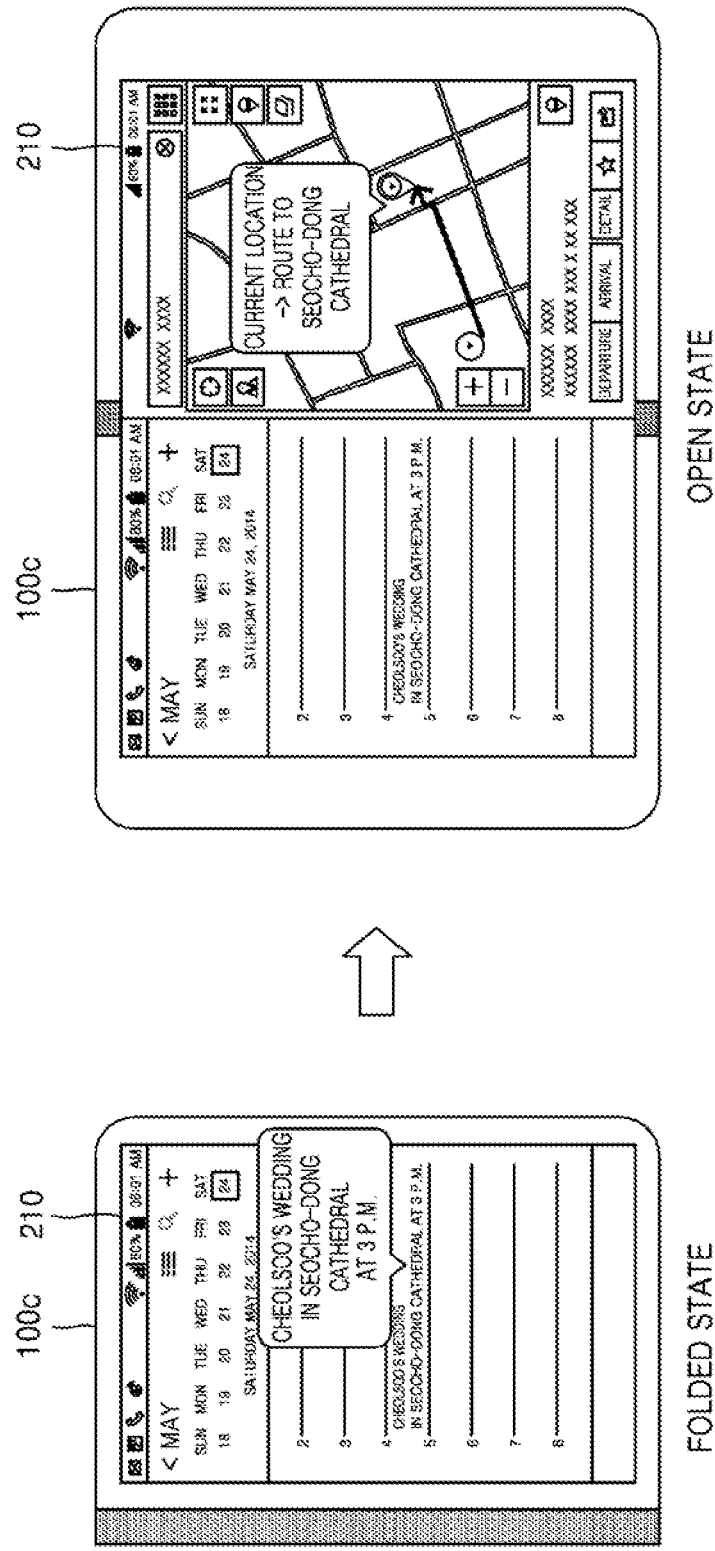
FIG. 58 illustrates an example in which a second application is determined, and a screen of the second application is displayed, according to another exemplary embodiment.

FIG. 58 illustrates an example in which a second application is determined, and a screen of the second application is displayed, according to another exemplary embodiment.

Referring to FIG. 58, in a case where a first application is a schedule management application, the controller 230 may determine the second application, based on a current position, a current time, and a schedule of a user. For example, in a case where the schedule management application includes a recorded schedule about a wedding in Seocho-dong Cathedral at 3 p.m. today, and a current time is 2 p.m., when the user performs an unfolding motion on a device while the schedule management application is displayed on the device, the controller 230 may co-display both the schedule management application and a map application showing a route from a current location to Seocho-dong Cathedral.

Figure 59:
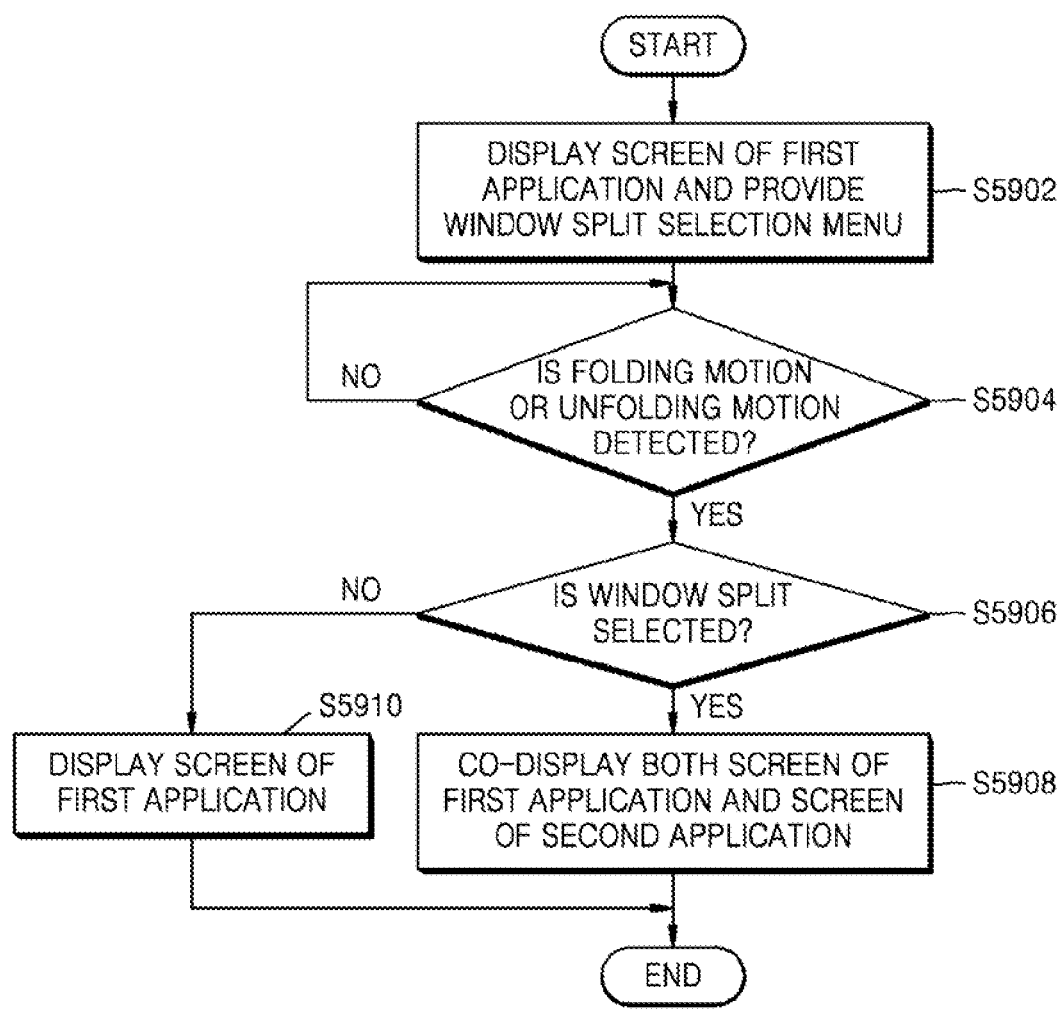
FIG. 59 is a flowchart of a method of controlling the device, according to another exemplary embodiment.

FIG. 59 is a flowchart of a method of controlling the device 100c, according to another exemplary embodiment.

Referring to FIG. 59, when the device 100c detects a folding motion or an unfolding motion, the device 100c may co-display a screen of a first application and a screen of a second application, or may display only the screen of the first application and may not display the screen of the second application, according to a user input.

First, the device 100c displays the screen of the first application and simultaneously provides a window split selection menu (S5902). In one or more exemplary embodiments, the window split selection menu may be provided as a GUI displayed on the display 210. The window split selection menu may be provided in a preset region of a housing of the device 100c similar to the second application selection menu 3520 shown in FIG. 35.

Next, when the state detector 220 detects the folding motion or the unfolding motion (S5904), the controller 230 determines whether a window split is selected (S5906).

When the window split is selected, the controller 230 co-displays the screen of the first application and the screen of the second application (S5908). The second application may be determined according to the aforementioned various methods.

When the window split is not selected (S5906), the controller 230 displays the screen of the first application (S5910). That is, when the window split is not selected, the controller 230 only displays the screen of the first application, without displaying the screen of the second application.

Figure 60:
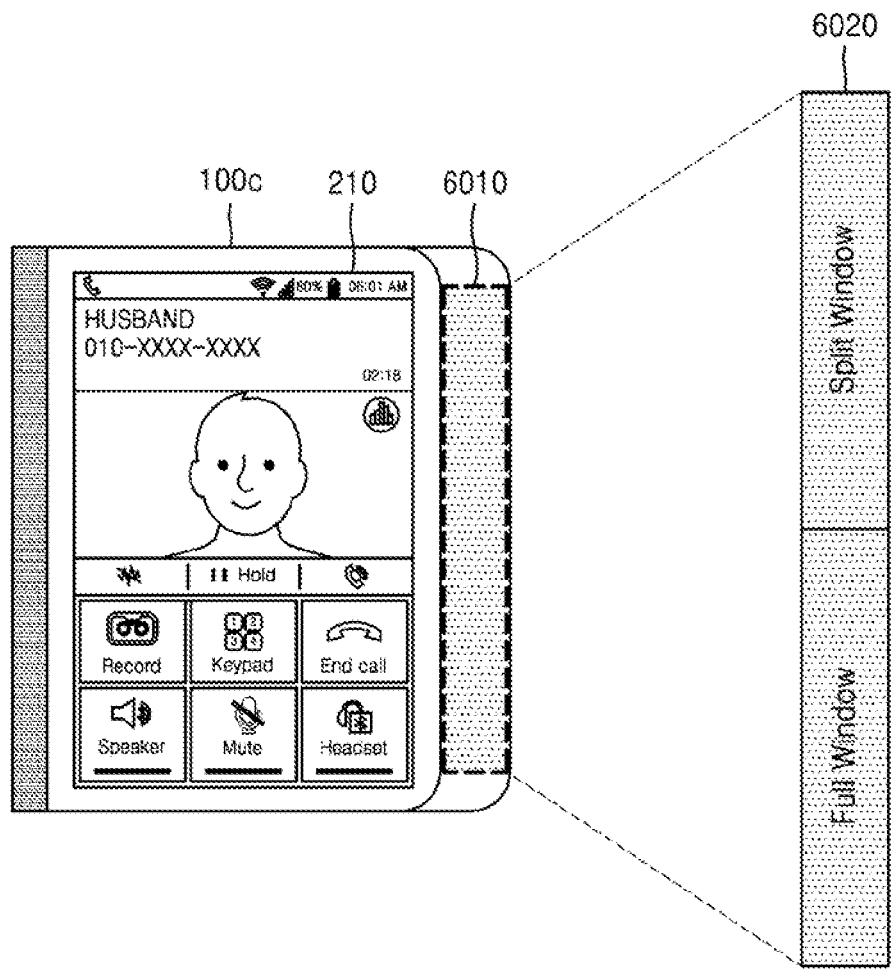
FIG. 60 illustrates an example in which a window split selection menu is provided, according to an exemplary embodiment.

FIG. 60 illustrates an example in which a window split selection menu 6020 is provided, according to an exemplary embodiment.

Referring to FIG. 60, when the device 100c is asymmetrically folded, a screen of a first application is displayed on the display 210 and the window split selection menu 6020 is provided via a fourth region 6010.

From the window split selection menu 6020, a user may select a split window so as to co-display a screen of a second application and the screen of the first application or may select a full window so as to only display the screen of the first application without displaying the screen of the second application. As illustrated in FIG. 60, the fourth region 6010 may be split into two regions, and window split options may be matched to the two regions.

The fourth region 6010 may be on the display 210. The fourth region 6010 may be defined as a portion of a region of the display 210 that is externally exposed in the folded state. When the display 210 is a touchscreen, the window split selection menu 6020 may be displayed on the fourth region 6010 and may receive user's selection in the form of a touch input to the display 210.

In one or more exemplary embodiments, the fourth region 6010 may be disposed on a housing of the device 100c, e.g., may be a region in which a touch sensor, a proximity sensor, etc. are disposed. Information about the window split selection menu 6020 may be displayed in the fourth region 6010 on the housing or may be displayed on a portion of a region of the display 210 that is externally exposed.

The window split selection menu 6020 is provided in a preset region that is physically separated from the display 210 on which the screen of the first application is displayed when the device 100c is asymmetrically folded, so that a user may intuitively access the window split selection menu 6020. Furthermore, the window split selection menu 6020 is provided by using a region of a lower layer that is exposed due to the asymmetrical folding, the window split selection menu 6020 may be displayed without covering the screen of the first application and without making a screen disposition complicated.

Figure 61:
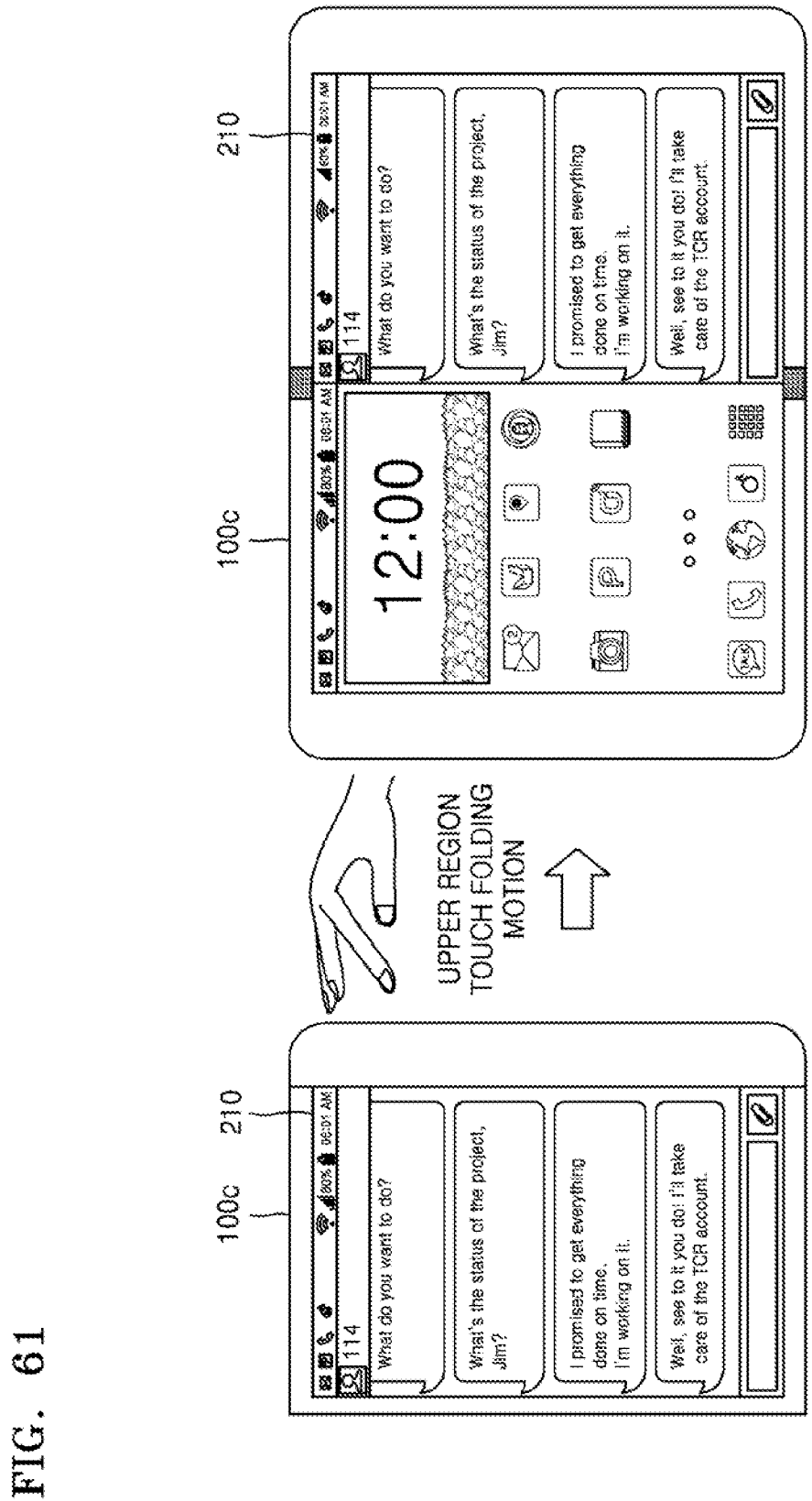
FIG. 61 illustrates an example of a screen in which it is selected, from a window split selection menu, to display a screen of a second application.

FIG. 61 illustrates an example of a screen in which it is selected, from a window split selection menu, to display a screen of a second application according to an exemplary embodiment.

Referring to FIG. 61, in a folded state of the device 100*c*, when a user selects an option of displaying the screen of the second application, and changes a state of the device 100*c* from the folded state to an open state, the controller 230 co-displays a screen of a first application and the screen of the second application.

Figure 62:
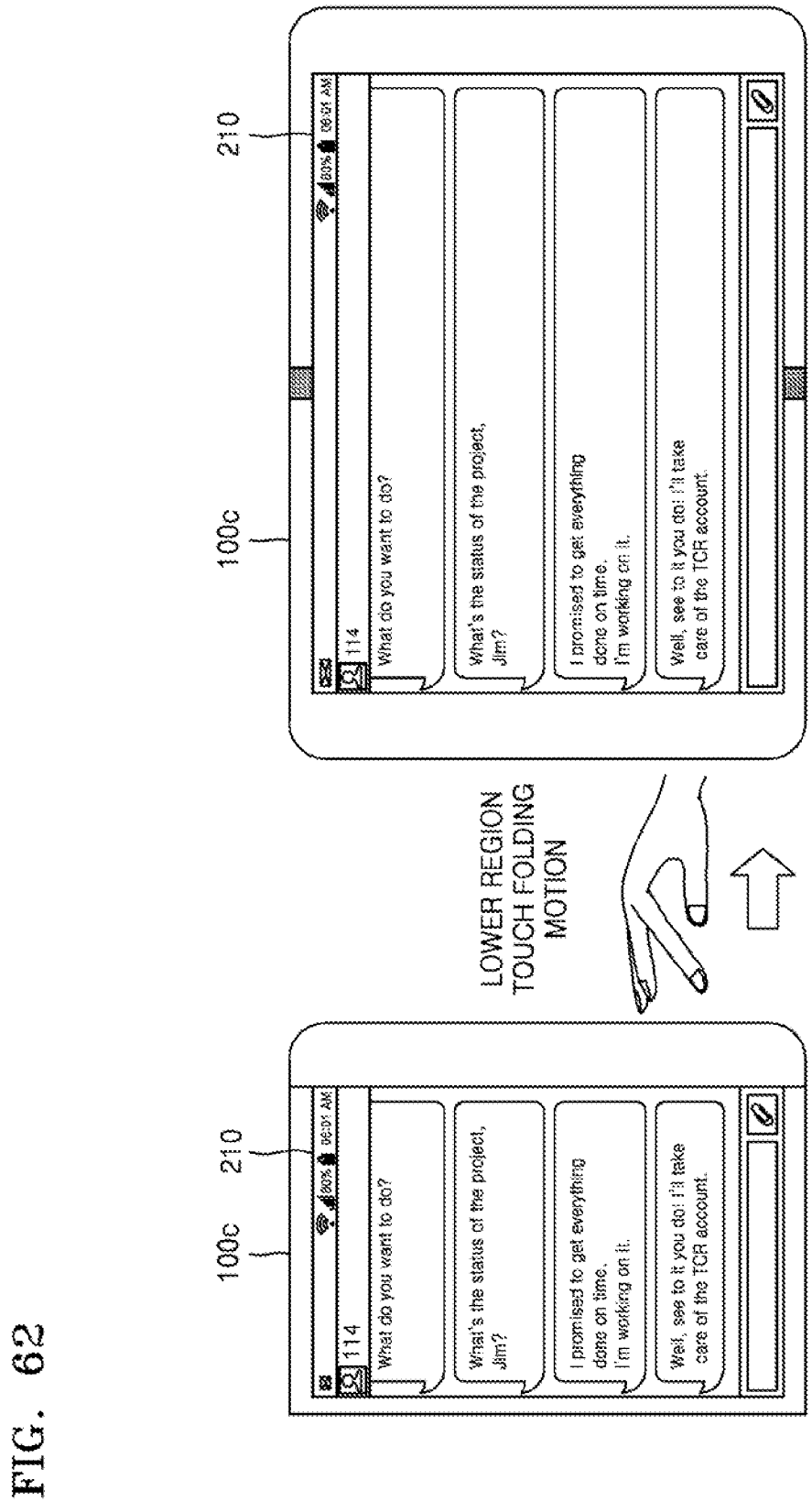
FIG. 62 illustrates an example of a screen in which it is selected, from a window split selection menu, to not display a screen of a second application according to an exemplary embodiment.

FIG. 62 illustrates an example of a screen in which it is selected, from a window split selection menu, not to display a screen of a second application according to an exemplary embodiment.

Referring to FIG. 62, in a folded state of the device 100*c*, when a user selects an option of not displaying the screen of the second application, and changes a state of the device 100*c* from the folded state to an open state, the controller 230 only displays a screen of a first application. In the open state, a size or a disposition of the screen of the first application may be changed according to a preset standard.

Figure 63:
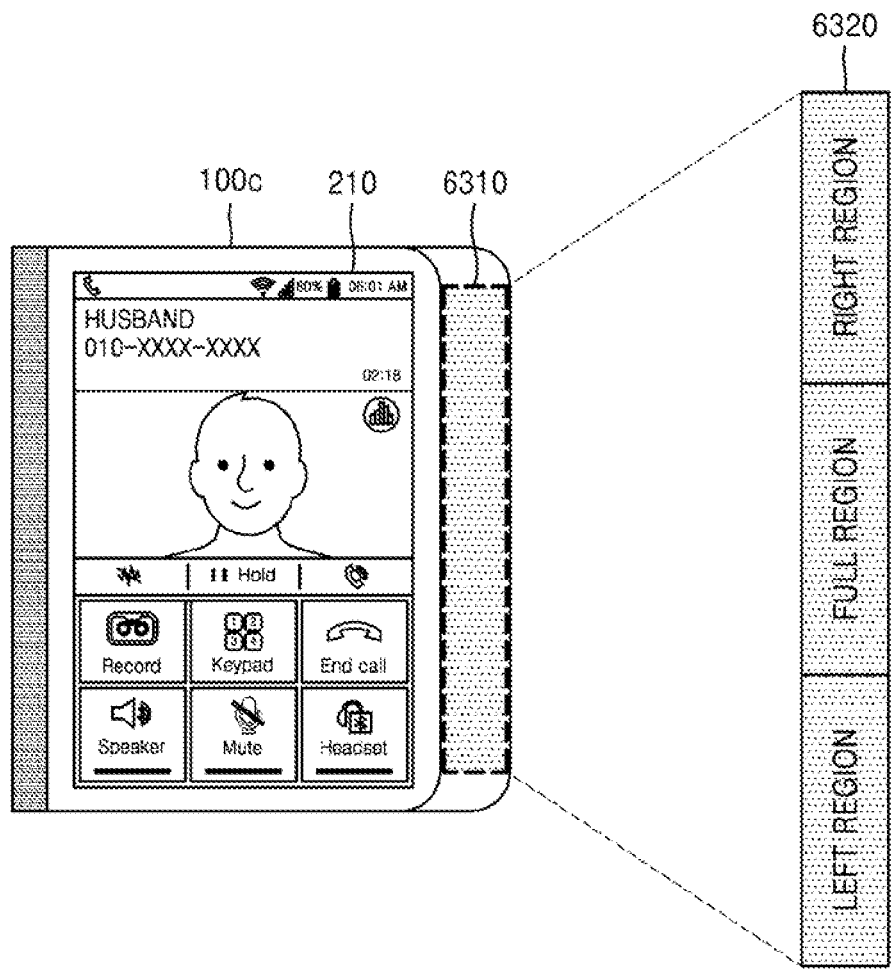
FIG. 63 illustrates an example in which a window disposition selection menu is provided, according to an exemplary embodiment.

FIG. 63 illustrates an example in which a window disposition selection menu 6320 is provided, according to an exemplary embodiment.

According to the present embodiment, when the device 100*c* co-displays a screen of a first application and a screen of a second application, the device 100*c* may provide the window disposition selection menu 6320 for receiving an input of selecting a disposition form of the screen of the first application and a disposition form of the screen of the second application. A user may select disposition of the screen of the first application and the screen of the second application from the window disposition selection menu 6320. The window disposition selection menu 6320 may be provided via the display unit 210 or a housing of the device 100*c*.

Referring to FIG. 63, the device 100*c* is asymmetrically folded, and the device 100*c* in the folded state displays the screen of the first application on the display 210 and provides a window disposition selection menu 6320 to a fifth region 6310.

The window disposition selection menu 6320 is a menu from which the user may select an option related to the disposition of the screen of the first application and the screen of the second application. For example, the window disposition selection menu 6320 may include an option regarding whether the first application is disposed in a left region or a right region and is disposed with a full screen. The fifth region 6310 may be split to three regions, and window disposition options may be matched to the three regions.

The fifth region 6310 may be a region of the display 210. The fifth region 6310 may be defined as a portion of a region of the display 210 that is externally exposed in the folded state. When the display 210 is a touchscreen, the window disposition selection menu 6320 may be displayed on the fifth region 6310 and may receive a user's selection in the form of a touch input to the display 210.

In one or more exemplary embodiments, the fifth region 6310 may be disposed on a housing of the device 100*c*, e.g., may be a region in which a touch sensor, a proximity sensor, etc. are disposed. Information about the window disposition selection menu 6320 may be displayed in the fifth region 6310 on the housing or may be displayed on a portion of a region of the display 210 that is externally exposed.

The window disposition selection menu 6320 may be provided in a preset region that is physically separated from the display 210 on which the screen of the first application is displayed when the device 100*c* is asymmetrically folded, so that the user may intuitively access the window disposition selection menu 6320. Furthermore, the window disposition selection menu 6320 may be provided using a region of a lower layer that is exposed due to asymmetrical folding. The window disposition selection menu 6320 may be displayed without covering the screen of the first application and without making a screen disposition complicated.

Figure 64:
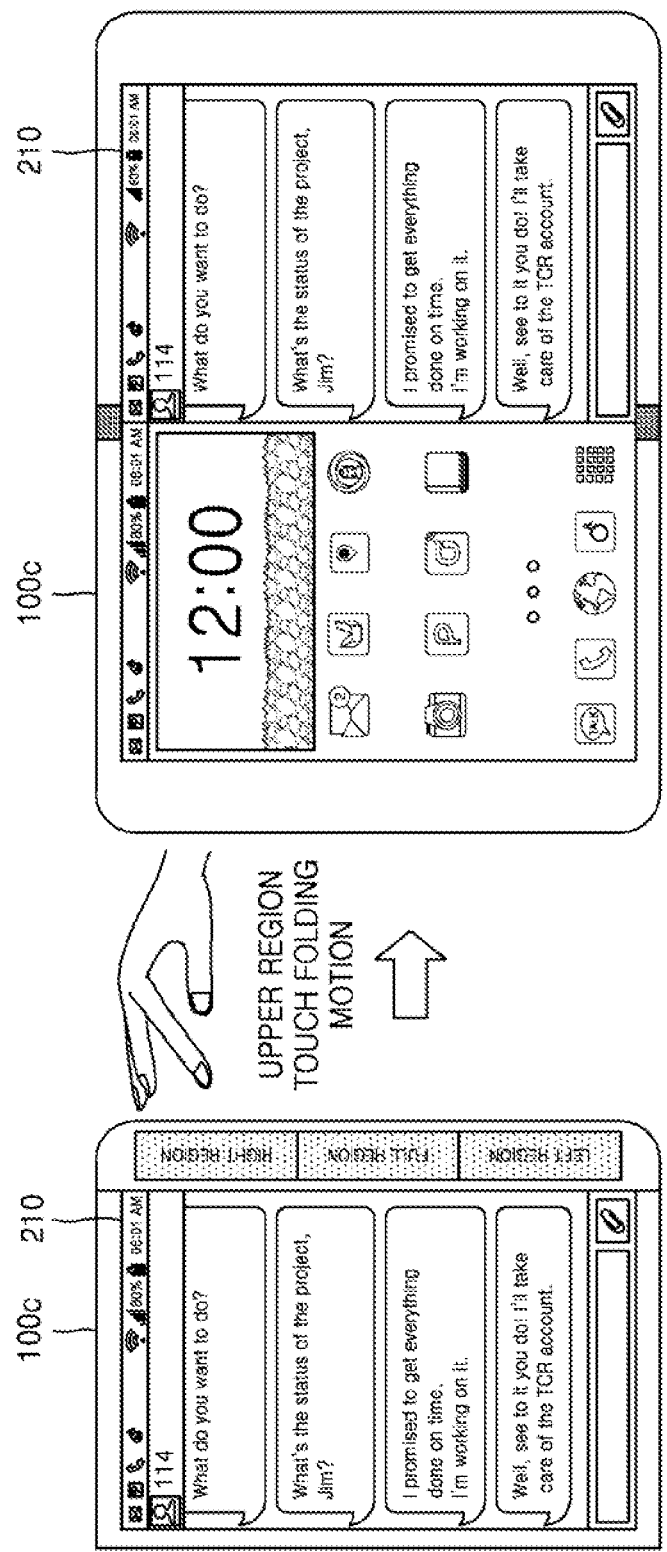
FIG. 64 illustrates an example of a screen in which it is selected, from a window disposition selection menu, to display a screen of a first application in a right region of the screen according to an exemplary embodiment.

FIG. 64 illustrates an example of a screen in which it is selected, from a window disposition selection menu, to display a screen of a first application in a right region of the screen according to an exemplary embodiment.

Referring to FIG. 64, in a folded state of the device 100*c*, when a user selects an option of displaying the screen of the first application in the right region, and changes a state of the device 100*c* from the folded state to an open state, the controller 230 displays the screen of the first application in the right region and displays a screen of a second application in a left region of the screen.

Figure 65:
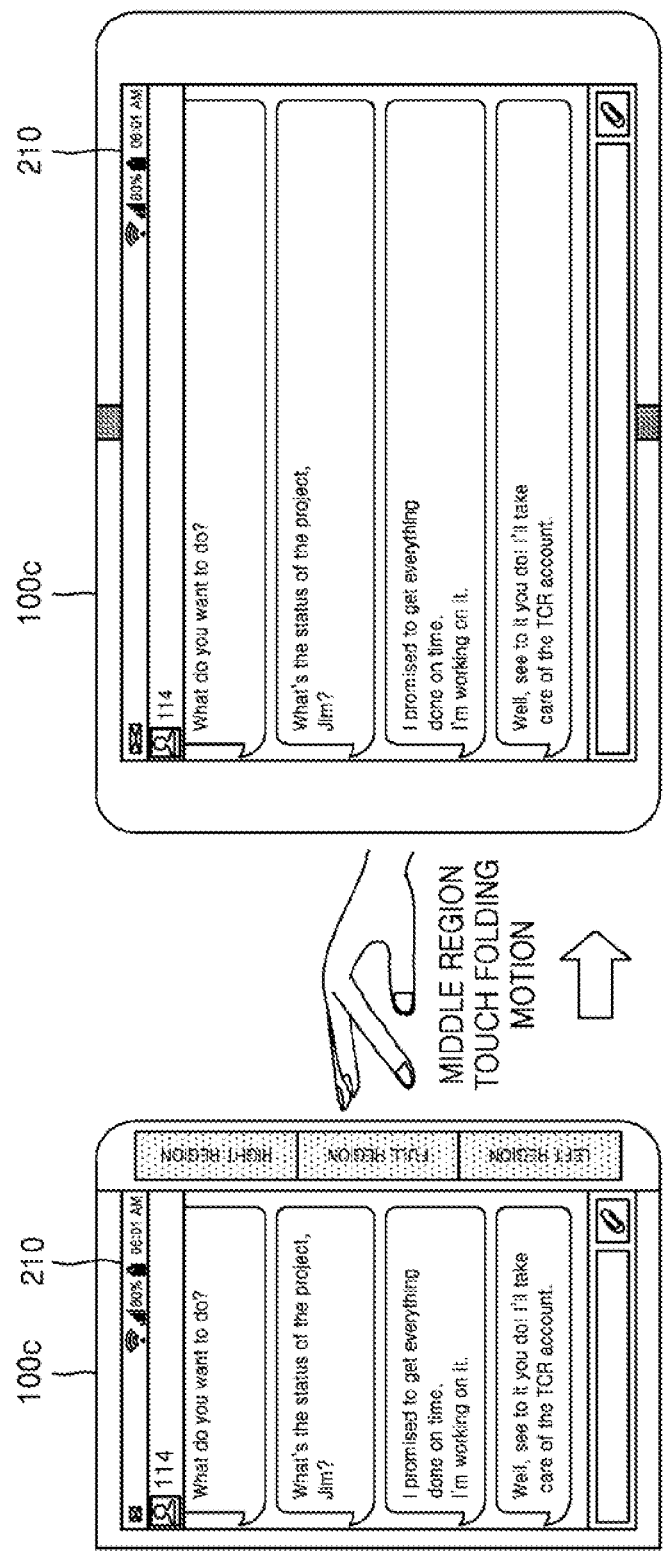
FIG. 65 illustrates an example of a screen in which it is selected, from a window disposition selection menu, to display a first application with a full screen according to an exemplary embodiment.

FIG. 65 illustrates an example of a screen in which it is selected, from a window disposition selection menu, to display a first application with a full screen according to an exemplary embodiment.

Referring to FIG. 65, in a folded state of the device 100*c*, when a user selects an option of displaying the first application with the full screen, and changes a state of the device 100*c* from the folded state to an open state, the controller 230 displays the first application with the full screen and does not display a screen of a second application.

Figure 66:
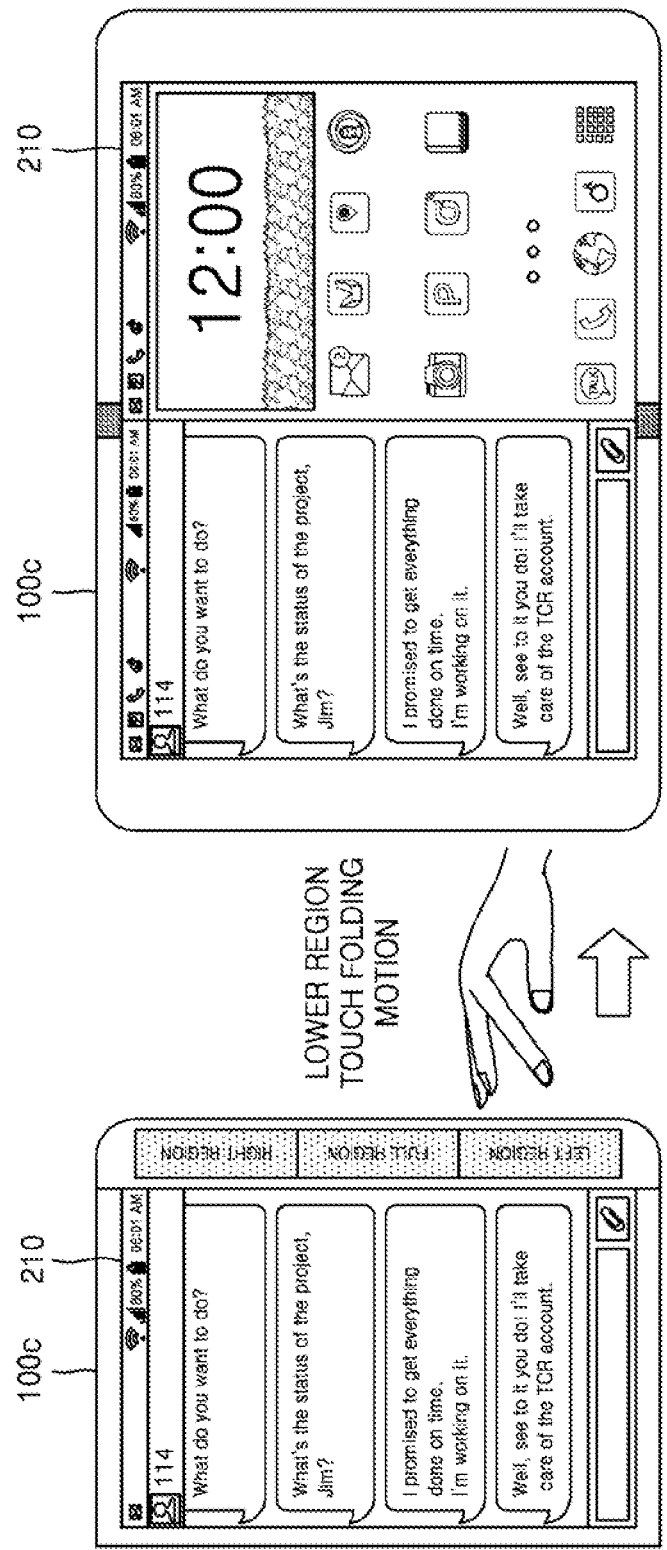
FIG. 66 illustrates an example of a screen in which it is selected, from a window disposition selection menu, to display a screen of a first application in a left region of the screen according to an exemplary embodiment.

FIG. 66 illustrates an example of a screen in which it is selected, from a window disposition selection menu, to display a screen of a first application in a left region of the screen according to an exemplary embodiment.

Referring to FIG. 66, in a folded state of the device 100*c*, when a user selects an option of displaying the screen of the first application in the left region, and changes a state of the device 100*c* from the folded state to an open state, the controller 230 displays the screen of the first application in the left region and displays a screen of a second application in a right region of the screen.

Figure 67:
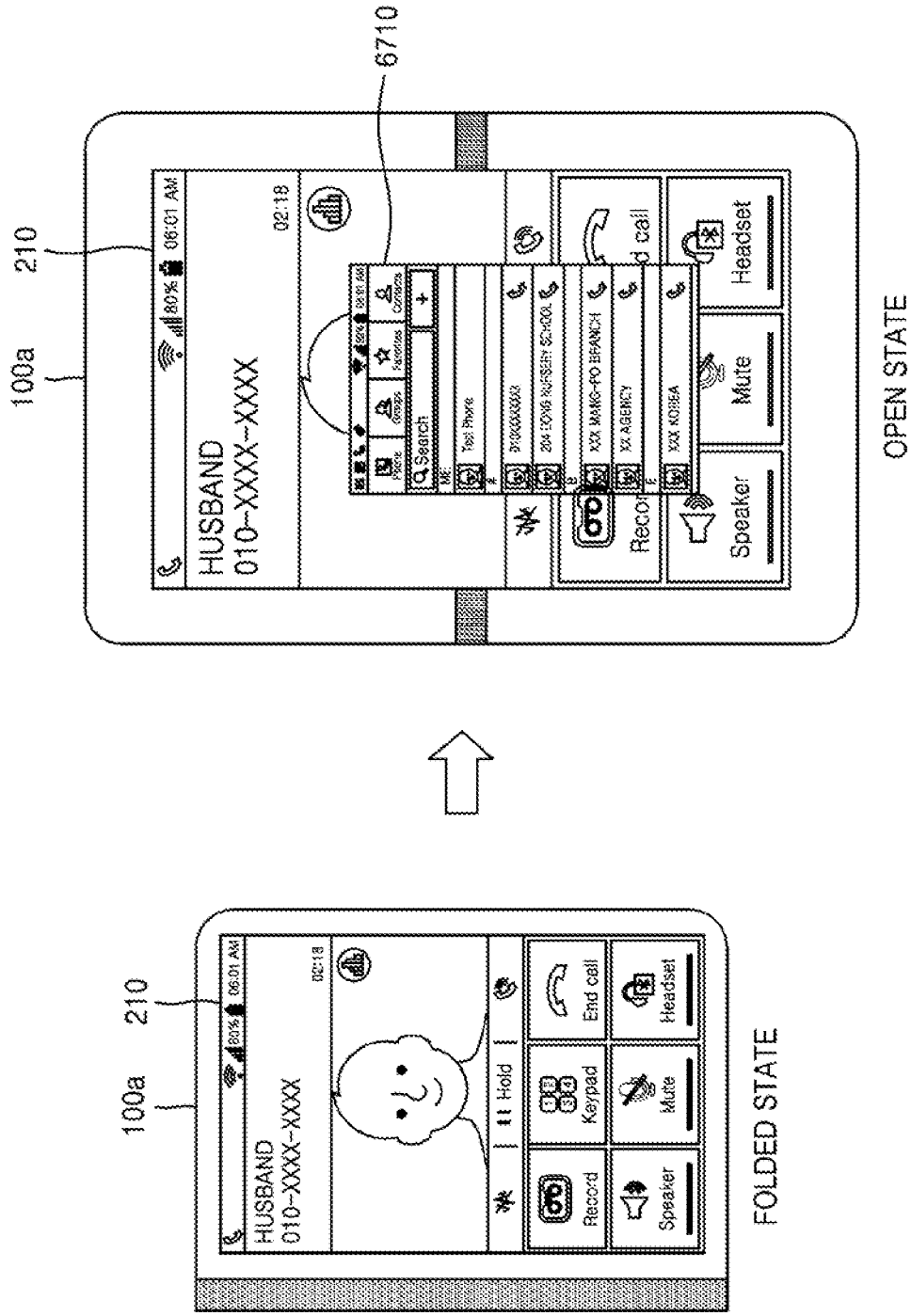
FIG. 67 illustrates a disposition of a first application screen and a second application screen, according to an exemplary embodiment.

FIG. 67 illustrates a disposition of a first application screen and a second application screen 6710, according to an exemplary embodiment.

When the first application screen and the second application screen 6710 are co-displayed, the first application screen and the second application screen 6710 may be disposed in various ways in one or more exemplary embodiments.

As illustrated in FIG. 67, in a case where a folded shape of the device 100*a* is changed, and thus the first application screen and the second application screen 6710 are co-displayed, the second application screen 6710 may be displayed while partly covering the first application screen. In this case, for example, the second application screen 6710 may be displayed in the form of a pop-up window.

Also, in a case where the folded shape of the device 100*a* is changed, and thus the first application screen and the second application screen 6710 are co-displayed, the first application screen may be displayed in the form of a full screen, and the second application screen 6710 may be displayed covering a portion of the first application screen.

Alternatively, the second application screen 6710 may be displayed in the form of a full screen, and the first application screen may be displayed while covering a portion of the second application screen 6710.

In some embodiments, as described above, the first application screen and the second application screen 6710 may be displayed on equally-split regions of a screen of the device 100*a*.

Figure 68:
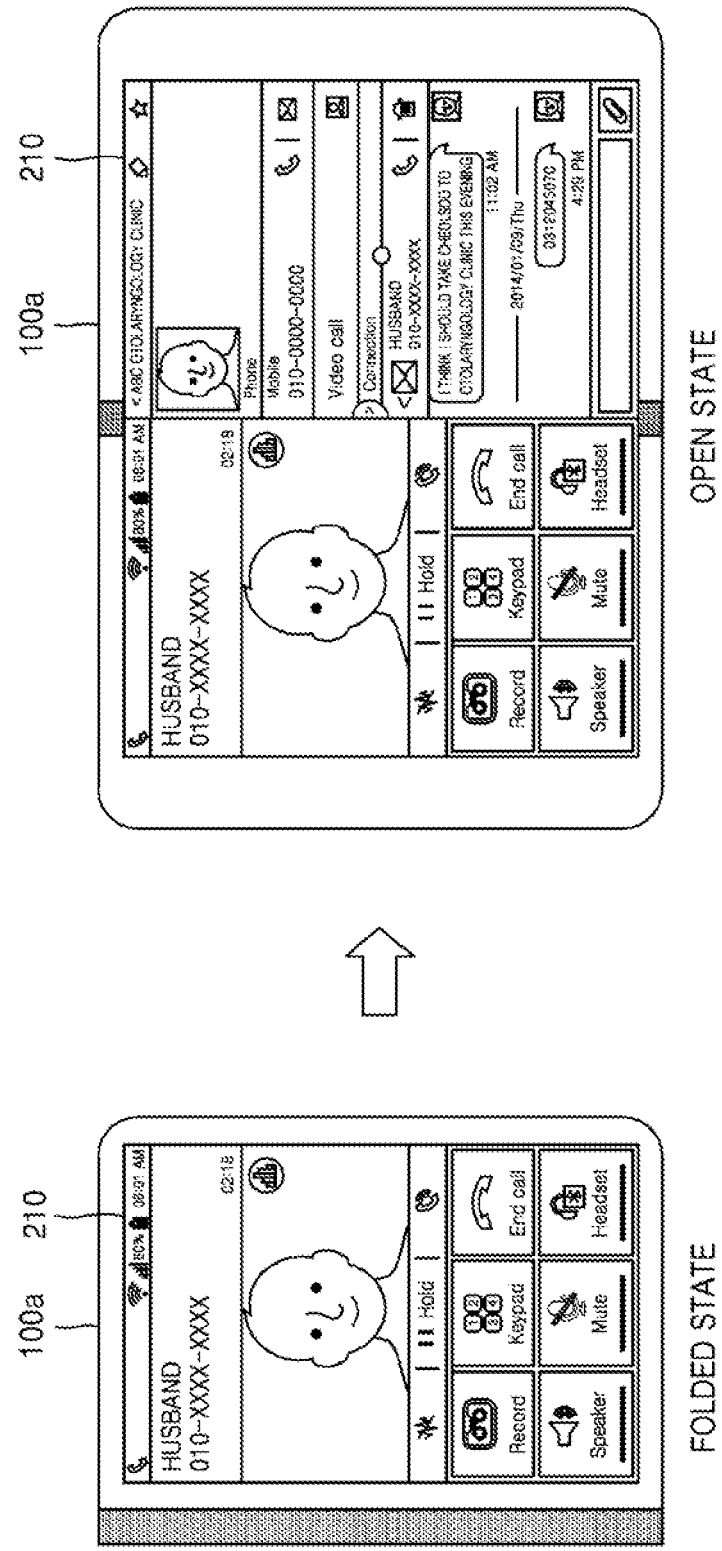
FIG. 68 illustrates a disposition of a first application screen and a second application screen, according to another exemplary embodiment.

FIG. 68 illustrates a disposition of a first application screen and a second application screen, according to another exemplary embodiment.

Referring to FIG. 68, when the device 100*a* detects an unfolding motion and thus co-displays the first application screen and the second application screen, a plurality of second application screens may be displayed along with the first application screen. The plurality of second application screens may be screens of a same application or screens of different applications.

In a case where a folded shape of the device 100*a* is changed, and thus the first application screen and the second application screen are co-displayed, a screen of the device 100*a* may be split as illustrated in FIG. 68, and the first application screen and the plurality of second application screens may be disposed in the split screen of the device 100*a*. A size of the first application screen and a size of the second application screen may be equal to each other or may be different from each other according to various exemplary embodiments.

While the first application screen and the second application screen are co-displayed, according to a user input, the size of the first application screen and/or the size of the second application screen may be changed, a position of the first application screen and/or a position of the second application screen may be changed, or one of a plurality of screens may be deleted.

Figure 69:
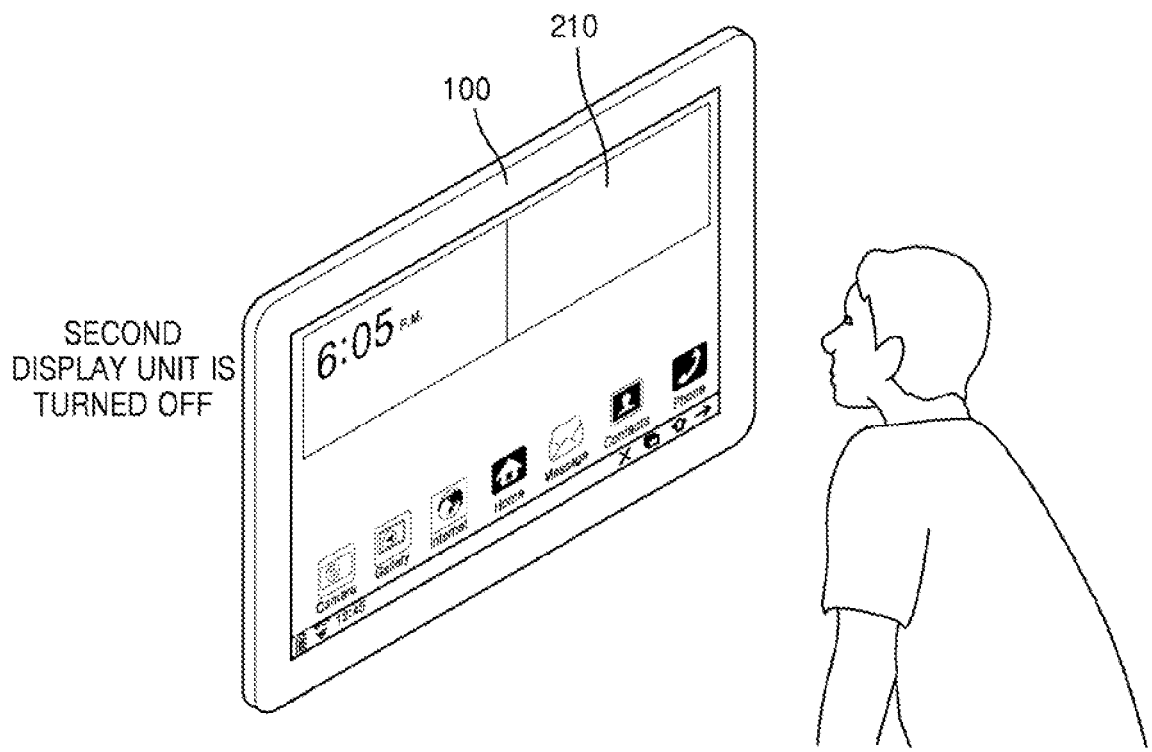
FIG. 69 illustrates an operation of the device, according to an exemplary embodiment.

FIG. 69 illustrates an operation of the device 100, according to an exemplary embodiment.

Referring to FIG. 69, the device 100 detects a user's gaze, and thus, the device 100 may turn on only the display from among the first display 310 and the second display 320 to which the user's gaze is directed and may turn off the other one of the displays. For example, when the user watches a surface where the first display 310 is disposed, the second display 320 may be turned off. In order to detect the user's gaze, the device 100 may have a camera, a gaze detecting sensor, or the like.

Figure 70:
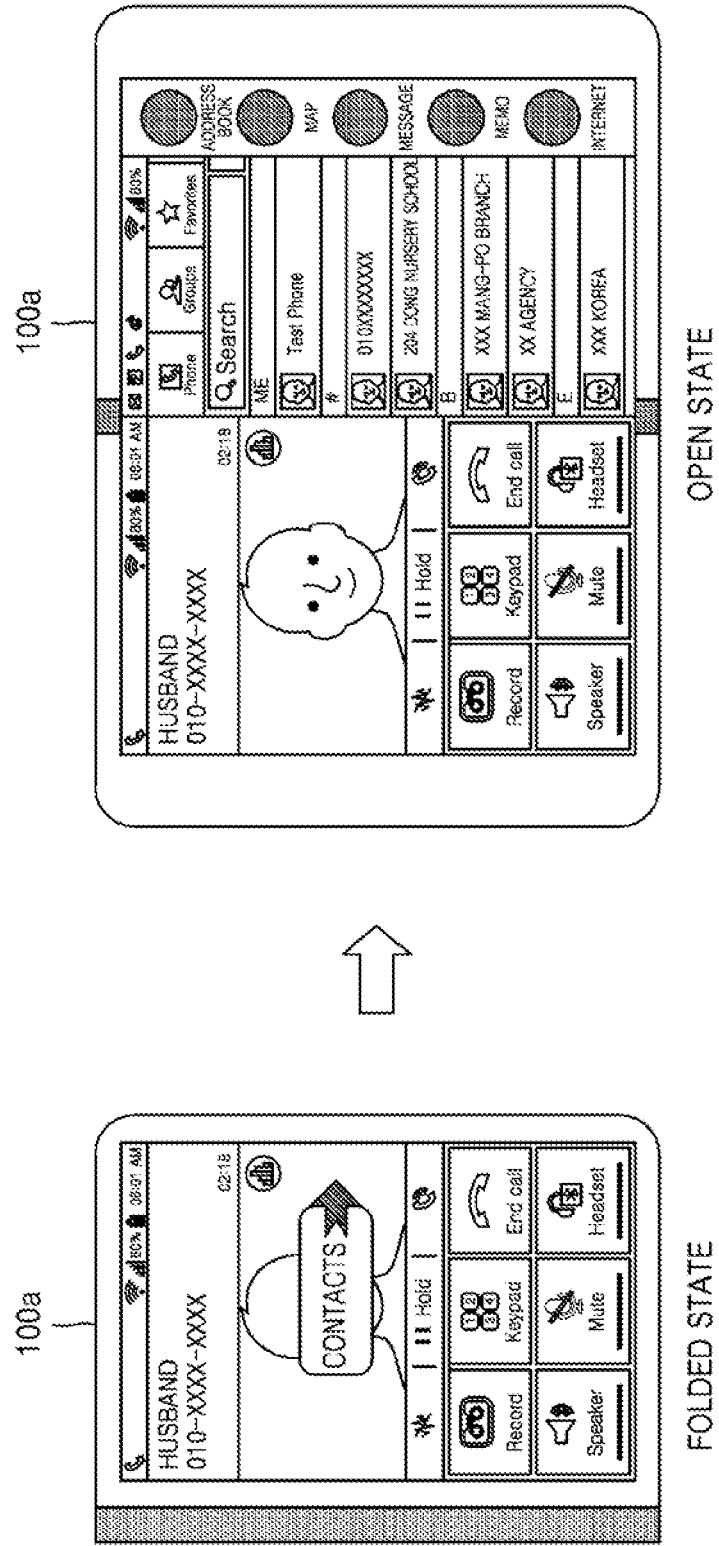
FIG. 70 illustrates an example in which information about a second application is provided, according to an exemplary embodiment.

FIG. 70 illustrates an example in which information about a second application is provided, according to an exemplary embodiment.

Referring to FIG. 70, when a screen of a first application is displayed, the information about the second application may also be provided. For example, in a case where the second application is a contact application, as illustrated in FIG. 70, when the device 100*a* is unfolded, a screen of the contact application may be displayed on the device 100*a*.

Figure 71:
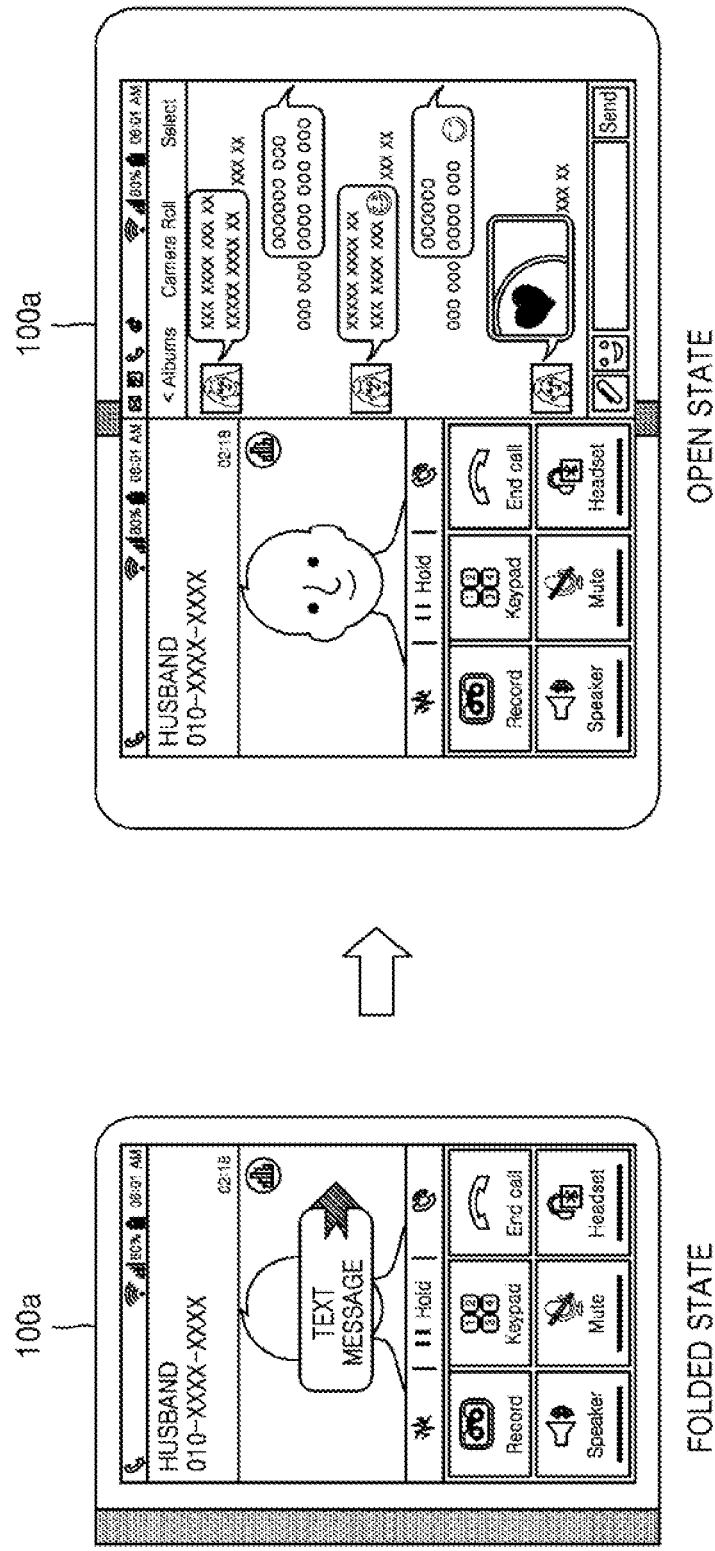
FIG. 71 illustrates an example in which information about a second application is provided, according to another exemplary embodiment.

FIG. 71 illustrates an example in which information about a second application is provided, according to another exemplary embodiment.

Referring to FIG. 71, in a case where a notification event occurs while a screen of a first application is displayed, the device 100*a* may provide information indicating that a user may check the notification event by unfolding the device 100*a*. For example, in a case where a text message is received while the screen of the first application is displayed, as illustrated in FIG. 71, the device 100*a* may show that the text message can be checked by unfolding the device 100*a*.

Figure 72:
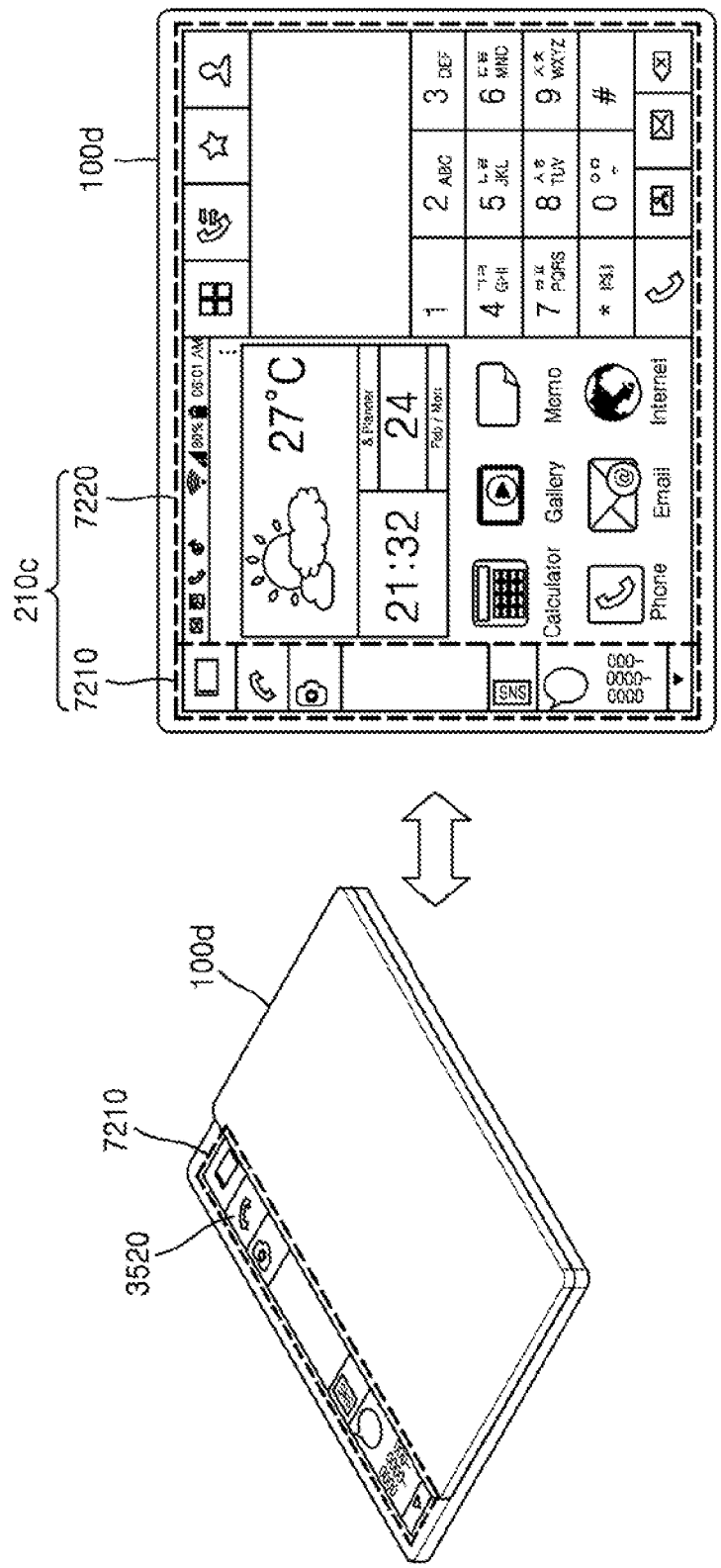
FIG. 72 illustrates a structure of a device, according to another exemplary embodiment.

FIG. 72 illustrates a structure of a device 100*d*, according to another exemplary embodiment.

Referring to FIG. 72, a display 210*c* may be disposed on a first surface of the device 100*d* that is hidden as the device 100*d* is folded, and a display may not be disposed on a second surface of the device 100*d* that is disposed at an opposite side of the first surface. Also, when the device 100*d* is asymmetrically folded, a portion of the first surface may be externally exposed while the device 100*d* is folded.

A second application selection menu 3520 may be provided in a region of the first surface that is externally exposed while the device 100*d* is asymmetrically folded.

The second application selection menu 3520 may be displayed as a GUI on the display 210*c*. The display 210*c* may include a sixth region 7210 that is externally exposed when the device 100*d* is asymmetrically folded. The display 210*c* may correspond to the sixth region 7210 and a seventh region 7220 that are integrally formed or are divided by a frame or the like, wherein the second application selection menu 3520 is displayed in the sixth region 7210 and an operational screen of the device 100*c* is displayed in the seventh region 7220.

In one or more exemplary embodiments, the second application selection menu 3520 may be provided so as to receive a user input by using a touch sensor or a key button disposed in a preset region of a housing of the device 100*d*. Information about the second application selection menu 3520 may be displayed on a region of the display 210*c*.

Figure 73:
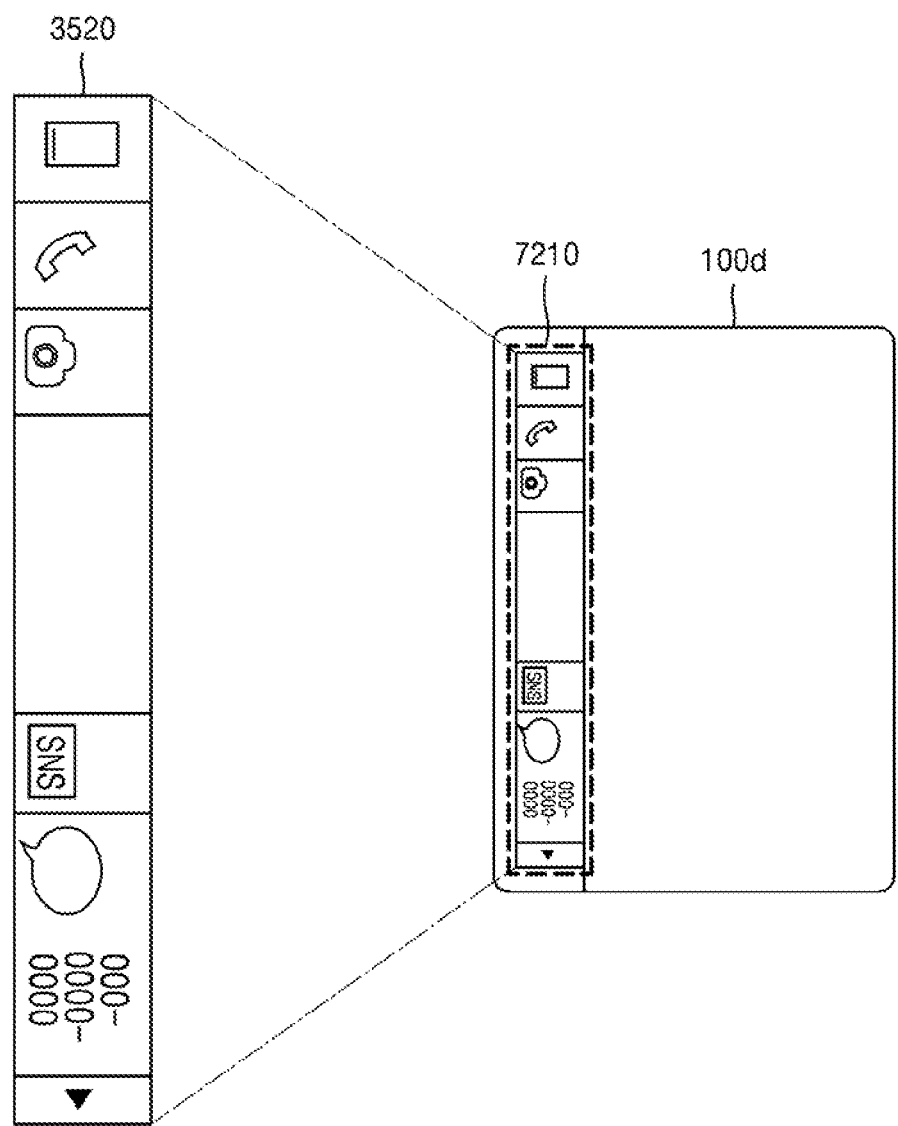
FIG. 73 illustrates an example of the second application selection menu, according to an exemplary embodiment.

FIG. 73 illustrates an example of the second application selection menu 3520, according to an exemplary embodiment.

The second application selection menu 3520 may display user-selectable applications, and a user may select an application from the second application selection menu 3520. As illustrated in FIG. 73, the sixth region 7210 may be divided into a plurality of regions, and the user-selectable applications may be matched with the plurality of regions.

Figure 74:
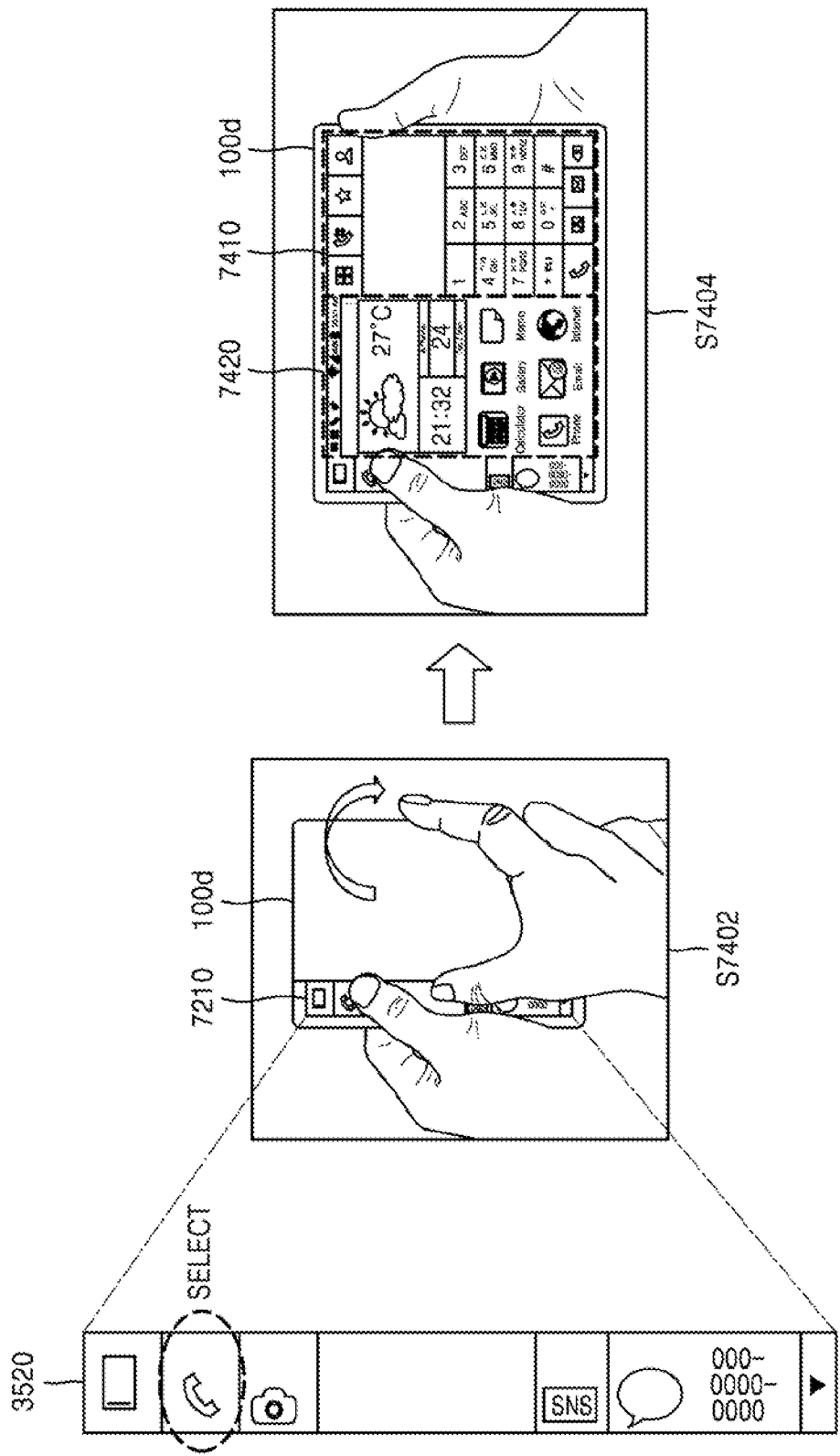
FIG. 74 illustrates an example in which a second application is selected from the second application selection menu and then is executed, according to an exemplary embodiment.

FIG. 74 illustrates an example in which a second application is selected from the second application selection menu 3520, according to an exemplary embodiment.

Referring to FIG. 74, the device 100*d* is in a folded state provides the second application selection menu 3520. When a user selects one of a plurality of second applications included in the second application selection menu 3520 and unfolds the device 100*d* (S7402), the device 100*d* may display a screen of the user-selected second application on a predetermined region of the display 210*c*. For example, in a case where the device 100*d* is a smart phone in a folded state and a standby mode, when the user selects a phone function from the second application selection menu 3520 and changes the folded state of the device 100*d* to an open state (S7402), a second application screen may be displayed in an eighth region 7410 of the display 210*c*, and a first application screen may be displayed in a ninth region 7420 (S7404). The first application screen may include a home screen that is displayed when a screen is turned on in the standby mode, an application list screen, a screen of a user-preset application, or the like.

Figure 75:
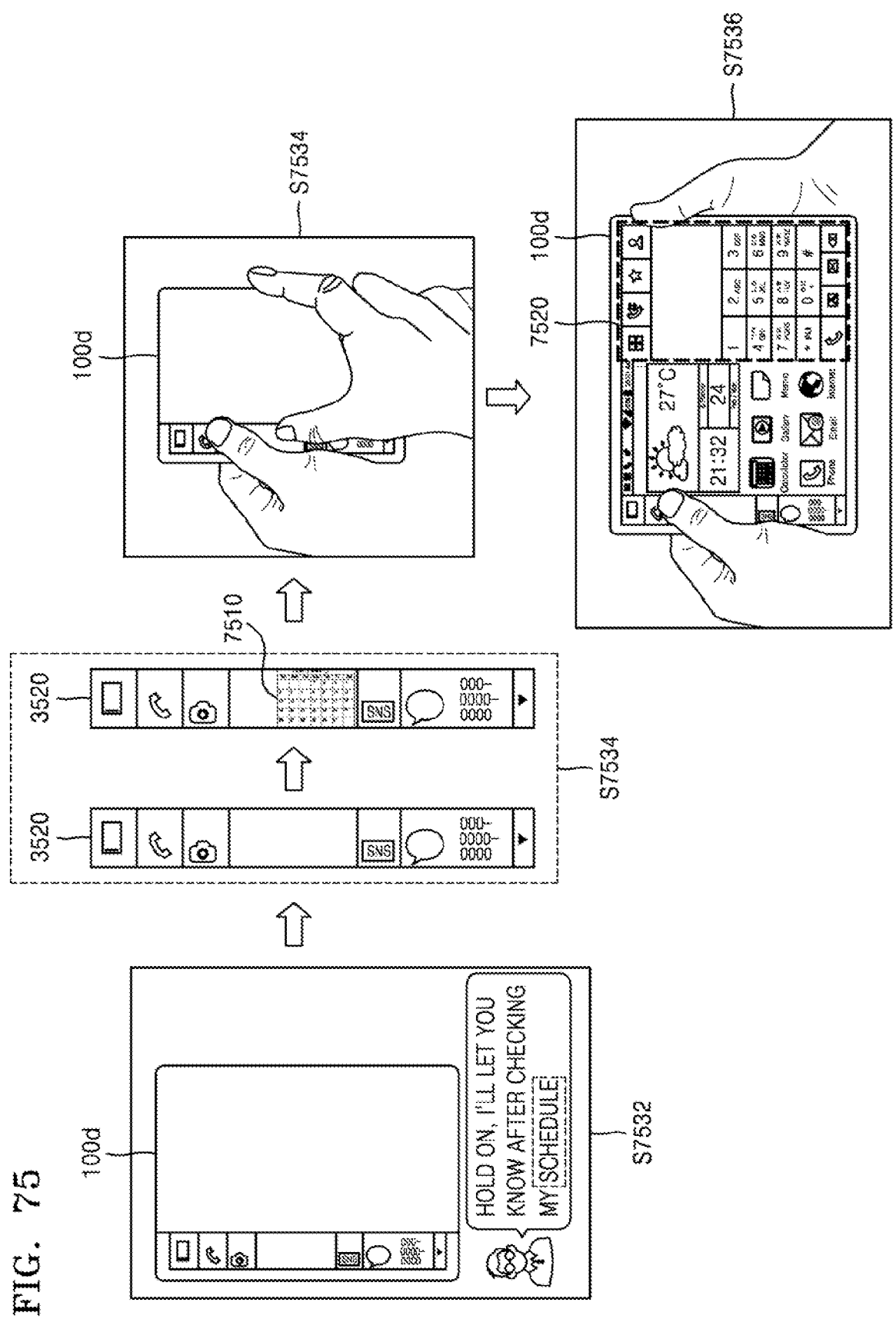
FIG. 75 illustrates a procedure of providing a second application screen, according to an exemplary embodiment.

FIG. 75 illustrates a procedure of providing a second application screen, according to an exemplary embodiment.

While a user makes a call by using the device 100*d*, the device 100*d* may recognize contents of a voice conversation of the user. When the device 100*d* recognizes a word related to a particular application from the contents of the voice conversation, the device 100*d* includes the particular application in the second application selection menu 3520. The recognition of the contents of the voice conversation may be performed by using various voice recognition algorithms. Information about the particular application related to the recognized word may be stored in the device 100d or may be set by the user.

For example, as illustrated in FIG. 75, the user mentions a word "schedule" while the user makes a call by using the device 100d in a folded state (S7532). If the word "schedule" and an application related to the word "schedule" are assigned in the device 100d, the device 100d recognizes the word "schedule" (S7532). The device 100d may dispose, on the second application selection menu 3520, a selection menu 7510 for selecting the application related to the word "schedule" (S7534). The device 100d may dispose the selection menu 7510, which corresponds to the application related to the recognized word, on a touch interface using the display 210a, and may display a picture or a text corresponding to the selection menu 7510 on the touch interface.

The user may select the related application by using the selection menu 7510 of the related application, and may unfold the device 100d (S7534), to display an execution screen 7520 of the related application (S7536). The device 100d may recognize the contents of the voice conversation of the user and may allow an application to be easily used by the user, so that user convenience may be increased.

Figure 76:
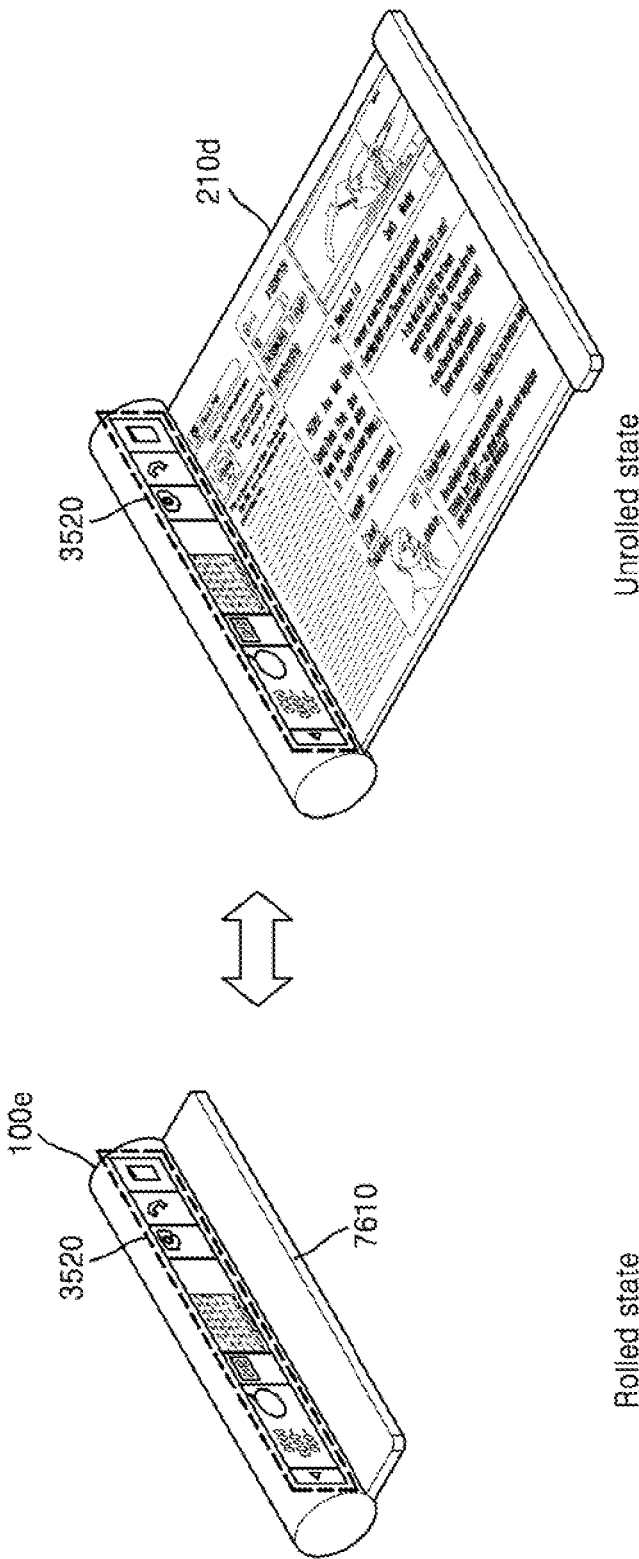
FIG. 76 illustrates a structure of a device, according to another exemplary embodiment.

FIG. 76 illustrates a structure of a device 100e, according to another exemplary embodiment.

The device 100e may be a rollable device. As illustrated in FIG. 76, a display 210d of the device 100e may have two states, i.e., a rolled state and an unrolled state. A user may change a state of the device 100e from the rolled state to the unrolled state by holding and pulling out a portion 7610 of the device 100e or by pressing a preset button of the device 100e. A second application selection menu 3520 may be provided in a preset region of the device 100e that is externally exposed while the device 100e is rolled. For example, as illustrated in FIG. 76, the second application selection menu 3520 may be provided in a preset region of a housing of the device 100e, wherein the housing keeps the display 210d in the rolled state.

The second application selection menu 3520 may be provided in the form of a touchscreen, a touch sensor, a button, etc. In one or more exemplary embodiments, application types that are selectable from the second application selection menu 3520 may be preset in the device 100e, may be determined according to user's selection, or may be changed according to an operation mode of the device 100e.

Figure 77:
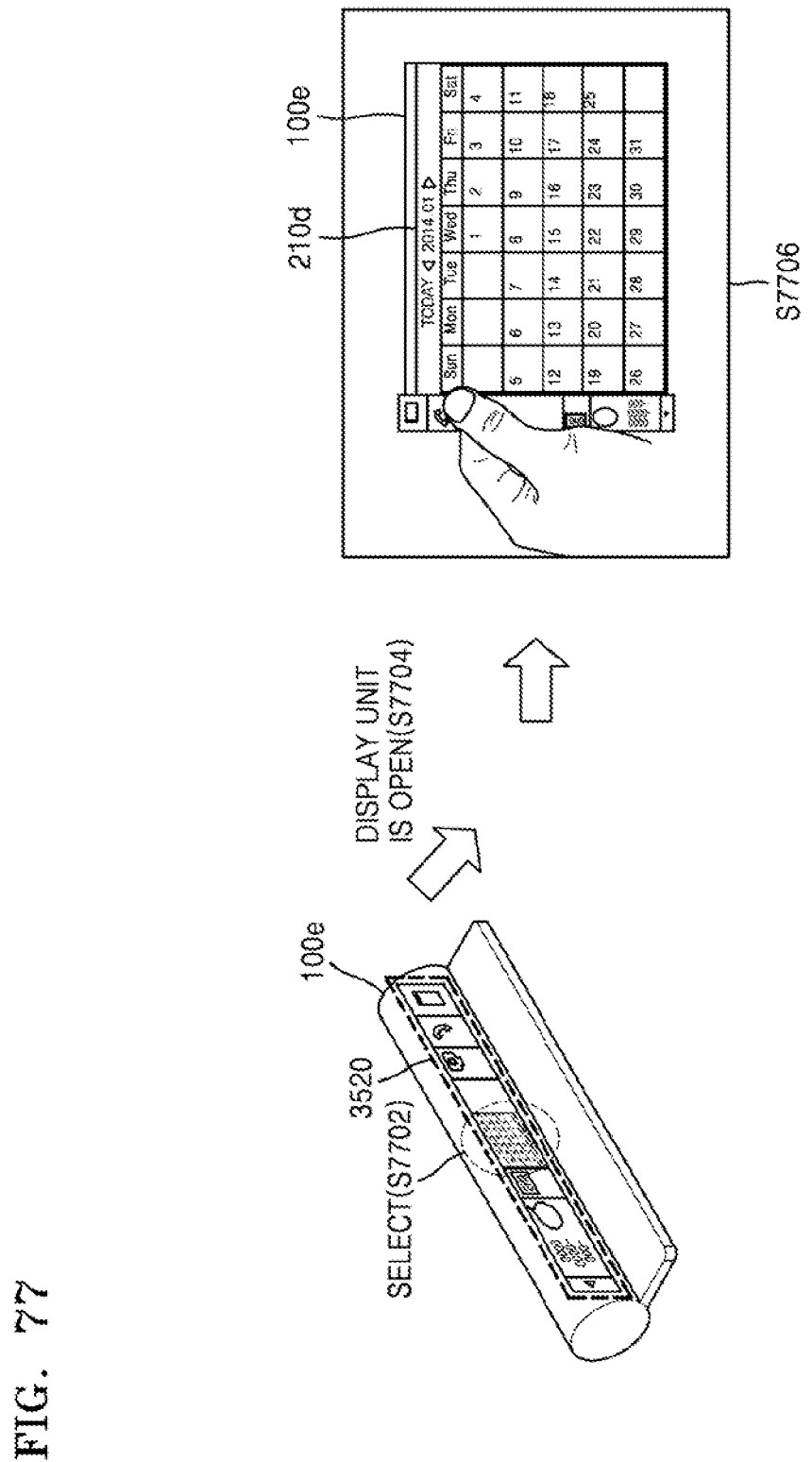
FIG. 77 illustrates a procedure in which the device provides a second application menu, according to an exemplary embodiment.

FIG. 77 illustrates a procedure in which the device 100e provides a second application menu, according to an exemplary embodiment.

Referring to FIG. 77, the device 100e in a rolled state provides the second application selection menu 3520, and a user selects an application from the second application selection menu 3520 (S7702). Afterward, when the user changes a state of the device 100e to an unrolled state (S7704), the display 210d is exposed, and a screen of the user-selected application is displayed on the display 210d (S7706). The selection of the application (S7702) may be performed before the user unrolls the display 210d, may be performed while the user unrolls the display 210d, or may be performed after the display 210d is unrolled.

When the user selects a second application from the second application selection menu 3520, the device 100e may co-display a screen of the user-selected second application and a screen of a preset first application or a screen of a first application that is currently executed.

FIG. 78 illustrates a block diagram of a device 100f, according to another exemplary embodiment.

As illustrated in FIG. 78, a structure of the device 100f may be applied to various types of devices including a mobile phone, a tablet PC, a personal digital assistant (PDA), an MP3 player, a kiosk, an electronic photo frame, a navigation device, a digital TV, or a wearable device such as a wrist watch or a head-mounted display (HMD).

Referring to FIG. 78, the device 100f may include at least one selected from a display 7810, i.e., a display unit, a controller 7870, i.e., a control unit, a memory 7820, a global positioning system (GPS) chip 7825, a communicator 7830, i.e., a communication unit or a transceiver, a video processor 7835, an audio processor 7840, a user interface 7845, i.e., a user inputter or a user input unit, a microphone 7850, i.e., a microphone unit, a camera 7855, i.e., an image-capturing unit, a speaker 7860, i.e., a speaker unit, a motion detector 7865, i.e., a motion detecting unit, and a sensor 7880, i.e., a sensing unit.

The display 7810 may include a display panel 7811 and a controller for controlling the display panel 7811. The display panel 7811 may be various displays including a liquid crystal display (LCD), an organic light-emitting diode (OLED) display, an active matrix organic light-emitting diode (AMOLED) display, a plasma display panel (PDP), or the like. The display panel 7811 may be flexible, transparent, and/or wearable. The display 7810 may be combined with a touch panel 7847 of the user interface 7845 and thus may be provided as a touchscreen. The touchscreen may include a module having a stack structure containing the display panel 7811 and the touch panel 7847.

The memory 7820 may include at least one of an internal memory and an external memory.

The internal memory may include at least one of a volatile memory (e.g., a dynamic random access memory (DRAM), a static RAM (SRAM), a synchronous dynamic RAM (SDRAM), etc.), a non-volatile memory (e.g., a one-time programmable read only-memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid-state drive (SSD). The controller 7870 may load an instruction or data from at least one of the non-volatile memory and another element to the volatile memory and may process the instruction or the data. Also, the controller 7870 may store, in the non-volatile memory, data that is received from or is generated by another element.

The external memory may include at least one of a compact flash (CF) memory, a secure digital (SD) memory, a micro secure digital (Micro-SD) memory, a mini secure digital (Mini-SD) memory, an extreme digital (xD) memory, and a memory stick.

The memory 7820 may store various programs and data that are used in operations of the device 100f. For example, the memory 7820 may temporarily or semi-permanently store a portion of contents to be displayed on a lock screen.

The controller 7870 may control the display 7810 to display the portion of the contents stored in the memory 7820. In other words, the controller 7870 may display the portion of the contents stored in the memory 7820 on the display 7810. When a user's gesture is performed in a region of the display 7810, the controller 7870 may perform a control operation that corresponds to the user's gesture.

The controller 7870 may include at least one of a RAM 7871, a ROM 7872, a central processing unit (CPU) 7873, a graphics processing unit (GPU) 7874, and a bus 7875. The RAM 7871, the ROM 7872, the CPU 7873, and the GPU 7874 may be connected to each other via the bus 7875.

The CPU 7873 accesses the memory 7820 and performs a booting operation by using an operating system (OS) stored in the memory 7820. Then, the CPU 7873 performs various operations by using the various programs, the contents, or the data stored in the memory 7820.

The ROM 7872 may store an instruction set for booting up a system. For example, when a turn-on instruction is input to the device 100*f*, and power is supplied to the device 100*f*, the CPU 7873 may copy the OS stored in the memory 7820 to the RAM 7871 according to the instruction stored in the ROM 7872, execute the OS, and thus boot up the system. When the booting operation is completed, the CPU 7873 may copy the various programs stored in the memory 7820 to the RAM 7871, and may perform various operations by executing the programs copied to the RAM 7871. When the device 100*f* is booted up, the GPU 7874 displays a UI screen in the display 7810. In more detail, the GPU 7874 may generate a screen that displays an electronic document including various objects such as content, an icon, a menu, or the like. The GPU 7874 calculates coordinate values of the objects that are to be displayed according to a layout of the UI screen, and calculates attribute values of shapes, sizes, or colors of the objects. Then, the GPU 7874 may generate UI screens with various layouts including the objects based on the calculated attribute values. The UI screen generated by the GPU 7874 may be provided to the display 7810 and thus may be displayed in regions of the display 7810.

The GPS chip 7825 may receive a GPS signal from a GPS satellite and may calculate a current position of the device 100*f*. In a case where a navigation program is used or a current position of the user is required, the controller 7870 may calculate a position of the user by using the GPS chip 7825.

The communicator 7830 may perform communication with various external devices according to various types of communication methods. The communicator 7830 may include at least one selected from a wireless fidelity (Wi-Fi) chip 7831, a Bluetooth chip 7832, a wireless communication chip 7833, and a near field communication (NFC) chip 7834. The controller 7870 may perform the communication with the various external devices by using the communicator 7830.

The Wi-Fi chip 7831 and the Bluetooth chip 7832 may perform communication by using WiFi and Bluetooth, respectively. If the Wi-Fi chip 7831 or the Bluetooth chip 7832 is used, the WiFi chip 7831 or the Bluetooth chip 7832 may first transmit and receive various types of connection information including a service set identification (SSID), a session key, or the like, may establish a connection for communication by using the connection information, and then may transmit and receive various types of information. The wireless communication chip 7833 may be a chip that performs communication according to various communication standards such as the Institute of Electrical and Electronics Engineers (IEEE), ZigBee, 3rd generation (3G), 3rd Generation Partnership Project (3GPP), Long Term Evolution (LTE), or the like. The NFC chip 7834 indicates a chip that operates in using NFC by using a 13.56 MHz band from among various radio frequency-identification (RF-ID) frequency bands such as 135 kHz, 13.56 MHz, 433 MHz, 860~960 MHz, 2.45 GHz, or the like.

The video processor 7835 may process video data included in content received by using the communicator 7830 or may process video data included in content stored in the memory 7820. The video processor 7835 may perform various image processing such as decoding, scaling, noise filtering, frame rate conversion, resolution conversion, or the like on the video data.

The audio processor 7840 may process audio data included in content received by using the communicator 7830 or may process audio data included in content stored in the memory 7820. The audio processor 7840 may perform various processing such as decoding, amplification, noise filtering, or the like on the audio data.

When a reproducing program for multimedia content is executed, the controller 7870 may reproduce the multimedia content by driving the video processor 7835 and the audio processor 7840. The speaker 7860 may output audio data generated in the audio processor 7840.

The user interface 7845 may receive an input of various instructions from a user. The user interface 7845 may include at least one selected from a key 7846, a touch panel 7847, and a pen recognizing panel 7848.

The key 7846 may be of various types such as a mechanical button, a wheel, or the like that may be formed in a front portion, a side portion, a rear portion, etc., of an external surface of a body of the device 100*f*.

The touch panel 7847 may sense a touch input by the user and may output a value of a touch event that corresponds to a signal generated by the sensed touch input. When the touch panel 7847 is combined with the display panel 7811 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be generated by a finger of a person, but may also be generated by an object formed of a conductive material capable of changing capacitance.

The pen recognizing panel 7848 may sense a proximity input or a touch input of a touch pen (e.g., a stylus pen or a digitizer pen) which is performed by a user, and may output a sensed pen proximity event or a sensed pen touch event. The pen recognizing panel 7848 may be an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 7848 may include an electromagnetic induction coil sensor having a grid structure, and an electric signal processor for sequentially providing an alternating current (AC) signal having a predetermined frequency to each loop coil of the electromagnetic induction coil sensor. When a pen having an internal resonance circuit is positioned near a loop coil of the pen recognizing panel 7848, a magnetic field transmitted from the loop coil generates a current in the resonance circuit in the pen, based on mutual electrostatic induction. Due to the current, an induction field is generated from a coil forming the resonance circuit in the pen, and the pen recognizing panel 7848 detects the induction field from the loop coil capable of receiving a signal, and thus senses the touch input or the proximity input by the pen. The pen recognizing panel 7848 may be arranged to occupy a preset area below the display panel 7811, e.g., may have a size capable of covering a display region of the display panel 7811.

The microphone 7850 may receive an input of a user's voice or other sound and may convert the user's voice or other sound to audio data. The controller 7870 may use the user's voice, which is input via the microphone 7850, in a call-related operation or may convert the user's voice to the audio data and may store the audio data in the memory 7820.

The camera 7855 may capture a still image or a moving picture according to a control by the user. The camera 7855 may include a front camera, a rear camera, or the like.

If the camera 7855 and the microphone 7850 are formed, the controller 7870 may perform a control operation according to a user's voice input via the microphone 7850 or a user's motion recognized by the camera 7855. For example, the device 100*f* may operate in a motion control mode or a voice control mode. If the device 100*f* operates in the motion control mode, the controller 7870 may activate the camera 7855 and may capture an image of the user, may trace a change in motions of the user, and may perform a control operation corresponding thereto. If the device 100*f* operates in the voice control mode (i.e., a voice recognition mode), the controller 7870 may analyze a user's voice input via the microphone 7850, and may perform a control operation according to the analyzed user's voice.

The motion detector 7865 may detect movement of a body of the device 100*f*. The device 100*f* may rotate or may tilt in various directions. Here, the motion detector 7865 may detect a movement characteristic such as a rotation direction, a rotation angle, a tilted angle, or the like by using at least one of a magnetic sensor, a gyroscope sensor, an acceleration sensor, etc.

The device 100*f* may further include a universal serial bus (USB) port for connecting the device 100*f* and a USB connector, various external input ports including a headset, a mouse, a local area network (LAN), etc. for connection with various external terminals, a digital multimedia broadcasting (DMB) chip for receiving and processing a DMB signal, various sensors, or the like.

Names of elements in the device 100*f* may vary. Also, the device 100*f* may include at least one selected from the aforementioned elements, or may be embodied with more or less elements than the aforementioned elements.

The display 210 may correspond to the display 7810 of FIG. 78. The controller 230 may correspond to the controller 7870 of FIG. 78. The user interface 3310 may correspond to the user interface 7845 of FIG. 78. The state detector 220 may correspond to the sensor 7880 of FIG. 78.

Various operations and methods described above in response to an unfolding motion of a device may generally be applied in response to a folding motion of the device. Similarly, various operations and methods described above in response to the folding motion of the device may generally be applied in response to the unfolding motion of the device As described above, according to the one or more of the above exemplary embodiments, a user may conveniently view a plurality of application screens in a device having a foldable characteristic.

Also, according to the one or more of the above exemplary embodiments, the user may easily use related functions in the foldable device.

Also, according to the one or more of the above exemplary embodiments, the user may view an application screen for a current situation by simply folding or unfolding the flexible device.

The one or more exemplary embodiments can also be computer readable codes that are on a non-transitory computer readable recording medium. The non-transitory computer readable recording medium is any data storage device that can store data which can be thereafter read and executed by a computer or processor.

The non-transitory computer readable codes, when read and executed by a processor or computer, perform a method of controlling a device according to the one or more exemplary embodiments. The computer readable codes may be formed of various programming languages. Also, functional programs, codes, and code segments for accomplishing the one or more exemplary embodiments can be easily construed by programmers skilled in the art to which the inventive concept pertains.

Examples of non-transitory computer readable recording medium include ROM, RAM, CD-ROMs, magnetic tapes, floppy disks, optical data storage devices, etc. The non-transitory computer readable recording medium can also be distributed over network coupled computer systems so that the computer readable code is stored and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A foldable device comprising:
    a hinge for folding or unfolding the foldable device, wherein the foldable device is divided into a first body part and a second body part by the hinge;
    a sensor for detecting whether the foldable device is folded, wherein the sensor is arranged in a folded region corresponding to the hinge;
    a first display disposed on a first surface of the foldable device while the foldable device is unfolded, wherein the first display is deformable according to the folding between the first body part and the second body part of the foldable device by the hinge;
    a second display disposed on a second surface of the foldable device while the foldable device is unfolded, wherein the second display is disposed on the first body part of the foldable device and the second surface is opposite of the first surface; and
    a controller configured to:
        in an unfolded state, control the first display to display a first execution screen of a first application in a first size corresponding to an area of the first display,
        based on a first notification event related to a second application, different from the first application, being detected while the first execution screen of the first application is displayed on the first display in the unfolded state, control the first display to display first information related to the first notification event together with the first execution screen of the first application, and
        based on a first folded state in which the foldable device is folded such that a visible part of the first display and the second display are disposed in a same direction while the first information is displayed together with the first execution screen of the first application on the first display, control the first display to display the first information and the first execution screen of the first application in a second size corresponding to the visible part of the first display and the second display to display a second execution screen of the second application related to the first notification event, wherein the controller is further configured to, based on the sensor detecting that the foldable device is folded such that a visible part of the first display and the second display are disposed in the same direction:
determine whether a notification event has occurred such that notification event information relating to one or more predetermined applications, including the second application, is displayed together with the first execution screen of the first application on the first display; and
based on determining that the notification event has not occurred, determine according to a predetermined setting a screen to display on the second display and control the first display to display the first execution screen of the first application in the second size corresponding to the visible part of the first display and the second display to display the determined screen.

2. The foldable device as claimed in claim 1, wherein information provided to the first display is provided differently from information provided to the second display.

3. The foldable device as claimed in claim 1, wherein:
based on a second notification event related to a third application, different from the first application and the second application, being detected while the first execution screen of the first application is displayed on the first display in the unfolded state, control the first display to display third information related to the second notification event together with the first execution screen of the first application; and
based on a second folded state in which the foldable device is folded such that a visible part of the first display and the second display are disposed in the same direction while the second information is displayed together with the first execution screen of the first application on the first display, control the first display to display the second information and the first execution screen of the first application in the second size corresponding to the visible part of the first display and the second display to display a third execution screen of the third application related to the second notification event.

4. The foldable device as claimed in claim 1, wherein the predetermined setting is a setting to display an execution screen of a predetermined application previously set to be displayed based on the third folded state in which the foldable device is folded while no notification event information relating to the one or more predetermined applications is displayed on the first display.

5. A method of controlling a foldable device comprising a hinge for folding or unfolding the foldable device, wherein the foldable device is divided into a first body part and a second body part by the hinge, a sensor for detecting whether the foldable device is folded, wherein the sensor is arranged in a folded region corresponding to the hinge, a first display disposed on a first surface of the foldable device while the foldable device is unfolded, wherein the first display is deformable according to the folding between the first body part and the second body part of the foldable device by the hinge, and a second display disposed on a second surface of the foldable device while the foldable device is unfolded, wherein the second display is disposed on the first body part of the foldable device and the second surface is opposite of the first surface, the method comprising:

in an unfolded state, controlling the first display to display a first execution screen of a first application in a first size corresponding to an area of the first display;
based on a first notification event related to a second application, different from the first application, being detected while the first execution screen of the first application is displayed on the first display in the unfolded state, control the first display to display first information related to the first notification event together with the first execution screen of the first application; and
based on a first folded state in which the foldable device is folded such that a visible part of the first display and the second display are disposed in a same direction while the first information is displayed together with the first execution screen of the first application on the first display, controlling the first display to display the first information and the first execution screen of the first application in a second size corresponding to the visible part of the first display and the second display to display a second execution screen of the second application related to the first notification event,
wherein the method further comprises, based on the sensor detecting that the foldable device is folded such that a visible part of the first display and the second display are disposed in the same direction:
determining whether a notification event has occurred such that notification event information relating to one or more predetermined applications, including the second application, is displayed together with the first execution screen of the first application on the first display; and
based on determining that the notification event has not occurred, determining according to a predetermined setting a screen to display on the second display and control the first display to display the first execution screen of the first application in the second size corresponding to the visible part of the first display and the second display to display the determined screen.

6. The method as claimed in claim 5, wherein information provided to the first display is provided differently from information provided to the second display.

7. A foldable device comprising:
a hinge for folding or unfolding the foldable device, wherein the foldable device is divided into a first body part and a second body part by the hinge;
a sensor for detecting whether the foldable device is folded, wherein the sensor is arranged in a folded region corresponding to hinge;
a first display disposed on a first surface of the foldable device while the foldable device is unfolded, wherein the first display is deformable according to the folding between the first body part and the second body part of the foldable device by the hinge;
a second display disposed on a second surface of the foldable device while the foldable device is unfolded, wherein the second display is disposed on the first body part of the foldable device and the second surface is opposite of the first surface;

a sensor configured to detect a folding state of the folding or the unfolding of the foldable device; and a controller configured to:

in an unfolded state, control the first display to display a first execution screen of a first application in a first size corresponding to an area of the first display, based on a first notification event related to a second application, different from the first application, being detected while the first execution screen of the first application is displayed on the first display in the unfolded state, control the first display to display first information related to the first notification event together with the first execution screen of the first application, and based on a first folded state in which the foldable device is folded such that a visible part of the first display and the second display are disposed in a same direction while the first information is displayed together with the first execution screen of the first application on the first display, control the first display to display the first information and the first execution screen of the first application in a second size corresponding to the visible part of the first display and the second display to display a second execution screen of the second application related to the first notification event, wherein the controller is further configured to, based on the sensor detecting that the foldable device is folded such that a visible part of the first display and the second display are disposed in the same direction:

determine whether a notification event has occurred such that notification event information relating to one or more predetermined applications, including the second application, is displayed together with the first execution screen of the first application on the first display; and based on determining that the notification event has not occurred, determine according to a predetermined setting a screen to display on the second display and control the first display to display the first execution screen of the first application in the second size corresponding to the visible part of the first display and the second display to display the determined screen.

* * * * *